United States Patent [19]

Abe et al.

[11] Patent Number: 5,312,868

[45] Date of Patent: May 17, 1994

[54] THERMOSETTING COVERING SHEET AND A METHOD OF FORMING HARD COATING ON THE SURFACE OF SUBSTRATES USING THE SAME

[75] Inventors: Hiroshi Abe, Takatsuki; Akitaka Miyake, Ibaraki; Shunro Aoto, Osaka; Yoshihiro Nishiyama, Ohtsu; Natsuki Morishita; Yosuke Oshikawa, both of Osaka; Makoto Yamaguchi, Takatsuki, all of Japan

[73] Assignee: Sekisui Kagaku Kogyo Kabushiki Kaisha, Osaka, Japan

[21] Appl. No.: 883,232

[22] Filed: May 7, 1992

Related U.S. Application Data

[63] Continuation of Ser. No. 415,829, Oct. 2, 1992, abandoned.

[51] Int. Cl.$^5$ ................... C08G 18/62; C08L 75/04
[52] U.S. Cl. ................... 525/124; 524/190
[58] Field of Search ................... 525/124

[56] References Cited

U.S. PATENT DOCUMENTS

| | | | |
|---|---|---|---|
| 3,531,364 | 9/1970 | Schmidle et al. | 428/251 |
| 3,729,338 | 4/1973 | Lehmann et al. | 428/355 |
| 4,177,178 | 12/1979 | Das et al. | 428/463 |
| 4,442,145 | 4/1984 | Probst et al. | 525/124 |
| 4,524,104 | 6/1985 | Hagio et al. | 525/124 |

FOREIGN PATENT DOCUMENTS

| | | |
|---|---|---|
| 0181478 | 5/1986 | European Pat. Off. |
| 0263983 | 4/1988 | European Pat. Off. |
| 1563820 | 4/1969 | France |
| 1586573 | 2/1970 | France |
| 2206365 | 6/1974 | France |
| 51-121092 | 10/1976 | Japan |
| 53-61486 | 6/1978 | Japan |
| 54-95676 | 7/1979 | Japan |
| 57-10913 | 3/1982 | Japan |
| 57-13425 | 3/1982 | Japan |
| 57-27009 | 6/1982 | Japan |
| 58-57472 | 4/1983 | Japan |
| 59-52616 | 3/1984 | Japan |
| 60-21630 | 5/1985 | Japan |
| 60-219270 | 11/1985 | Japan |
| 61-61873 | 12/1986 | Japan |
| 62-16930 | 1/1987 | Japan |
| 62-205171 | 9/1987 | Japan |
| 62-271735 | 11/1987 | Japan |

OTHER PUBLICATIONS

Paint Technology Manuals: Part Four The Application of Surface Coatings. Reinhold Publishing, New York (1965), pp. 66–69.

Encyclopedia of Polymer Science and Engineering, vol. 1, J. Wiley & Sons, New York 1985, p. 472.

Lehrbuch der Lacke und Beschichtungen, vol. III, Verlag W. A. Colomb, Berlin 1976, pp. 354–355, Chapter 3.9.4.1.2. "Mattierung".

Römpps Chemie-Lexikon, 8th Ed., vol. 4, Franckckh'sche Verlagshandlung, Stuttgart 1985, p. 3181, keyword "Photochromie".

*Primary Examiner*—James J. Seidleck
*Assistant Examiner*—Thomas Hamilton, III
*Attorney, Agent, or Firm*—Nikaido, Marmelstein, Murray & Oram

[57] ABSTRACT

A thermosetting covering sheet comprising an unhardened or semihardened layer made of a thermosetting resin composition is provided. The thermosetting resin composition comprises, as main ingredients, a reactive acrylic resin, which is in a solid state at ordinary temperatures, and a blocked isocyanate, the reactive acrylic resin containing a plurality of at least one kind of functional group selected from the group consisting of hydroxyl, amino, and carboxyl, and the weight average molecular weight of the reactive acrylic resin being in the range of 100,000 to 1,000,000.

5 Claims, 1 Drawing Sheet

THERMOSETTING COVERING SHEET AND A METHOD OF FORMING HARD COATING ON THE SURFACE OF SUBSTRATES USING THE SAME

This application is a continuation of application Ser. No. 415,829 filed Oct. 2, 1992, now abandoned.

BACKGROUND OF THE INVENTION

1. Field of the Invention

The present invention relates to a thermosetting covering sheet that can form a hard coating on the surfaces of objects. This sheet can be overlaid onto the surfaces of various objects and then hardened by heat to create a permanent coating for purposes such as corrosion-proofing, decoration, or display, and it is suitable for covering objects with curved or irregular surfaces. The present invention also relates to a method for forming hard coatings using the said sheet.

2 Description of the Prior Art

Coating materials in liquid or powder form are generally applied to the surfaces of objects for decoration, display, or corrosion-proofing, or to impart various other functional characteristics.

When coating materials that contain organic solvents or coating materials in powder form are used, the working environment deteriorates. On the other hand, when water-base coating materials are employed, the working environment may not be adversely affected, but the long period of time required for the drying of such coating materials, or the rapid drying of such coating materials using e.g., heat may entail substantial energy consumption. Moreover, ordinary coating materials require careful adjustment of viscosity or concentration, which involves complex and tedious work.

Therefore, covering sheets composed of thermoplastic resins such as polyvinyl chloride have been proposed as a substitute for conventional coating materials. A substrate such as a steel plate, etc., is covered by effecting the adhesion of this type of sheet onto the surface of the substrate. The use of this type of sheet has no adverse effects upon the working environment, and involves no need to remove solvents.

When covering the substrate with such a sheet, various known vacuum or pressurization methods for applying the said sheets are used in order to improve the adhesion between the sheet and the substrate. For example, a method for effecting close adhesion of a sheet to the substrate by formation of a vacuum is proposed in Japanese Laid-Open Patent Publication No. 53-61486, and a method of effecting close adhesion by applying the sheet to the substrate in a vacuum chamber is proposed in Japanese Patent Publication No. 57-27009. However, because the aforesaid sheets are composed of thermoplastic resins, the hardness of the coating formed on the surface of the substrate is poor, and consequently such coatings are easily scratched.

As a remedy for this shortcoming, methods for forming coatings of high surface hardness by hardening of the sheet after adhesion to the substrate have been proposed. Japanese Patent Publication No. 57-13425 discloses a type of composite sheet consisting of an initiator-impregnated sheet (which is obtained by impregnating a porous sheet base material with a radical initiator) laminated with a sheet containing a polymer and a radical reactive monomer. Japanese Patent Publication No. 60-21630 proposes a self-supporting sheet composed principally of thermoplastic resin and/or rubber, with ingredients that include a powder containing a radical reactive unsaturated compound (which is solid at ordinary temperatures) and a powder containing a radical initiator (which is also solid at ordinary temperatures).

The uniform hardening of the composite sheet described in the aforesaid Japanese Patent Publication No. 57-13425 requires that heating and pressurization be used to effect uniform contact between the components contained in the two layers of the said composite sheet; however, control of the heating and pressurization processes is difficult, and accordingly, formation of a uniformly hardened coating is difficult. Moreover, substances such as paper, woven cloth, or unwoven fabric are to be used as the basic material to be impregnated by the radical initiator. The elongation of this sort of base material is difficult. Therefore, when this sheet is used for covering the surfaces of curved or irregular substrates, wrinkles are easily formed. That is, with use of this type of sheet, wrinkle-free coatings are formed with difficulty on substrate surfaces.

For the sheet described in the aforesaid Japanese Patent Publication No. 60-21630, because the sheet is readily extensible, its application to irregular or curved surfaces should be possible. This sheet incorporates a powder containing a radical reactive unsaturated compound and a powder containing a radical initiator, but they do not come into direct contact within the thermoplastic resin layer. By heating of the sheet, the two powders and the resin are fused together, thereby effecting hardening of the sheet. Consequently, the quality of the sheet is dependent on the grain size of the powder and the uniformity of mixing of this powder. In the process of the manufacture of this sheet, because the two powders start to react when brought into contact at high temperatures, each powder must be refrigerated when the crushing and mixing are performed. Uniform mixing of the two powders is difficult, so the reaction induced by heating the sheets so obtained tends to be nonuniform. As a result, nonuniform covering coatings are liable to be formed, which detracts from the external appearance of such coatings.

In Japanese Patent Publication No. 61-61873, a sheet made of a composition containing a photocrosslinking acrylic polymer and a photosensitizer is proposed. The substrate is covered with this type of sheet and then the sheet is hardened by irradiation. However, if this type of sheet is used to cover objects with irregular or curved surfaces, then the sheet cannot be uniformly irradiated, and therefore a uniformly hardened coating is not obtained.

The following functions and characteristics are also desired in sheets used for coating objects.

(1) The sheet can provide rustproofing protection to a metallic substrate when the sheet is applied on the substrate.

(2) The desired gloss can be imparted to the sheet surface.

Hitherto, methods have been known whereby the gloss on the sheet surface is modified by transferring the desired irregularities from process paper to the said sheet surface. However, in this method, when the sheet is hardened by heating, the resin of the surface portion of the sheet is melted, and therefore a sheet with the desired gloss is difficult to obtain.

(3) Photochromic properties can be imparted to the sheet.

Japanese Patent Publication No. 57-10913 discloses an adhesive coating consisting of a plastic coating with a layer of an adhesive agent containing a photochromic compound. However, because this adhesive coating is based upon a coating of soft plastic, the surface of the sheet is of low hardness and is easily scratched.

(4) The sheet is not prone to having dust adhere to it; or, the sheet is electrically conductive.

Electrically conductive coating materials have been known for some time. For example, there are antistatic agents applied to plastic or metal articles, sealers used for electroplated objects, coatings for electronic materials used for electrodes, volumes, condensers, and printing of circuit boards, and others.

Japanese Laid-Open Patent Publication No. 60-219270 discloses a type of coating material or sheet that contains a binder and an electrically conductive powder, and is hardened by light, other radiation, electron beams, etc. By use of this type of coating material or sheet, coatings with high strength and hardness as well as excellent electrical conductivity and transparency can be formed.

However, when the coating materials disclosed in this patent publication are used, solvents are required, and therefore, as previously mentioned, the working environment deteriorates, or a long time is necessary for the removal of the solvent. On the other hand, if the said type of sheet is used, then, because these sheets are not flexible, application to substrates with curved surfaces is difficult.

(5) Dew should not condense on the sheet surface.

Japanese Patent Publication No. 62-205171 proposes a type of coating material prepared by formulating a highly water-absorbant resin in a hydrophilic or oilphilic solvent. However, the applied coating material should be dried to remove the solvent, and therefore, the working environment deteriorates, or the removal of the solvent prolongs the processing time.

(6) After hardening, the surface of the sheet should resist soiling. (7) The sheet should have an attractive external appearance and excellent physical properties. Japanese Laid-Open Patent Publication No. 62-16930 proposes a type of colored coating with a attractive external appearance and excellent weather resistance, fabricated by laminating a colored layer containing an unsaturated polyester polyol and a transparent layer composed of a cross-linked polymer composition.

Because the transparent layer is laminated onto the surface of a colored layer in this type of colored coating, the external appearance of the coating gives an impression of depth. However, the colored film is prepared by applying a colored plastic layer onto the surface of a hardened transparent plastic layer, so the coating lacks ductility and malleability. Consequently, wrinkles are liable to form when this coating is used to cover a substrate with an irregular surface.

Japanese Laid-Open Patent Publication No. 62-271735 discloses a sheet obtained by consecutive lamination of a surface layer composed of a thermoplastic resin composition and a colored layer composed of a crosslinking polymer composition containing metallic powder and/or a coloring agent onto a smooth release sheet with mold-releasing characteristics. However, this type of sheet also lacks extensibility.

Japanese Laid-Open Patent Publication No. 58-57472 proposes a type of sheet with a surface layer principally composed of semihardened resin and a base layer principally composed of hot melt resin. Adhesiveness is imparted to the base layer of this sheet by heating. However, heating is required when the sheet is applied to the surface of the substrate, so working characteristics are poor. Moreover, raising the temperature of an object that has been covered with such a sheet causes peeling at the margin of the sheet.

SUMMARY OF THE INVENTION

A thermosetting covering sheet, which overcomes the above-discussed and numerous other disadvantages and deficiencies of the prior art, comprises an unhardened or semihardened layer made of a thermosetting resin composition, wherein said thermosetting resin composition comprises, as main ingredients, a reactive acrylic resin, which is in the solid state at ordinary temperatures, and a blocked isocyanate, said reactive acrylic resin containing a plurality of at least one kind of functional group selected from the group consisting of hydroxyl, amino, and carboxyl, and the weight average molecular weight of said reactive acrylic resin being in the range of 100,000 to 1,000,000.

In order to increase flexibility, ductility, and malleability, the aforesaid thermosetting resin composition can further comprise a reactive acrylic oligomer and/or a thermoplastic acrylic resin. The said reactive acrylic oligomer contains a plurality of at least one kind of functional group selected from the group consisting of hydroxyl, amino, and carboxyl, with the weight average molecular weight of said reactive acrylic resin being in the range of 1,000 to 10,000.

Moreover, in order to increase toughness and maintain the sheet form, the aforesaid thermosetting resin composition can further comprise at least one kind of crosslinking agent selected from the group consisting of an unblocked isocyanate, a melamine-type crosslinking agent, and an epoxy-type crosslinking agent. In thermosetting resin compositions containing the aforesaid crosslinking agent, a portion of the reactive acrylic resin reacts with the crosslinking agent at ordinary temperatures or the temperature at which the sheet is prepared.

In order to impart various functions or characteristics to the present type of thermosetting covering sheet, the aforesaid thermosetting resin composition can further comprise electrically conductive substances, anticondensation agents, photochromic compounds, granular gloss control agents, antirust agents, etc.

The thermosetting covering sheet can also be formed from multiple layers. For example, a surface layer is disposed on one surface of the base layer as required. The thermosetting resin composition forming the said surface layer comprises a reactive acrylic resin that is in the solid state at ordinary temperatures and a blocked isocyanate as the principal components. The reactive acrylic resin contains a plurality of at least one kind of functional group selected from the group consisting of hydroxyl, amino, and carboxyl groups, with the weight average molecular weight of said reactive acrylic resin being in the range of 20,000 to 1,000,000.

On a surface of the base layer, an adhesive layer is disposed as required. The adhesive layer is made of a thermosetting adhesive composition comprising a reactive acrylic oligomer and a blocked isocyanate, said reactive acrylic oligomer containing a plurality of at least one kind of functional group selected from the group consisting of hydroxyl, amino, and carboxyl groups.

The present invention also includes a method for covering a substrate with the aforesaid type of thermosetting covering sheet and thereby forming a hard coating on the surface of the substrate.

In a preferred embodiment, the method comprises the steps of heating the substrate to 50° C. or more, and placing the thermosetting covering sheet on the surface of said heated substrate to harden said sheet, resulting in a hard coating on the substrate.

In a preferred embodiment, the method comprises the steps of placing the thermosetting covering sheet on the surface of a substrate, comprising the steps of: placing the thermosetting covering sheet on the surface of a substrate with a gap therebetween; making the sheet adhere to said surface of the substrate under reduced pressure; and heating the coated substrate to harden the sheet, resulting in a hard coating on the substrate.

In a preferred embodiment, the method comprises the steps of pressing the thermosetting covering sheet onto the surface of the substrate so that the sheet adheres to the surface of the substrate, and heating the coated substrate to harden said sheet, resulting in a hard coating on the substrate.

In a preferred embodiment, the method comprises the steps of lining the inner wall of a mold with the thermosetting covering sheet, and injecting a heated material for forming the substrate into said mold to form the substrate with a hard coating thereon.

Thus, the present invention described herein makes possible the objectives of:

(1) providing thermosetting covering sheets that have excellent ductility, malleability, and flexibility before hardening, and which can therefore be overlaid onto substrates with irregular or curved surfaces without wrinkling;

(2) providing thermosetting covering sheets that can form uniform coatings of high hardness after an appropriate hardening process;

(3) providing thermosetting covering sheets that do not undergo hardening during storage;

(4) providing thermosetting covering sheets possessing varied functional characteristics, as follows: electrically conductive sheets; sheets free from adhesion by dust; sheets free from dew condensation; sheets with photochromic characteristics; sheets with the desired degree of surface gloss; and sheets resistant to soiling;

(5) providing sheets permitting the formation of coatings with an impression of depth; and (6) providing a method for the formation of hard coatings on substrate surfaces such that no air enters between the sheet and the substrate, and no wrinkling occurs.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
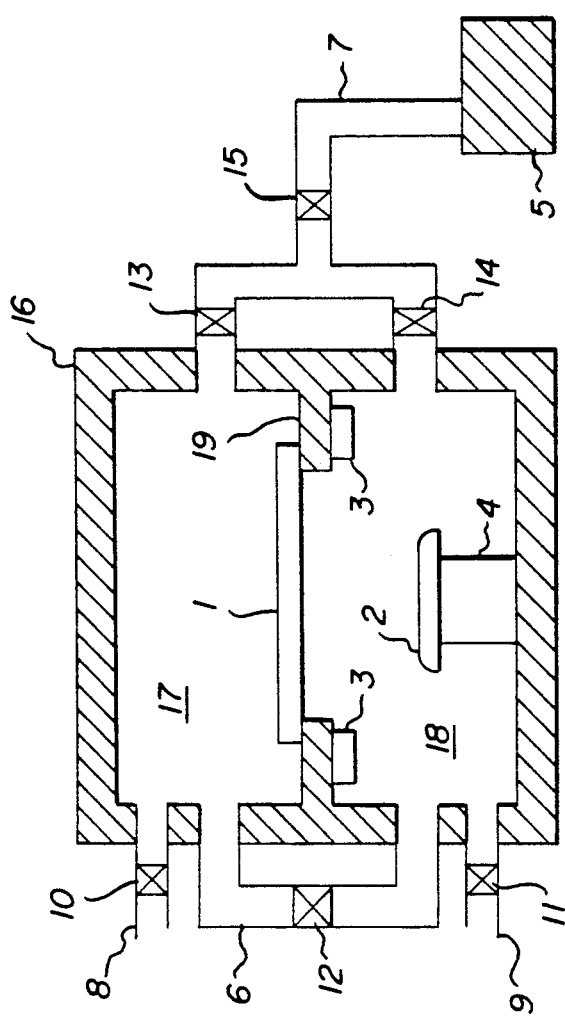
FIG. 1 is an schematic diagram illustrating a process for forming a hard coating on a stainless steel substrate in a vacuum-forming machine using the thermosetting covering sheet of the present invention.

The thermosetting covering sheet of the present invention has a layer made of a thermosetting resin composition containing a reactive acrylic resin that is in the solid state at ordinary temperatures and a blocked isocyanate as the principal components. Before heating, this layer is in an unhardened or semihardened state, and therefore possesses adequate ductility, malleability, and flexibility. Therefore, if the said sheet is made of such a layer alone, then the sheet as a whole will possess ductility, malleability, and flexibility before heating. The sheet is overlaid onto a substrate, and the temperature is raised above the reaction temperature of the blocked isocyanate (i.e., the elimination temperature of the blocking agent in the blocked isocyanate). Then, the blocking agent is eliminated and the isocyanate groups from the blocked isocyanate react with the functional groups of the reactive acrylic resin, thereby hardening the sheet. Therefore, when heat is applied to the sheet that has been overlaid onto the substrate, a hard coating is formed on the surface of the substrate.

The thermoplastic resin contained in the thermosetting resin composition is used in order to obtain sheets with appropriate hardness as well as ductility, malleability, and flexibility. Moreover, if a reactive acrylic oligomer is included in the composition, then the sheet so obtained will possess still greater ductility, malleability, and flexibility. The reactive acrylic resin used in the present invention is an acrylic polymer having at least one kind of functional group selected from the group consisting of hydroxyl, amino, and carboxyl groups. This reactive acrylic resin is in the solid state at room temperature (i.e., 25° C.).

This type of reactive acrylic resin can be obtained by copolymerization in the presence of an initiator (e.g., various peroxides or chain transfer agents) of at least one of the types of acrylic monomers to be listed below, together with either a (meth)acrylic ester other than the above-mentioned acrylic monomers, a styrene-derivative monomer, or a maleic acid derivative monomer. As the aforesaid acrylic monomer, at least one may be selected as appropriate from the group consisting of (meth)acrylic monomers containing hydroxyl groups, such as 2-hydroxyethyl (meth)acrylate, 4-hydroxybutyl (meth)acrylate, etc.; (meth)acrylic monomers containing amino groups, such as 2-aminoethyl (meth)acrylate, 3-aminopropyl-(meth)acrylate, etc.; and (meth)acrylic monomers containing carboxyl groups, such as (meth)acrylic acid, etc. As examples of the aforesaid reactive acrylic resin, (a) acrylic polyols containing hydroxyl groups, (b) acrylic polyamines containing amino groups, (c) acrylic polycarboxylic acids containing carboxyl groups, and (d) acrylic resins containing different kinds of functional groups can be listed.

The acrylic polyols (a) can be obtained by copolymerization of the aforementioned (meth)acrylic esters containing hydroxyl groups with at least one selected from the group consisting of (meth)acrylic esters other than the above-mentioned (meth)acrylic esters containing hydroxyl groups, styrene-derivative monomers, and maleic acid derivative monomers.

The acrylic polyamines (b) can be obtained by copolymerization of the aforementioned (meth)acrylic esters containing amino groups with at least one selected from the group consisting of (meth)acrylic esters other than the above-mentioned (meth)acrylic esters containing amino groups, styrene-derivative monomers, and maleic acid derivative monomers.

The acrylic polycarboxylic acids (c) can be obtained by copolymerization of the aforementioned (meth)acrylic esters containing carboxyl groups with at least one selected from the group consisting of (meth)acrylic esters other than the above-mentioned (meth)acrylic esters containing carboxyl groups, styrene-derivative monomers, and maleic acid derivative monomers.

The acrylic resins (d) containing different kinds of functional groups can be obtained by copolymerization of at least two monomers, each having different functional groups, selected from the aforementioned monomers, with at least one monomer selected from the group consisting of (meth)acrylic esters other than the two monomers, styrene-derivative monomers, and maleic acid derivative monomers.

The (meth)acrylic esters other than the (meth)acrylic esters having functional groups used for the above-mentioned polymers (a)-(d) include methyl (meth)acrylate, ethyl (meth)acrylate, benzyl (meth)acrylate, 2-ethoxyethyl (meth)acrylate, phenoxy diethylene glycol (meth)acrylate, etc. The abovementioned styrene-derivative monomer includes styrene, alpha-methylstyrene, alpha-ethylstyrene, p-methylstyrene, p-methoxystyrene, p-phenylstyrene, p-ethoxystyrene, p-chlorostyrene, m-chlorostyrene, o-chlorostyrene, etc.

Reactive acrylic resins with various weight average molecular weight (Mw) are used in accordance with the specific conditions of the polymerization reaction that is effected by use of the aforesaid reaction initiator. The weight average molecular weight of the reactive acrylic resin used in the present invention is in the range of from 100,000 to 1,000,000. When the weight average molecular weight is lower than 100,000, the product is difficult to maintain in sheet form; moreover, when the sheet is extended and overlaid onto the substrate, adequate extension cannot be achieved, and cracks may develop. On the other hand, when a thermosetting resin composition containing a reactive acrylic resin with a weight average molecular weight exceeding 1,000,000 is used, preparation of the sheet is difficult. For example, if the sheet is prepared by the solvent casting method, then the viscosity of the solution becomes unduly high, and therefore casting cannot be accomplished unless a solution of low polymer concentration is used, hence, a relatively thick sheet is difficult to obtain. The preferred ranges of the glass transition point Tg and the functional group value (i.e., the sum of the hydroxyl, amino, and carboxyl values) of these reactive acrylic resins are chosen according to the desired hardness of the coating formed by hardening of the said sheet. For example, when the hardness of the coating obtained by hardening of the sheet is required to be of grade B or of higher quality (at 23° C.) according to the pencil test, then a reactive acrylic resin with Tg in the range of −30° to 80° C. and a functional group value in the range of 20 to 200 are desirable. When the hardness of the coating need not be very high, for example, grade 2B or lower (at 23° C.) by the pencil test, then a reactive acrylic resin with parameters outside the above-mentioned ranges can also be used. The aforesaid amino value can be found by measuring the quantity of amino groups in the reactive acrylic resin used in polymerization, by method similar to that used in the measurement of the hydroxyl values, or found by measurement of the hydroxyl groups obtained by conversion of amino groups into hydroxyl groups with nitrous acid. The carboxyl value can be found by measuring the quantity of carboxyl groups in the reactive acrylic resin used in polymerization, by method similar to that used in the measurement of hydroxyl values, or by titrating the carboxyl groups with potassium hydroxide, etc.

The aforesaid reactive acrylic resin can be obtained by block polymerization of a reactive acrylic resin of low molecular weight with another polymer or monomer, or alternatively by graft copolymerization. The above-mentioned other polymers or monomers can be any of various substances with good compatibility with acrylic type materials, such as acrylic, styrenic, maleic, or imidic compounds. These materials can also be used in combination with silicones or fluorated compounds, etc. In such cases, the weight average molecular weight of the aforesaid polymer is in the above-mentioned range of from 100,000 to 1,000,000, or alternatively, the weight average molecular weight of the mixture of the aforesaid reactive acrylic resin and the copolymer is in the above range. In the latter case, the adhesive strength between the sheet and the substrate can be adjusted to the desired level by use of a resin of high or low molecular weight, as appropriate. In particular, this is advantageous for the purpose of adjusting the adhesive force between the sheet and the surfaces of substrates composed of polymers such as melamine resins, epoxy resins, phenol resins, polycarbonate, acetal resins, polyolefines, etc.

The blocked isocyanate that is included in the aforesaid thermosetting resin composition is used principally as a thermosetting hardening agent to effect the hardening of the aforesaid reactive acrylic resin. The term "blocked isocyanate" used herein refers to a compound obtained by blocking of the isocyanate groups of an isocyanate compound with at least two isocyanate groups per molecule with any blocking agent such as phenols, oximes, epsiloncaprolactam, malonic esters, etc. Among the substances that can be used as the aforesaid isocyanate compound are, for example, monomers such as tolylene diisocyanate, diphenylmethane diisocyanate, hexamethylene diisocyanate, isophorone diisocyanate, etc.; addition compounds of one of the monomers with trimethylol propane, modified compounds of a monomer having isocyanurate moieties, or modified compounds of a monomer having carbodiimide moieties, etc. When the blocked isocyanate is heated, the aforesaid blocking agents are removed. The deblocked isocyanate groups react with the functional groups of the reactive acrylic resin, and the said acrylic resin is thereby cross-linked by the said isocyanate compounds. The relative content of the blocked isocyanate should be such that the ratio of the number of isocyanate groups in the said blocked isocyanate to the number of functional groups in the reactive acrylic resin (number of isocyanates/number of functional groups) falls within the range of 0.5 to 2.0, and more preferably in the range of 0.8 to 1.2. The number of functional groups is the sum of the number of hydroxyl, carboxyl, and amino groups.

As described below, when the composition further comprises reactive acrylic oligomers or other reactive compounds, then the content of blocked isocyanates should be such that the ratio of the number of isocyanate groups in the said blocked isocyanate to the total number of functional groups in the reactive acrylic resin, reactive acrylic oligomer, and other reactive compounds (number of isocyanate values/number of functional groups) falls within the range of 0.5 to 2.0, and more preferably in the range of 0.8 to 1.2.

To impart still greater ductility, malleability, and flexibility to the sheet, the thermosetting resin composition may also comprise, reactive acrylic oligomers containing a plurality of at least one kind of functional group selected from the group consisting of hydroxyl, amino, and carboxyl groups, as required.

Like the previously mentioned reactive acrylic resin, the reactive acrylic oligomer should possess a plurality of at least one kind of the functional groups mentioned above. This reactive acrylic oligomer should be a solid or a solid solution at ordinary temperatures.

Specific examples of reactive acrylic oligomers suitable for the present purpose include (e) acrylic polyol oligomers with hydroxyl groups, (f) acrylic polyamine oligomers with amino groups, (g) acrylic polycarboxylic oligomers with carboxyl groups, and (h) acrylic oligomers with different kinds of functional groups.

Acrylic polyol oligomers (e) can be obtained by copolymerization of the above-mentioned (meth)acrylic esters with (meth)acrylic esters containing hydroxyl groups. The latter category includes, for example, 2-hydroxyethyl (meth)acrylate, 3-hydroxypropyl (meth)acrylate, 4-hydroxybutyl (meth)acrylate, and the like.

Acrylic polyamine oligomers (f) can be obtained by copolymerization of the aforesaid (meth)acrylic esters and (meth)acrylic esters containing amino groups. The latter category includes 2-aminoethyl (meth)acrylate, 3-aminopropyl (meth)acrylate, 4-aminobutyl (meth)acrylate, and the like.

Acrylic polycarboxylic oligomers (g) can be obtained by copolymerization of the above-mentioned (meth)acrylic esters and (meth)acrylic esters having carboxyl groups such as (meth)acrylic acid.

Acrylic oligomers (h) with different kinds of functional groups can be obtained by copolymerization of at least two varieties of the aforesaid monomers, each having different functional groups, and a (meth)acrylic ester monomer.

Thus, as in the case of the reactive acrylic resin mentioned previously, a reactive acrylic oligomer is obtained by copolymerization of at least two varieties of monomers. When the reactive acrylic oligomer is prepared, much more chain transfer agent is added than in the preparation of the above-mentioned reactive acrylic resin. The weight average molecular weight of the acrylic oligomer used should preferably be in the range of from 1,000 to 10,000. If the weight average molecular weight of the reactive acrylic oligomer is lower than 1,000, the substance obtained has poor formability, and handling of the sheet is difficult. On the other hand, if the weight average molecular weight exceeds 10,000, then formability is poor because the sheet lacks flexibility. In consideration of the formability of the sheet that is finally obtained and of the hardness of the coating obtained after hardening, this reactive acrylic oligomer should have a glass transition point in the range of $-50°$ to $40°$ C. and the functional group value (i.e., the sum of the hydroxyl, amino, and carboxyl values) in the range of 40 to 250. The reactive acrylic oligomer should be contained in a proportion of 1 to 200 parts by weight, and more preferably 10 to 100 parts by weight. for every 100 parts by weight of the solid amount of the reactive acrylic resin. When the amount of the reactive acrylic oligomer is relatively small, no appreciable improvement in the flexibility of the sheet can be expected. Conversely, when the amount of reactive acrylic oligomer is unduly large, then the viscosity drops, fluidity increases, and the sheet form is difficult to maintain. If the weight average molecular weight of each reactive acrylic oligomer falls within the above-mentioned range (i.e., 1,000 to 10,000), then several varieties of reactive acrylic oligomers can be used in combination.

To further improve the flexibility of the thermosetting covering sheet and thereby reduce the occurrence of cracks and facilitate the handling of the sheet, a thermoplastic acrylic resin (not reactive) may also be included in the sheet constituents.

The term "thermoplastic acrylic resin" used herein refers to polyacrylic esters, and ordinarily, polymethyl methacrylate or a copolymer of methyl methacrylate and another monomer is to be used. Acrylic ester polymers other than those listed above can also be used in some cases, and furthermore, blends of these substances can also be used. The thermoplastic acrylic resin is contained in a proportion of 1 to 30 parts by weight, and more preferably 5 to 20 parts by weight, for every 100 parts by weight of the solid content of the reactive acrylic resin. If the amount of thermoplastic acrylic resin is less than 1 part by weight, then no appreciable improvement in the flexibility of the sheet can be expected, whereas, if the proportion added exceeds 30 parts by weight, then the hardness of the sheet after the hardening process is low. The aforesaid reactive acrylic oligomer and thermoplastic acrylic resin can be used either singly or in combination.

The thermosetting resin composition can also comprise least one crosslinking agent selected from the group consisting of unblocked isocyanates, melamine-type crosslinking agents, and epoxy-type crosslinking agents. These types of crosslinking agents react with the functional groups of reactive acrylic resins at ordinary temperatures. Therefore, by appropriate adjustment of the amount of the crosslinking agent, the said crosslinking agent can be caused to react with a portion of the reactive acrylic resin, thereby obtaining a semihardened sheet (i.e., in the B-stage). This semihardened sheet is tough and has an appropriate consistency. Therefore, cracks do not develop when the substrate is covered with this sheet. Moreover, because the thickness of the sheet so obtained is uniform, the final hardened coating is of excellent smoothness.

The above-mentioned unblocked isocyanate is an isocyanate compound with at least two isocyanate groups per molecule. The isocyanate compounds include tolylene diisocyanate, diphenylmethane diisocyanate, naphthalene diisocyanate, tolidine diisocyanate, triphenylmethane triisocyanate, tris(isocyanatephenyl) thiophosphite, p-phenylene diisocyanate, xylylene diisocyanate, bis(isocyanatemethyl) cyclohexane, dicyclohexylmethane diisocyanate, hexamethylene diisocyanate, lysine diisocyanate, trimethylhexamethylene diisocyanate, and isophorone diisocyanate. The isocyanate compounds also include various derivatives of these isocyanates, such as trimethylol propane adducts, modified compounds with isocyanurate moieties, modified compounds with biuret moieties, modified compounds with carbodiimide moieties, modified compounds with urethane moieties; modified compounds with allophanate moieties, and the like.

The amount of this unblocked isocyanate should preferably be such that the ratio of the number of NCO groups in the isocyanate to the number of functional groups in the reactive acrylic resin (number of NCO/- number of functional groups) is in the range of 0.01 to 0.9. The amount of the aforesaid isocyanate is adjusted to the desired proportion in accordance with the method used for causing the sheet finally obtained to adhere to the substrate.

The term "melamine-type crosslinking agent" cited above refers to etherified melamine resins obtained by a reaction between compounds such as trimethylolmelamine, hexamethylolmelamine, dimethylolurea, dimethylolguanidine, dimethylolacetoguanamine, dimethylolbenzoguanamine, etc. (referred to hereinafter as compound M), and an alcohol (e.g., butanol, propanol, etc.). The aforesaid compound M is obtained by a reaction between a compound containing amino groups and formaldehyde. The compound containing amino groups includes melamine, urea, thiourea, guanidine, guanamine, acetoguanamine, benzoguanamine, dicyandiamide, etc.

The proportion of these melamine crosslinking agents contained in the composition is not specified, although the isocyanate is, with relation to the number of functional groups in the reactive acrylic resin, and should desirably be decided by preliminary experiments before the preparation of the sheets. When the melamine crosslinking agent is included in the composition, the amount should preferably be such that the ratio of the number of OR (ether) groups in the melamine crosslinking agent to the number of functional groups in the reactive acrylic resin (number of OR/number of functional groups) is in the range of 0.1 to 1.2.

The term "epoxy crosslinking agent" mentioned above refers to glycidyl compounds of polyhydric alcohols. These epoxy crosslinking agents can provide a more effective crosslinking reaction when used in combination with Lewis acid catalysts. The epoxy crosslinking agent includes compounds with glycidyl groups, such as the diglycidyl ester obtained from butadienedioxide and phthalic acid, the diglycidyl ester obtained from hexadienedioxide and phthalic acid, the diglycidyl ether of bisphenol A, the diglycidyl ether of bisphenol F, the triglycidyletheramine of p-aminophenol, the diglycidylether of aniline, the tetraglycidylether of phenylenediamine, the diglycidylether of sulfonamide, the triglycidylether of glycerin, polyethers with glycidyl groups, polyesters with glycidyl groups, and polyurethanes with glycidyl groups.

The relative amount of this epoxy crosslinking agent should be such that the ratio of the number of epoxy groups in the said crosslinking agent to the number of functional groups in the reactive acrylic resin (number of epoxy groups/number of functional groups) falls within the range of 0.01 to 0.9. This epoxy crosslinking agent reacts with the functional groups of the reactive acrylic resin, and the epoxy groups are changed into hydroxyl groups. Therefore, the amount of the blocked isocyanate contained in the composition is preferably corresponds to the sum of the number of functional groups in the reactive acrylic resin other than those that react with the aforesaid crosslinking agent plus 30-80% of the number of hydroxyl groups formed as mentioned above.

The amount of each of the aforesaid crosslinking agents should preferably lie in the abovestated range, but nevertheless the amount actually added should desirably be decided on the basis of preliminary experiments. This is because side reactions may occur, for example, there can be mutual reactions among melamine crosslinking agents, reactions between melamine and epoxy crosslinking agents, reactions between the products produced by these reactions and the reactive acrylic resin, etc.

In accordance with specific needs, the following substances may also be added to the thermosetting resin composition used for the present invention.

I) Reactive vinyl monomers
II) Peroxides
III) Photosensitizers
IV) Thermoplastic resins other then acrylic resins
V) Pigments, dyes, or other colorants
VI) Antioxidants
VII) Antifungal agents
VIII) Fillers Among the aforesaid materials, the peroxides are used together with the aforesaid reactive vinyl monomers. The photosensitizers are also used together with the reactive vinyl monomers. Either peroxides or photosensitizers may be used by themselves, or a mixture may be used.

When a photosensitizer and a reactive vinyl monomer are included, the constituents can be hardened not only by heat but also by irradiation with light. Consequently, after the substrate surface is covered with the sheet, a hard coating can be formed by either heat or irradiation or both.

Substances such as (meth)acrylic monomers or styrenic monomers, which are compatible with the aforesaid reactive acrylic resin, are suitable for use as the aforesaid reactive vinyl monomer (I).

The acrylic vinyl monomers include monofunctional monomers such as methyl (meth)acrylate, ethyl(meth)acrylate, benzyl(meth)acrylate, 2-ethoxyethyl(meth)acrylate, phenoxydiethylene glycol(meth)acrylate, and the like; multifunctional monomers such as 1,6-hexanediol di(meth)acrylate, neopentyl glycol di(meth)acrylate, polyethylene glycol di(meth)acrylate, polypropylene glycol di(meth)acrylate, trimethylpropane tri(meth)acrylate, pentaerythritol tri(meth)acrylate, pentaerythritol tetra(meth)acrylate, dipentaerythritol hexa(meth)acrylate, and the like. The styrene-type vinyl monomers include styrene, α-methylstyrene, α-ethyl styrene, p-methyl styrene, p-methoxy styrene, p-phenoxy styrene, p-ethoxy styrene, p-chlorostyrene, m-chlorostyrene, o-chlorostyrene, and the like.

The quantities of these reactive vinyl monomers to be added should be in the range of 20 to 300 parts by weight, and more preferably, 40 to 200 parts by weight, for each 100 parts by weight of the solid total amount of reactive acrylic resin (or, in the case that thermoplastic acrylic resins and/or reactive acrylic oligomers are included, the sum of the reactive acrylic resin and the thermoplastic acrylic resin and/or reactive acrylic oligomer) plus the solid amount of blocked isocyanate. Two or more varieties of reactive vinyl monomers may be used in combination.

Ordinary organic peroxides can be used as the aforesaid peroxides (II). Because the sheets so obtained must be stable when stored at ordinary temperatures, the use of organic peroxides with decomposition temperatures above 160° C. is more desirable. The organic peroxides include 2,2-di(t-butylperoxy)butane, t-butylperoxybenzoate, di(t-butylperoxy)isophthalate, methyl ethyl ketone peroxide, dicumenyl peroxide, t-butylperoxy acetate, and the like. The amount of peroxide added should desirably fall within the range of 0.5 to 2.0 parts by weight for each 100 parts by weight of the reactive vinyl monomer. Also, the use of peroxides is not restricted to one variety; two or more varieties can be used in combination.

As the aforesaid photosensitizers (III), the types generally employed can be used here, for example, benzoin alkyl ethers, acetophenone analogs, benzophenone analogs, thioxanthone analogs, etc., are suitable for the present invention. The benzoin alkyl ethers include benzil, benzoin, benzoin methyl ether, benzoin ethyl ether, benzoin isopropyl ether, and the like. The acetophenone analogs include 2,2'-diethoxyacetophenone, 2,2'-dibutoxyacetophenone, 2-hydroxy-2-methylpropiophenone, p-t-butyl trichloroacetophenone, and the like. The benzophenone analogs include benzophenone, 4-chlorobenzophenone, 4,4'-dichlorobenzophenone, 3,3'-dimethyl-4-methoxybenzophenone, dibenzosuberenone, and the like. The thioxanthone analogs include thioxanthone, 2-chlorothioxanthone, 2-methylthioxanthone, 2-isopropylthioxanthone, 2-ethylanthraquinone, and the like. The amount of photosensitizer added should desirably fall within the range of 0.5 to 2.0 parts by weight for each 100 parts by weight of the reactive vinyl monomer. Also, the use of photosensitizers is not restricted to one variety; two or more varieties may be used in combination.

As the aforesaid non-acrylic thermoplastic resins (IV), various resins with compatibility with reactive acrylic resins can be used. For example, polyester, polyvinylidene fluoride, polystyrene, and polyvinyl chloride resins are appropriate for this purpose. The thermoplastic resins used should preferably be solid at ordinary temperatures.

The types of pigments and dyes generally included in various existing coating materials can be used as the aforementioned colorants (V).

Specific types of pigments suitable for the present invention include titanium oxide, iron oxides, carbon black, cyanine pigments, quinacridone pigments, etc.; suitable dyes include azo dyes, anthraquinone dyes, indigoid dyes, stilbene dyes, etc. Metallic powders such as aluminum flakes, nickel powder, gold powder, silver powder, etc., can also be used as colorants. When sheets of high opacity are to be manufactured, the total quantity of colorant should desirably fall within the range of 2 to 300 parts by weight for every 100 parts by weight of the resin solids used.

The aforesaid antifungal agents (VII) suitable for the present invention include, for example, pentachlorophenol, sodium pentachlorophenolate, parachlorometaxylenol, etc. Also, metallic materials such as silver supported by porous granular carriers can be used.

The types of antioxidants and fillers ordinarily employed in coating materials can be used as the aforesaid antioxidants (VI) and fillers (VIII), respectively, in the present sheets.

To impart various special functions and characteristics to the thermosetting covering sheets of the present invention, the following types of functional modifiers (materials imparting certain desired properties to the sheets) may also be included in the thermosetting resin composition.

[A] Electrically conductive materials
[B] Anticondensation agents
[C] Photochromic compounds
[D] Granular gloss control agents
[E] Antirust agents
[F] Fluorine compounds If the aforesaid electrically conductive material A is contained in the thermosetting resin composition, then the surface and volume resistivity of the sheet will be reduced. Adherence of dust can be prevented if the volume resistivity is $10^8$ $\Omega\cdot$cm or less, and if the volume resistivity is $10^{-2}\Omega\cdot$cm or less, then the sheet can be used as an electrically conductive material.

The electrically conductive substances that can be used for the present invention include, for example, carbon-based conductive materials such as carbon black, acetylene black, conductive channel black, superconductive furnace black, etc.; metals such as nickel, copper, silver, etc.; metallic compounds such as silver oxide, silver nitrate, tin oxides, zinc oxide, etc.; electron-transfer complexes composed of electron donors and acceptors, electrically conductive polymers such as polythiophenes, polypyrroles, etc.

The amount of electrically conductive material in the thermosetting resin composition will vary according to the kind of conductive material used; however, this proportion should desirably fall within the range of 1 to 350 parts by weight for every 100 parts by weight of the reactive acrylic resin solids. Addition of electrically conductive materials permits regulation of the surface and volume resistivity of the sheet. Therefore, the variety and amount of electrically conductive material added should be decided in accordance with the purpose, such as that of preventing adhesion of dust to the sheet surface, using the sheet as an electrical conductor, etc. The electrically conductive material should be chosen so that the sheet finally obtained possesses the desired resistivity and so that the proportion added falls within the aforesaid range with respect to the amount of the reactive acrylic resin. If this proportion is unduly small, then the desired electrical conductivity cannot be obtained, whereas if the proportion is unduly large, the required form of the sheet will be difficult to maintain.

When an electrically conductive material is used, the variety and amount of added colorant will be restricted by the specific type of electrically conductive material. For example, when a material such as carbon black is used for electrical conductivity, then because this material is black, the amount of this material must be reduced and the amount of colorant must be increased to obtain a sufficient coloring effect. If metallic granules with a particle diameter exceeding 0.2 $\mu$m are used, then because this size is similar to the wavelength of visible light, the said granules will scatter light, and the sheet will lose transparency and become whitish. Consequently, when such materials are used, the amount of colorant added must be sufficient to offset the coloring effect of the electrically conductive material. Use of a transparent material such as polyisothianaphthene is also recommended.

If the aforesaid anticondensation agent B is contained in the thermosetting resin composition, then moisture present on the surface of the hard coating obtained is absorbed to a sufficient extent and released when the sheet is dried, by which condensation of dew on the surface of the coating can be prevented.

The applicable types of anticondensation agents include porous inorganic substances and highly water absorbent resins. Among such porous inorganic substances, for example, pearlite, zeolite, diatomaceous earth. etc., can be listed. The aforesaid highly water absorbent resins, which have the property of absorbing about 1000 times their weight of water while undergoing gelation and/or swelling, include, for example, starch-acrylic acid graft polymers, crosslinked carboxymethyl celluloses, vinyl alcohol-acrylate copolymers, etc. The aforementioned compounds can also be used in combination.

When anticondensation agents are used, the proportion added should desirably be in the range of 5 to 500 parts by weight for each 100 parts by weight of the total solid quantity of the reactive acrylic resin and the blocked isocyanates. If the proportion is less than 5 parts by weight, then the moisture absorption and release effect (i.e., dewing prevention effect) is poor. Conversely, if the proportion exceeds 500 parts by weight, then the form of the sheet is difficult to maintain.

If the aforesaid photochromic compound C is included in the thermosetting resin composition, then, after hardening, the color of the sheet can be reversibly changed by irradiation with light such as ultraviolet rays.

Applicable types of photochromic compounds include both organic materials (e.g., spironaphthooxazine compounds, spiropyrane compounds, etc.) and inorganic materials. For example, the following compounds can be listed.

1. Spironaphthooxazine compounds: 1,3,3-trimethylnaphthooxazine, 1,3,3-trimethyl-6-nitronaphthooxazine, 1,3,3-trimethyl-7-nitronaphthooxazine, 1,3,3,6'-tetramethylnaphthooxazine, 1,3,3-trimethyl-7'-nitronaphthooxazine, 1-benzyl-3,3-dimethylnaphthooxazine, 1-benzyl-3,3-dimethyl-3'-methylnaphthooxazine, 1-benzyl-3,3-dimethyl-7'-nitronaphthooxazine, etc.

2. Spiropyran compounds: 1,3,3-trimethyl-5'-nitrobenzospiropyran, 1,3,3-trimethyl-6'-nitrobenzospiropyran, 1,3,3-trimethylnaphtospiropyran, 1,3,3-trimethyl-7'-nitronaphthospiropyran, etc.

3. Other compounds: silver halides, ZnS, $Hg_3S_2I_2$, etc.

Spirooxazine compounds are particularly suitable from the viewpoint of compatibility with reactive acrylic resins as well as durability and the heat-resistance required when thermal hardening is carried out. The amount of these photochromic compounds added should desirably be in the range of 0.5 to 10 parts by weight for each 100 parts by weight of the total amount of solid that is contained in the thermosetting resin composition. When the amount of the photochromic compound is less than 0.5 parts by weight, the degree of color change (from clear to colored, or from colored to clear) is small. Conversely, when the amount exceeds 10 parts by weight, the degree of coloration becomes too large; moreover, the deterioration of the photochromic compound proceeds more rapidly and the color-changing property lacks durability.

If the aforesaid granular gloss control agent D is included in the thermosetting resin composition, then, when the sheet is hardened by heating, the resin of the surface portion is melted, and the granules are exposed on the surface, whereby the desired gloss (light reflection) can be obtained.

Either organic or inorganic granules can be used as the gloss control agent. These granules should possess thermal resistance at temperatures higher than the reaction temperature of the blocked isocyanate contained in the composition. If the granules of the gloss control agent used are composed of some resin, then this resin should possess a glass transition point and melting point higher than the said reaction temperature. If the granules of the gloss control agent are composed of a non-resin substance, then the melting point and decomposition temperature of this substance should also be higher than the aforesaid reaction temperature. The shape of the granules is quite arbitrary, and may be spherical, polyhedral, etc. The mean diameter of the granules should desirably fall within the range of 0.1 to 30 $\mu m$. If the mean diameter of the granules is less than 0.1 $\mu m$, then light in the visible wavelengths is not affected and therefore gloss control cannot be achieved, whereas if the grain size exceeds 30 $\mu m$, then the diameter of the granules exposed on the surface is unduly large and therefore gloss control again becomes difficult.

Among the applicable types of gloss control agents, those with granules composed of organic materials include granules of organic pigments, thermosetting resins, thermoplastic resins, etc.

As organic pigments, the following substances are listed: azo pigments, which are substantially insoluble in water and organic solvents, and obtained by diazocoupling reaction of aromatic amines, such as Fast Yellow, Disazo Yellow, Disazo Orange, and Naphthol Red; phthalocyanine pigments such as copper phthalocyanine; lakes such as fanal lakes, tannin lakes, and catanol; isoindolinone pigments such as Isoindolino Yellowgreenish and Isoindolino Yellowreddish; quinacridone pigments; and perylene pigments such as Perylene Scarlet.

As the thermosetting resins, the following substances are listed: phenol resins, imide resins, melamine resins, furan resins, aniline resins, ketoneformaldehyde resins, alkyd resins, unsaturated polyester resins, epoxy resins, and fluorocarbon resins.

As the thermoplastic resins, the following substances are listed: liquid-crystal polymer, polyethersulfone (PES), polyetheretherketone (PEEK), polyphenylenesulfide (PPS), polyethylene, and polyolefins such as polypropylene.

Among the applicable types of gloss control agents, those with granules composed of inorganic materials include granules of inorganic pigments, metal oxides, metals, alloys, etc.

As the inorganic pigments, the following substances are listed: mica, lead white, minium, chrome yellow, silver chromate, ultramarine blue, cobalt oxide, titanium, dioxide, carbon black, titanium yellow, strontium chromate, zinc chromate, molybdate red, molybdate white, iron black, lithopone, emerald green, Guignet's green, cobalt blue, etc.

As the metal oxides, the following substances are listed: calcium carbonate, magnesium carbonate, glass, silica, alumina, zirconia, titania, magnesia, niobium oxide, silicon nitride, silicon carbide, ceramics, enamel, etc.

As the metals, the following substances are listed: iron, chromium, nickel, aluminum, lead, zinc, copper, etc. The use of the granules is not restricted to one variety; two or more varieties can be used in combination.

The type and method of the addition of the gloss control agent used varies according to whether the sheet is to be clear or colored. If the sheet is to be colored, then the gloss control agent used should be either clear or of a color that is the same as or similar to the intended color of the sheet. The gloss of the sheet surface can be controlled (i.e., the degree of luster can be regulated) by adjustment of the amount of gloss control agent that is used. A sheet with a multilayered laminated structure can be prepared, that has a transparent or colored gloss control layer containing the gloss control agent and a colored or printed base layer.

When the sheet is heated, the fusion of the resin constituents at the sheet surface exposes the gloss control agent, or otherwise the thickness of the layer of resin constituents diminishes so that the granules of gloss control agent are then situated close to the surface of the sheet. This permits regulation of the sheet surface luster. For this reason, the gloss control agent should desirably be composed of a substance having poor compatibility with acrylic resins.

These gloss control agents can be prepared by pulverizing the aforesaid resins or inorganic materials in a granulator and then sorting the granules with sieves, etc. The required resin granules can ordinarily be prepared by heating and melting the resin, and then, after cooling, crushing the resin at ordinary temperatures or under refrigeration with a granulator, and grading the crushed material with a centrifugal or air classifier.

The degree of gloss of the sheet (indicated by the gloss value) varies greatly according to the amount (by volume) of gloss control agent. Moreover, the gloss value is also governed to some extent by the molecular weight and glass transition point of the reactive acrylic resin contained in the sheet as well as by the variety and mean particle diameter of the gloss control agent. For example, if an acrylic polyol (weight average molecular weight of 250,000, and glass transition point of 20° C.) is used, and glass granules (0.5–5 $\mu$m; mean particle diameter, 2 $\mu$m) are added in the prescribed quantities, then the relationship between the amount of granules added and the gloss value of the sheet is as shown in Table 1.

TABLE 1

| Amount of glass granules (vol %) | Gloss value (60° $\theta$ gloss) |
|---|---|
| 0.5 | 90 |
| 2.0 | 85 |
| 5.0 | 80 |
| 10.0 | 65 |
| 30.0 | 30 |
| 50.0 | 10 |

If the aforesaid antirust agent E is contained in the thermosetting resin composition, then a rust prevention effect is obtained when the surface of a metallic substrate is covered with the sheet and the latter is hardened.

The antirust agent used for the present purpose should desirably be compatible with the material of the hardened sheet (i.e., acryl-urethane polymer), with lead and zinc compounds being particularly desirable.

The antirust agent includes minimum, lead white, lead suboxide, basic lead sulfate, basic lead chromate, calcium metaplumbate, zinc chromate, lead cyanamide, zinc white, zinc powder, barium chromate, etc.

The amount of antirust agent to be added varies according to the conditions under which the sheet is to be used. In general, in consideration of the degree of rust resistance required and the dispersibility of the antirust agent in the resin constituents, the quantity added should desirably be in the range of from 0.01 to 10 parts by weight for every 100 parts by weight of the solid quantity of the resin material.

If the above-mentioned fluorine compound is contained in the thermosetting resin composition, then the said fluorine compound bleeds onto the sheet surface when the sheet is hardened. This reduces the surface energy of the coating after hardening (i.e., the critical surface tension diminishes), and consequently, the soiling of the sheet surface can be prevented.

However, if fluorine compounds are added to the resin constituents, adhesion of the sheet to the substrate is weakened. Therefore, when fluorine compounds are added to the resin constituents, an adhesive layer should desirably be provided on a surface of the sheet.

The term "fluorine compound" used herein refers to a compound containing a group of the formula $C_nF_{2n+1}$; if the value of n is 6 or greater, then the water-repellent and oil-repellent effects are great. The category of applicable compounds with $C_nF_{2n+1}$ groups (designated hereinafter as Rf groups) includes compounds of low molecular weight (1,000 or lower) and those of high molecular weight.

The compounds of low molecular weight include
Rf—$C_2H_4OH$, Rf—$C_6H_5$, Rf—$C_2H_5$, Rf—$CH_2CH_2COOH$, Rf—$CH_2COOH$, Rf—$CH_2CH_2SCH_2COOH$, Rf—$CH_2SCH_2CH_2CH_2COOH$, Rf—$CH_2CH_2SCH_2COOH$, Rf—$(CH_2)_3COOH$, Rf—$(CH_2)_4COOH$, Rf—$(CH_2)_5COOH$, Rf—$(CH_2)_6COOH$, Rf—$SNHCH_2CH_2COOH$, Rf—$SNHCH_2COOH$, etc.

The compounds of high molecular weight include polymers obtained from acrylic monomers of the formula Rf—$C_2H_4OCOCH=CH_2$, such as
$C_7F_{15}C_2H_4OCOCH=CH_2$,
$C_7F_{15}C_2H_4OCOCCH_3=CH_2$,
$C_8F_{17}C_2H_4OCOCH_3C=CH_2$,
$C_8F_{17}C_2H_4)CH_2C_6H_4CH=CH_2$,
$C_7F_{15}C_2H_4C_6H_4CH=CH_2$, etc. Copolymers obtained from the acrylic monomer and other polymerizable monomers such as acrylic monomer, styrene monomer, or maleic monomer are also used. The compounds of high molecular weight also include polymers obtained from styrene monomers of the formula Rf—$C_2H_4C_6H_4CH=CH_2$, such as $C_7F_{15}$—$C_2H_4OCH_2C_6H_4CH=CH_2$, $C_8F_{17}$—$CH_2OC_2H_4C_6H_4CH=CH_2$, $C_8F_{17}$—$C_4H_8OC_6H_4CH=CH_2$, $C_8F_{17}$—$C_2H_4OC_2H_4C_6H_4CH=CH_2$, $C_8F_{17}$—$C_2H_4OCH_2C_6H_4CH=CH_2$, $C_9F_{19}$—$CH_2OC_2H_4C_6H_4CH=CH_2$, $C_7F_{15}$—$C_4H_6OC_6H_4CH=CH_2$, $C_7F_{15}$—$C_2H_4OC_2H_4C_6H_4CH=CH_2$, etc. Copolymers obtained from styrene monomer and other polymerizable monomers, such as styrene monomer, acrylic monomer, butadiene monomer, or maleic monomer, are also used.

The appropriate amount of fluorine compound varies according to the molecular weight of the reactive acrylic resin used.

(1) Fluorine compounds of low molecular weight (1,000 or lower).

As fluorine compounds of low molecular weight move easily within the reactive acrylic resin, addition of a comparatively small amount is sufficient. The proportion of such fluorine compounds should desirably be in the range of about 0.01 to 1 percent by weight based on the total weight of the thermosetting resin composition. If the proportion of the fluorine compounds is less than 0.01 percent by weight, then no appreciable water- or oil-repellency is imparted to the sheet; on the other hand, if the proportion exceeds 1 percent by weight, then an unduly large amount of fluorine compound bleeds onto the surface of the hardened coating, and the characteristics of the coating deteriorate.

(2) Fluorine compounds of weight average molecular weight in the range of 1,000 to 10,000.

The movement of fluorine compounds with a weight average molecular weight in the range of 1,000 to 10,000 within the reactive acrylic resin is relatively easy, so again, addition of a comparatively small amount is sufficient. The proportion of such fluorine compounds should desirably be in the range of about 0.05 to 5 percent by weight based on the total weight of the thermosetting resin composition. If the proportion of fluorine compounds is less than 0.05 percent by weight, then adequate water- or oil-repellency may not be imparted to the sheet; on the other hand, if the proportion exceeds 5 percent by weight, then the degree of the effect is no longer proportional to the quantity added.

(3) Fluorine compounds of weight average molecular weight exceeding 10,000.

The proportion of such fluorine compounds should desirably be in the range of about 0.1 to 10 percent by weight based on the total weight of the thermosetting resin composition. If the proportion of such fluorine compounds is less than 0.1 percent by weight, then almost no water- or oil-repellency is obtained; conversely, if the proportion exceeds 10 percent by weight, then the degree of the effect is no longer proportional to the quantity added.

The type and amount of fluorine compound are selected according to the purpose for which the sheet is to be used. In particular, to increase water- and oil-repellency as well as to maintain the other desired characteristics of the sheet, the use of fluorine compounds in the molecular weight range indicated in section (2) above is desirable. The critical surface tension constitutes an index of the degree of water- and oil-repellency. The water- and oil-repellent characteristics are excellent if the critical surface tension is 18 dyn/cm or less, and still better if the critical surface tension is 10 dyn/cm or less.

Structure of Thermosetting Covering Sheet

The sheets of the present invention may be either single-layered or multiple-layered. The single-layered sheets [I] and multilayered sheets [II]–[V] will be described in detail, as follows.

[I] Single-layered Sheets

The sheet of the present invention can be prepared using the thermosetting resin composition described above. For example, a single-layered sheet can be prepared using a mixture of the aforesaid components and then used directly as a thermosetting covering sheet. In this case, the desirable thickness of the sheet is roughly from 5 to 1,000 μm, and more preferably from 10 to 500 μm.

[II] Sheets with a Base Layer and an Adhesive Layer Laminated onto One Side of the Base Layer Either an after-hardening adhesive agent or a nonhardening adhesive agent may be used.

An adhesive layer using an after-hardening adhesive agent can be prepared from the following thermosetting resin composition.

(1) A composition containing a reactive acrylic oligomer and a blocked isocyanate.

(2) A composition containing an acrylic adhesive agent, a reactive acrylic oligomer, and a blocked isocyanate.

(3) A composition containing an acrylic adhesive agent, a reactive acrylic oligomer, a blocked isocyanate, and an unblocked isocyanate.

(4) A composition containing a polyester diol or polyester dicarboxylic acid and a blocked isocyanate.

(5) A composition containing an acrylic adhesive agent, a (meth)acrylic monomer, and a peroxide.

The reactive acrylic oligomer that is contained in the aforesaid compositions (1) to (3) is used primarily for the purpose of increasing the hardness of the adhesive layer when the layer is heat-hardened. The reactive acrylic oligomer used for this purpose can be any of the previously mentioned reactive acrylic oligomers suitable for use in the base layer; in particular, those with weight average molecular weight of 10,000 or lower are desirable because of their superior initial adhesive properties. The said reactive acrylic oligomer should be used in the proportion of 1 to 1,000 parts by weight, and more preferably 100 to 500 parts by weight, for every 100 parts by weight of the solid amount of the acrylic adhesive agent. If the amount of the reactive acrylic oligomer is less than the lower limit of the aforesaid range, then the hardness attained after the hardening process will be low; conversely, if the quantity is excessive, then the viscosity of the adhesive constituents, will be low, and owing to the fluidity of these constituents, the form of the sheet obtained will be difficult to maintain. The appropriate degree of viscosity can be obtained when a reactive acrylic oligomer with a glass transition point of 20° C. or lower is used. The various aforementioned additives and substances used to impart desired functional characteristics can also be contained in the resin composition forming the adhesive layer. Antirust agents can perform their function when contained in the adhesive layer, however, substances that manifest their desired functional properties only when exposed on the external surface of the sheet, such as anticondensation agents, photochromic compounds, and fluorine compounds, are not effective when included in the adhesive layer.

As the acrylic adhesive agents that are contained in the compositions (2), (3), and (5) above, copolymers obtained by copolymerization of acrylates such as ethyl acrylate, butyl acrylate, 2-ethylhexyl acrylate, etc., can be used. Copolymers of the aforementioned acrylates with other monomers can also be used. These other applicable monomers include vinyl acetate, acrylonitrile, styrene, methyl methacrylate, etc., as well as polar monomers such as methacrylic acid, acrylic acid, itaconic acid, hydroxyethyl (meth)acrylate, hydroxypropyl (meth)acrylate, dimethylaminoethyl methacrylate, acrylamide, methylol acrylamide, glycidyl methacrylate, maleic anhydride, etc.

The applicable (meth)acrylic monomers that can be contained in the above-mentioned composition (5) include the acrylic reactive vinyl monomers used for the preparation of the aforesaid acrylic adhesive agents.

As regards the above-mentioned peroxides, any of the peroxides that can be used in the thermosetting resin composition can be used. Also, 1,1-bis(t-butylperoxy)-3,3,5-trimethylcyclohexane, t-butylperoxybenzoate, 2,5-diethyl-2,5-di(t-butylperoxy)hexane, etc., may be used for the present purpose. The amount of peroxides used should desirably be in the range of 0.1 to 5 parts by weight for every 100 parts by weight of the (meth)acrylic monomer.

The polyester diol that can be contained in the above-mentioned composition (4) should be of weight average molecular weight of from 5,000 to 25,000, and of hydroxyl value should be from 2 to 20. Likewise, the polyester dicarboxylic acid that is preferably contained in the above-mentioned composition (4) should be of weight average molecular weight from 5,000 to 25,000, and should have an acid value from 2 to 20. Possessing hydroxyl or carboxyl groups at their molecular termini, these resins can react with compounds having functional groups, for example, isocyanates, melamine, epoxides, etc., thereby hardening and raising the hardness of the coatings obtained in this manner.

In addition to the above-mentioned afterhardening adhesives obtained by directly mixing of the various components, microcapsular after-hardening adhesive agents can also be used. For example, microcapsulated adhesive agents such as uncrosslinked unsaturated polyester adhesives and self-crosslinking acrylic adhesives are suitable.

Pressure-sensitive or hot-melt adhesives can also be used instead of the above-mentioned afterhardening adhesive layer. Mixtures of these adhesives can also be used, or several different adhesive agents can be consecutively disposed on the base layer.

As the aforesaid pressure-sensitive adhesives, for example, adhesive agents that are rubber-based, acrylic-based, urethane-based, or silicone-based can be used, an appropriate hot-melt adhesives include, for example, ethylene-vinyl acetate (EVA) copolymer and styrene-isoprene-styrene (SIS) block copolymer adhesives.

If the surface of the substrate is hydrophilic, then the aforesaid single-layered sheet should desirably be laid directly onto the surface of the substrate, or else a sheet provided with a layer of adhesive agent should be applied. If the surface of the substrate is oilphilic, then the single-layered sheet should preferably be laid directly onto the surface of the substrate. If the surface of the substrate is water- repellent or oil-repellent, then a sheet with a silicone-based adhesive layer should desirably be used. Thus, single-layered sheets or sheets with an adhesive layer should be selected for use in accordance with the kind of substrate. A single-layered sheet preferably contains a reactive acrylic resin obtained from the block copolymerization or graft copolymerization, in order to adhere the sheet to the surface of the substrate successfully.

[III] Sheets with a Base Layer and a Surface Layer Disposed on the Surface of the Base Layer The components of the base layer and surface layer of this type of sheet can be substantially similar to those of the single-layered sheets described above. In addition, the various functional additives mentioned above can be included in the surface layer. The surface layer can be transparent or can be colored by the addition of a suitable colorant. A sheet with a transparent surface layer conveys an impression of When a transparent surface layer is to be formed, usually, the said layer may be prepared from the following compositions.

(1) A composition containing a reactive acrylic resin such as acrylic polyols and blocked isocyanates as principal components.

(2) A composition containing a reactive acrylic resins such as acrylic polyols; blocked isocyanates; and reactive acrylic oligomers such as thermoplastic acrylic resins and/or acrylic polyol oligomers as principal components.

(3) A composition containing thermoplastic acrylic resins, reactive vinyl monomers, and photosensitizers and/or peroxides as principal components.

(4) A composition consisting of transparent resins of acrylic, fluoric, urethane, or vinyl chloride type as principal components.

The base layer and/or surface layer can contain colorants. Some of the various compositions that contain colorants that are appropriate for use in the base layer or surface layer are as follows.

(1) A composition containing reactive acrylic resins such as acrylic polyols, blocked isocyanates, and colorants as principal components.

(2) A composition containing reactive acrylic resins such as acrylic polyols; blocked isocyanates; reactive acrylic oligomers such as thermoplastic acrylic resins and/or acrylic polyol oligomers; and colorants as principal components.

(3) A composition containing thermoplastic acrylic resins, reactive vinyl monomers, photosensitizers and/or peroxides, and colorants as principal components.

[IV] Sheets with a Base Layer, a Surface Layer Disposed on the Outer Surface of the Base Layer, and an Adhesive Layer Disposed on the Inner Surface of the Base Layer The various materials mentioned above that can be contained in the base layer can also be used as constituents of the thermosetting resin composition that forms the surface layer or the adhesive layer.

The base layer, surface layer, and adhesive layer can each be formed from the same types of components as those described in sections [I]-[III]. The surface layer can be transparent, as described in Item [III]. The base layer and/or surface layer may be colored. The ratio of the number of isocyanate groups in the blocked isocyanate to the number of functional groups in the resin contained in the thermosetting resin composition that forms the adhesive layer or surface layer may be the same as that described above with respect to the base layer. For example, the ratio (number of isocyanate groups/number of functional groups) should desirably be in the range of 0.5 to 1.5, and more preferably of 0.8 to 1.2.

[V] Sheets with a Base Layer and a Supporting Layer Disposed on the Said Base Layer The supporting layer is provided in order to maintain the form of the sheet during storage and when used, or for surface protection after attachment of the sheet to the substrate.

If necessary, the sheet is extended when attached to the substrate, so the supporting layer should desirably consist of a coating with ductility and malleability when heated (i.e., a thermoplastic resin or rubber film).

Substances suitable for use as the aforesaid thermoplastic resins include soft polyvinyl chloride, polyurethanes, acrylic resins, polyesters, ethylenevinyl acetate copolymers, polyethylene, polypropylene, etc. The applicable varieties of materials of the rubber film include, for example, natural rubber, styrene-butadiene rubber, nitryl butadiene rubber, isoprene rubber, butadiene rubber, chloroprene rubber, urethane rubber, silicone rubber, acrylic rubber, etc. Mixtures of these thermoplastic resins and rubbers can also be used, or two such coatings may be superposed.

The supporting layer may be peeled off immediately after the sheet has been applied to the substrate and the base layer of the sheet hardened, or alternatively the supporting layer may be used for protection after the sheet has been applied to the substrate and hardened, until the time when the covered substrate is actually used. An arbitrary surface form (external appearance) can be obtained by embossing or inscribing a pattern upon the supporting layer.

The appropriate thickness of the aforesaid thermosetting covering sheets [I]–[V] of the present invention is in the range of about 20 to 500 $\mu$m when the sheet is to be attached to substrate surfaces with irregularities, and about 5 to 1,000 $\mu$m when plane surfaces are to be covered. The thickness of the layers other than the aforesaid base layer in these sheets should ordinarily be from 10 to 500 $\mu$m; in particular, the adhesive layer should desirably be from 10 to 100 $\mu$m.

Preparation of Thermosetting Covering Sheets

The aforesaid sheets can be prepared by any suitable process. In the case of single-layered sheets, use of the following casting method is desirable.

First, the constituents of the thermosetting resin composition are thoroughly dissolved or dispersed in an organic solvent. The solution so obtained is then coated onto process paper (ordinarily, a polyethylene terephthalate coating or paper, the surface of which has been treated with silicone) using an apparatus such as a comma roller or comma reverse roller, and next, the solvent is removed by drying, thus forming the base layer. The single-layered sheet is then obtained by detaching the base layer from the process paper. If materials such as acrylic polyols are commercially available in the form of solutions in organic solvents, then there is no particular need to add the said solvents.

If the sheet is composed of more than one layer, then the sheet can be obtained by either the casting method or the lamination method. If the casting method is employed, then first a solution containing the resin constituents of either the base layer or the surface layer is coated onto process paper and the solvent is removed by drying to form the said layer. Then, this layer is further coated with a solution containing the constituents of the other layer and the solvent removed by drying to obtain a laminate. On the other hand, to prepare the sheet by the lamination method, first, solutions containing the respective resin constituents of the base layer and the surface layer are separately coated onto process paper and the solvents are removed by drying to form the two respective layers. Then these two layers are closely superposed and joined by compression with a roller press.

In cases where other layers such as an adhesive layer and/or a supporting layer are provided, the respective layers can also be prepared as in the casting or lamination methods described above. In the preparation of a sheet having a two-layered structure with a fluorine compound contained in the surface layer, the base layer should preferably be formed first by coating the corresponding solution onto the process paper, after which the solution for the surface layer is coated onto the base layer. This results in good mutual adhesion of the two layers as well as improvement of the water- and oil-repellency of the surface layer.

The process paper employed in the manufacturing process can also be used as a protective sheet.

Methods for Use of Thermosetting Covering Sheets

The thermosetting covering sheets of the present invention are stable at temperatures below the reaction temperature of blocked isocyanate. That is, because the isocyanate groups in the blocked isocyanate are blocked (masked) by the blocking agent, these groups do not react with the functional groups of other compounds. Therefore, the blocked isocyanate and reactive acrylic resin contained in the sheet do not react at ordinary temperatures, and consequently the sheet can be maintained in an unhardened or semihardened state for a prolonged period.

The thermosetting covering sheet of the present invention is applied to the surface of the substrate either in an unhardened state, wherein the functional groups of the reactive acrylic resin (and isocyanate groups of the blocked isocyanate) contained in the thermosetting resin composition have not yet reacted, or in a semihardened state, wherein only a portion of these groups have reacted. To convert the sheet to a semihardened state, as indicated above, the sheet may be heated to the reaction temperature of the blocked isocyanate for a prescribed period of time, or one of the above-mentioned crosslinking agents may be added to the resin constituents.

In the semihardened sheet, the proportion of functional groups of the reactive acrylic resins in the sheet that have already reacted should desirably be from 1% to 80% based on the total number of functional groups of reactive acrylic resins present before the reaction. This reaction ratio (i.e., initial hardening ratio) varies in accordance with the conditions under which the substrate is to be covered with the said sheet. For example, if the substrate has protuberant or perpendicular portions, or if the attachment of the sheet is attached at fairly high temperatures (30° C. or more), then the said sheet must be elongated by 100% or more to ensure close contact with the substrate. For this purpose, 1–40%, or more preferably 5–30%, of the functional groups in the reactive acrylic resin should have been crosslinked by the crosslinking agent. If the sheet is to be attached to the substrate by application of high pressure, as in press forming or insert injection, etc., then the sheet should not be ruptured or deformed more than necessary by the high temperature or the pressure of injected fused resin. To this end, the proportion of the functional groups that have already reacted should desirably be in the range of 20–80%. The appropriate range of the reaction ratio of these functional groups varies to some extent according to the temperature at which the sheet is formed. This reaction ratio can be calculated as follows. First, the IR (infrared) absorbance spectrum of, the unhardened or semihardened resin layer is analyzed, and the absorption coefficients, etc., are calculated. From these results, the functional group value is calculated, and the reaction ratio is calculated from the functional group value.

If the reaction ratio (initial hardening ratio) is lower than 1%, then the effects in imparting initial toughness, etc., to the sheet are small. On the other hand, if the reaction ratio exceeds 80%, then the sheet becomes unduly hard, and cracks are liable to occur when the sheet is applied to the substrate. Therefore, from 1% to 80%, and more preferably 5% to 75%, of the functional groups of the reactive acrylic resin contained in the thermosetting covering sheet should already have reacted in the semihardened state.

In cases where the aforementioned supporting layer (or protective layer) has been provided on the base layer, to impart pliancy to the supporting layer, heat is applied during the covering operation. Ordinarily, the supporting sheet is detached from the surface of the sheet after the hardening of the sheet. However, the supporting layer may be retained for protection of the sheet after attachment to the surface of the substrate.

The thermosetting covering sheet of the present invention is attached to the substrate in an unhardened or semihardened state, and then the said sheet is hardened by heating. However, heat may also be applied after the sheet has been attached to the substrate and the latter finished to the desired form.

Various techniques may be used to attach the sheet to the substrate (i.e., to cover the substrate with the sheet).

The applicable techniques include, for example, manual attachment, lamination, pressing (including vacuum pressing), insert injection, vacuum adhesion forming (vacuum package molding), etc. To improve both the adhesion of the sheet and the substrate and the rust-preventing effect of the coating, a technique whereby the sheet is attached to the substrate with a vacuum between the sheet and substrate is desirable; the technique includes, for example, the vacuum adhesion forming method, the vacuum pressing method, etc. The use of such techniques permits working or finishing of the substrate after the sheet attachment process. Use of a lamination method to apply the sheet to the substrate also allows working of the substrate after the attachment process. An object with a hard coating can then be obtained by heating the substrate covered with such a sheet.

Next, methods for attaching the sheet to the substrate will be explained more specifically.

[I] When a sheet without adhesive layer is used, at least the surface portion of a substrate is heated to a temperature from 50° to 250° C. and then the sheet is fitted onto the surface.

If the heating temperature is lower than 50° C., then adequate adhesion of the sheet cannot be obtained. On the other hand, if the temperature exceeds 250° C., then, when the sheet is brought close to the substrate, the sheet may be melted by the radiant heat emitted by the substrate, and therefore a uniform fit onto the substrate may not be obtained. The substrate surface is most desirably heated to a temperature from 70° to 150° C.

The operation of attachment of the sheet to the substrate may be performed as follows.

(1) The sheet is disposed above the substrate with a gap therebetween. Next, the sheet is attached onto the substrate by means of reduced pressure.

(2) Alternatively, the sheet is disposed above the substrate with a gap therebetween. Next, the sheet is mounted onto the substrate by shifting the sheet toward the substrate with a compressing means such as a rubber roller.

If the surface of the substrate is planar (for example, a plate-shaped substrate), then the sheet may be disposed on the upper surface of the substrate and pressed onto the substrate with a rubber roller. If irregularities are present on the surface of the substrate, then a vacuum forming machine may be used to attach the sheet to the substrate in accordance with method (1) indicated above. The center of the sheet may first be attached by being pressed onto the substrate surface with a compressing means, after which the remainder of the sheet is gradually attached by spreading of the pressure from the center toward the edges of the sheet. In this manner, retention of air between the sheet and the substrate can be prevented even if the portion of the substrate to be covered is a plane surface of large area. If the ductility and malleability of the sheet at ordinary temperatures are insufficient, then the sheet should desirably be preheated before this operation.

[II] The sheet may be disposed on the substrate and pressed onto the surface of the substrate with the simultaneous application of heat.

For example, with the sheet disposed on the substrate, hardening of the sheet and processing of the substrate may be effected simultaneously by means of a mold or a roller. In this way, a smooth coating surface can be achieved if the surface of the mold or roller in contact with the sheet is smooth. If the surface of the sheet is sprayed with a solvent that can swell or dissolve the material of the sheet, then the topography of the mold or surface of the roller (including the smooth surface of the mold or roller) can be effectively transferred to the sheet.

[III] The sheet is mounted onto the surface of the substrate and then converted to a semihardened state by hot pressing. Next, the substrate bearing this semihardened sheet is pressed by any of a variety of molds or otherwise worked. The sheet may be heated either while being pressed or after being pressed or worked.

The substrate can be worked by any of the conventional methods; for example, shearing, bending, drawing, etc.

[IV] The sheet is laid onto the inner surface of a mold and the molding material from which the substrate is to be formed is injected in a heated and molten state; thus, simultaneously with the formation of the substrate, the sheet forms a hard coating on the surface of the substrate.

The temperature of the molding material should be above the elimination temperature of the blocking agent in the blocked isocyanate contained in the sheet. Owing to the heat of the molding material, the sheet is heated and thereby hardened. Thus, by use of this method, the formation of the substrate as well as the processes of covering by and hardening of the sheet can be effected simultaneously.

When the sheet is attached to the substrate by the aforesaid methods [I]–[III], a device to cut the edge of the sheet may be installed on the stand upon which the substrate is placed. Applicable methods of cutting include, for example, a heating wire that can be heated to a temperature above 200° C. by the passage of an electrical current, or a cutting blade. The installation of such a cutting device permits the removal of the excess portion of the sheet simultaneously with the operation of covering of the substrate with the sheet.

The conditions for heating of the substrate to which a sheet has been applied should be decided appropriately in accordance with the reaction temperature and reactivity of the blocked isocyanate used as well as the amounts and reactivities of the reactive acrylic resins and crosslinking agents added, etc. Ordinarily, the heating temperature should be above the elimination temperature of the blocking agent in the blocked isocyanate contained in the thermosetting resin composition. Thus, heating induces reaction between the isocyanate groups of the blocked isocyanate and the functional groups of the other compounds (i.e., the functional groups of the reactive acrylic resin).

Substrates

A great variety of materials can be used as the substrates to be covered with the thermosetting covering sheet of the present invention, including, for example, metal plates such as steel or aluminum plates, etc., plated metal sheets such as galvanized iron sheets, tinplates, etc., wood, ceramic materials such as gypsum board, cement board, porcelain, etc., coated plates formed by the covering of steel plates, ceramics, or plastics with various resin coatings, objects made of thermoplastic resins such as polyolefines, ABS resin, polyphenylene sulphide (PPS), polyetherimide, etc., and objects made of thermosetting resins such as melamine resins, epoxy resins, phenol resins, polyimides, etc.

The surfaces of these substrates can be processed in various ways before attachment of the aforesaid sheets. For example, for metallic substrates, acid or alkaline treatment such as the phosphoric acid treatment ordinarily applied to steel plates, and for plastic substrates, various types of surface treatments such as solvent treatment, corona discharge treatment, glow discharge treatment, plasma treatment, ion implantation treatment, or primer treatment, etc.

Applications of Thermosetting Covering Sheets

The thermosetting covering sheets of the present invention may be used to cover the surfaces of various substrates to form hard coatings for the purposes of corrosion-proofing, decoration, display, protection, etc. More specifically, the sheets can be used, for example, but not being restricted thereto, for the following purposes.

(1) Automotive parts and fittings: body trim.
(2) Parts and fittings of domestic electrical appliances: outer finish of housings for refrigerators, washing machines, electronic ovens, etc.
(3) Building construction components: surface protection or decoration of outer or inner wall materials, rain gutters, etc.
(4) Preparation of coated steel plate.
(5) External finish of office automation equipment.

EXAMPLE

The present invention will be described with reference to the following examples.

In the following examples, the term "parts" refers to "parts by weight". Unless otherwise indicated, the units of the numerical values in the tables are parts by weight. The numerical values indicating components other than solvents in tables show the weight of solid matter.

A detailed description of the various materials used in the following examples and comparative examples is as follows.

(1) Acrylic Polyols

AROTHANE 2040-132: manufactured by Nippon Shokubai Kagaku Kogyo Co., Ltd. Glass transition point 20 ° C., hydroxyl value 80 in terms of 100% solid matter, weight-average molecular weight 365,000, and 39% solid matter.

AROTHANE 2040-134: manufactured by Nippon Shokubai Kagaku Kogyo Co., Ltd. Glass transition point 20° C., hydroxyl value 80 in terms of 100% solid matter, weight-average molecular weight 9,300, and 60% solid matter.

AROTHANE 2040-135: manufactured by Nippon Shokubai Kagaku Kogyo Co., Ltd. Glass transition point 20° C., hydroxyl value 80 in terms of 100% solid matter, weight-average molecular weight 12,000, and 59% solid matter.

AROTHANE 2040-136: manufactured by Nippon Shokubai Kagaku Kogyo Co., Ltd. Glass transition point 45° C., hydroxyl value 80 in terms of 100% solid matter, weight-average molecular weight 29,000, and 50% solid matter.

AROTHANE 2040-139: manufactured by Nippon Shokubai Kagaku Kogyo Co., Ltd. Glass transition point 20° C., hydroxyl value 100 in terms of 100% solid matter, weight-average molecular weight 321,000, and 28% solid matter.

AROTHANE 2040-140: manufactured by Nippon Shokubai Kagaku Kogyo Co., Ltd. Glass transition point 20° C., hydroxyl value 120 in terms of 100% solid matter, weight-average molecular weight 369,000, and 28% solid matter.

AROTHANE 2040-145: manufactured by Nippon Shokubai Kagaku Kogyo Co., Ltd. Glass transition point 40° C., hydroxyl value 80 in terms of 100% solid matter, weight-average molecular weight 339,000, and 30% solid matter.

AROTHANE 2040-146: manufactured by Nippon Shokubai Kagaku Kogyo Co., Ltd. Glass transition point 40° C., hydroxyl value 100 in terms of 100% solid matter, weight-average molecular weight 240,000, and 30% solid matter.

AROTHANE 2040-147: manufactured by Nippon Shokubai Kagaku Kogyo Co., Ltd. Glass transition point 40° C., hydroxyl value 120 in terms of 100% solid matter, weight-average molecular weight 283,000, and 30% solid matter.

AROTHANE 2060: manufactured by Nippon Shokubai Kagaku Kogyo Co., Ltd. Glass transition point 40°–45° C., hydroxyl value 80 in terms of 100% solid matter, weight-average molecular weight 9,400, and 59% solid matter.

AROTHANE 2040-145-8HPO4: manufactured by Nippon Shokubai Kagaku Kogyo Co., Ltd. Glass transition point 40° C., hydroxyl value 80 in terms of 100% solid matter, weight-average molecular weight 267,000, and 30% solid matter.

(2) Blocked Isocyanates

TAKENATE B-815N: manufactured by Takeda Chemical Industries, Ltd. Ketoxime-blocked hydrogenated diphenylmethane diisocyanate, 7.3% NCO, and 60% solid matter.

TAKENATE B-870N: manufactured by Takeda Chemical Industries, Ltd. Ketoxime-blocked isophorone diisocyanate, 12.6% NCO, and 60% solid matter.

COLONATE 2513: manufactured by Nippon Polyurethane Industry Co., Ltd. Ethyl acetoacetate-blocked isocyanurate of hexamethylene isocyanate, 10.2% NCO, and 80% solid matter.

COLONATE 2515: manufactured by Nippon Polyurethane Industry Co., Ltd. ε-caprolactam-blocked isocyanurate of hexamethylene diisocyanate, 10.6% NCO, and 80% solid matter.

(3) Unblocked Isocyanates

COLONATE L: manufactured by Nippon Polyurethane Industry Co., Ltd. Prepared by the reaction of 3 moles of tolylene diisocyanate and 1 mole of trimethylol propane. 13.0% NCO, and solid matter 75%.

COLONATE HL: manufactured by Nippon Polyurethane Industry Co., Ltd. Prepared by the reaction of 3 moles of hexamethylene diisocyanate and 1 mole of trimethylol propane, 75% solid matter, and 12.5% NCO.

(4) Acrylic Polyol Oligomers

NIKALITE H-270: manufactured by Nippon Carbide Industries Co., Inc. Glass transition point −19° C., hydroxyl value 200 in terms of 100% solid matter, and weight-average molecular weight 2,200–2,500.

NIKALITE H-470: manufactured by Nippon Carbide Industries Co., Inc. Glass transition point −37° C., hydroxyl value 200 in terms of 100% solid matter, and weight-average molecular weight 2,200–2,500.

NIKALITE H-870: manufactured by Nippon Carbide Industries Co., Inc. Glass transition point −45° C., hydroxyl value 200 in terms of 100% solid matter, and weight-average molecular weight 2,200–2,500.

(5) Thermoplastic Acrylic Resins

PARAPET BEADS EH-1000P: manufactured by Kyowa Gas Chemical Industry Co., Ltd.

PARAPET BEADS GIP8: manufactured by Kyowa Gas Chemical Industry Co., Ltd.

HIPET HBS: manufactured by Mitsubishi Rayon Co., Ltd.

DELPET 7500: manufactured by ASAHI CHEMICAL INDUSTRY CO., LTD.

DELPET 8500: manufactured by ASAHI CHEMICAL INDUSTRY CO., LTD.

(6) Acrylic Monomers

ACB200: manufactured by SHIN-NAKAMURA CHEMICAL CO., LTD.; β-acryloyloxypropyl hydrogenphthalate.

AMP20G: manufactured by SHIN-NAKAMURA CHEMICAL CO., LTD.; phenoxydiethyleneglycol acrylate.

NPA10G: manufactured by SHIN-NAKAMURA CHEMICAL CO., LTD.; nonylphenoxyethyl acrylate.

(7) Organic Peroxide

PERHEXA 3M: manufactured by NIPPON OILS & FATS CO., LTD.; 1,1-bis(t-butylperoxy)-3,3,5-trimethylcyclohexane. (8) Saturated Polyester Resins ELITEL 8551: manufactured by UNITIKA LTD.; hydroxyl value 11.

ELITEL 8552: manufactured by UNITIKA LTD.; hydroxyl value 12.

ELITEL 8553: manufactured by UNITIKA LTD.; hydroxyl value 13.

ELITEL 8554: manufactured by UNITIKA LTD.; hydroxyl value 11.

(9) Crosslinking Agents

ARALDITE CY175: manufactured by CIBA-GEIGY (Japan) Limited, epoxy-type crosslinking agent, epoxy equivalent 160, and epoxy value (in terms of hydroxyl value) 220 (i.e., the number of epoxy groups contained in this compound per unit weight is the same as that of the hydroxyl groups contained in compounds per unit weight that have a hydroxyl value of 220).

SUPER BECKAMINE J-820-60: manufactured by DAINIPPON INK & CHEMICALS, INC., melamine-type crosslinking agent (i.e., butylated melamine resin).

EXAMPLES A

Example A.1

First, 49 parts of blocked isocyanate (TAKENATE B-815N) was added to 100 parts of acrylic polyol (AROTHANE 2040-145), and the ingredients were thoroughly mixed with stirring. The mixture was coated onto the mold-release surface of a polyethylene terephthalate film (manufactured by Soken Kako Co., Ltd., film thickness 50 μm, hereinafter referred to as PET film) that had been treated with a silicone surface lubricant, and then this coating was dried for 5 minutes at 80° C. An unhardened thermosetting covering sheet was then obtained by peeling off the PET film. The thickness of the covering sheet so obtained was approximately 50 μm.

Tensile test was done of the covering sheet obtained in this way. Also, the aforesaid sheet was studied in covering tests in which the satisfactoriness of covering was evaluated. In addition, the surface hardness of the covered objects so obtained was measured. The test methods are as given below. The results of these tests are shown in Table A.1.

Tensile Tests

The thermosetting covering sheet is cut to form a 20×100 mm test strip. The test strip is then elongated 100% in the longitudinal direction at a prescribed temperature (room temperature and/or 80° C.), while observations are made of whether it is torn.

Covering Tests

A thermosetting covering sheet (20×20 cm) is positioned above the convex surface of a steel plate bent into a convex form (radius of curvature 50 cm, base diameter 20 cm) and is then made to adhere to the steel plate by reduced pressure at 80° C. using a vacuum-forming apparatus. The state of the coating so obtained is examined, and then the covered steel plate is heated for 30 minutes at 160° C. to harden the sheet. The thickness of the coating so obtained is approximately 40 μm.

Measurement of Hardness

Hardness was measured by the pencil hardness test in accordance with the standards prescribed by JIS K5400.

The above-mentioned vacuum forming apparatus is shown in FIG. 1. The vacuum forming apparatus 16 comprises a housing that is partitioned into an upper space 17 and a lower space 18, a support 19 for supporting a sheet 1, a heater 3, a vertically movable pedestal 4 for raising a substrate 2 toward the sheet 1, a vacuum pump 5, a communicating tube 6, a reduced-pressure tube 7, openings 8 and 9, and valves 10–16. The sheet 1 and the substrate 2 are heated by the heater 3. The valves 10 and 11 are closed, and the valves 12–15 are opened so as to maintain the upper and lower spaces 17 and 18 under reduced pressure. Then, the pedestal 4 are raised so that the substrate 2 is covered with the sheet 1. Then, the upper and lower spaces 17 and 18 are opened to release the pressure therein to the atmosphere. At this time, the valves 12–15 are closed and the valves 10 and 11 are operated so that the pressure in the lower and upper spaces is released to the atmosphere, while the pressure of the lower space 18 is kept lower than that of the upper space 17. The temperature of the aforesaid heater 3 is adjusted so that the surface temperature of the substrate 2 is from 50° to 250° C.

Examples A.2–A.4 and Comparative Examples A.1–A.4

Using the components shown in Table A.1, unhardened thermosetting covering sheets were obtained by the same process as that of Example A.1. The sheets so obtained were also subjected to the same tests as those used in Example A.1. The results are shown in Table A.1.

TABLE A.1

|  | Examples | | | | Comparative Examples | | | |
| --- | --- | --- | --- | --- | --- | --- | --- | --- |
|  | A.1 | A.2 | A.3 | A.4 | A.1 | A.2 | A.3 | A.4 |
| AROTHANE 2040-134 | — | — | — | — | — | — | — | 100 |

TABLE A.1-continued

|  | Examples | | | | Comparative Examples | | | |
|---|---|---|---|---|---|---|---|---|
|  | A.1 | A.2 | A.3 | A.4 | A.1 | A.2 | A.3 | A.4 |
| AROTHANE 2040-135 | — | — | — | — | 100 | 100 | — | — |
| AROTHANE 2040-136 | — | — | — | — | — | — | 100 | — |
| AROTHANE 2040-140 | — | 100 | — | 100 | — | — | — | — |
| AROTHANE 2040-145 | 100 | — | 100 | — | — | — | — | — |
| NIKALITE H-470 | — | — | — | 30 | — | — | — | — |
| NIKALITE H-870 | — | — | 30 | — | — | 30 | — | 30 |
| TAKENATE B-815N | 49 | 74 | 86 | 111 | 49 | 86 | 49 | 86 |
| NCO/OH | 1.0 | 1.0 | 1.0* | 1.0* | 1.0 | 1.0* | 1.0 | 1.0* |
| Tensile test Room temperature | Not torn | Not torn | Not torn | Not torn | Torn | Torn | Torn | Torn |
| 80° C. | Not torn | Not torn | Not torn | Not torn | Torn | Torn | Torn | Torn |
| State of coating | Excellent | Excellent | Excellent | Excellent | Not formable | Not formable | Not formable | Not formable |
| Hardness | 2H | H | H | H | — | — | — | — |

NCO/OH: Ratio of the number of isocyanate groups of the blocked isocyanate to the number of hydroxyl groups in the acrylic polyol.
*Ratio of the number of isocyanate groups of the blocked isocyanate to the total number of hydroxyl groups in the acrylic polyol and the acrylic polyol oligomer.

Examples A.5 and A.6

Using the components indicated in Table A.2, unhardened thermosetting covering sheets were obtained by the same process as that of Example A.1.

The aforesaid thermosetting covering sheet was cut into 10×20 cm rectangular test strips. The test strips were placed upon stainless steel plates that had been heated in an oven at 100° C. for 1 hour and the test strips were pressed onto the plates. These were then heated at 160° C. for 30 minutes to harden the sheet. After the strips were left to cool, the surface hardness of the coatings was measured in accordance with the method indicated in the description of Example A.1 above. Furthermore, the degree of adhesion between the covered plates and the coatings was examined. The results are shown in Table A.2. The procedure used for the adhesion test was as follows:

Adhesion Test

A 100-square checkerboard pattern with 1-mm spacings is inscribed on the coating of the test sample plate, and commercially available adhesive tape is adhered onto the coating of this test sample, after which the tape is peeled off and the number of squares remaining of the coating is counted.

Comparative Example A.5

Coated specimens were obtained by the same procedure as was used in Example A.5, except that the test strips of the thermosetting covering sheet were pressed onto the stainless steel plates at room temperature. The surface hardness of the coated substrate so obtained and the degree of adhesion of the sheets were measured by the same procedures as in Example A.5. The results are shown in Table A.2.

TABLE A.2

|  | Examples | | Comparative Example |
|---|---|---|---|
|  | A.5 | A.6 | A.5 |
| AROTHANE 2040-145 | 100 | 100 | 100 |
| NIKALITE H-870 | 30 | — | 30 |
| TAKENATE B-815N | 86 | 49 | 86 |
| NCO/OH | 1.0* | 1.0 | 1.0* |
| Adhesion (number of squares remaining) | 100 | 100 | 85 |
| Hardness | H | H | H |

NCO/OH: Ratio of the number of isocyanate groups of the blocked isocyante to the number of hydroxyl groups in the acrylic polyol.
*Ratio of the number of isocyanate groups of the blocked isocyanate to the total number of hydroxyl groups in the acrylic polyol and the acrylic polyol oligomer.

Example A.7

The unhardened thermosetting covering sheet obtained in Example A.5 was cut to form discoid test strips of 30-cm diameters. Then, by use of the vacuum-forming apparatus 6 illustrated in FIG. 1, the test strip was attached to a stainless steel plate (i.e., a substrate) heated to 70° C. This was then heated as in Example A.5 to effect hardening of the sheet. The surface hardness of the coated substrate so obtained and the degree of adhesion of the sheet to the substrate were evaluated by the same procedures as in Example A.5. The results are shown in Table A.3.

Comparative Example A.6

A coated substrate was obtained by the same procedure as was used in Example A 7, except that the test strip of the thermosetting covering sheet obtained was pressed onto the stainless steel plates at room temperature. The surface hardness of the coated substrate so obtained and the degree of adhesion of the sheet to the substrate were evaluated by the same procedures as in Example A.5. The results are shown in Table A.3.

TABLE A.3

|  | Example A.7 | Comparative Example A.6 |
|---|---|---|
| Adhesion (number of squares remaining) | 100 | 93 |
| Hardness | H | H |

Examples A.8–A.13

To 100 parts of acrylic polyol (AROTHANE 2040-145), 30 parts of acrylic polyol oligomer (NIKALITE H-870), 86 parts of blocked isocyanate (TAKE- NATE B-815N; with 1.0 equivalent of isocyanate groups for the total amount of hydroxyl groups in the aforesaid acrylic polyol and acrylic polyol oligomer), and an ethyl acetate solution of acrylic resin (PARAPET BEADS GIP8 or EH-1000P) in an amount indicated in Table A.4 were added, and these ingredients were thoroughly mixed by agitation. This mixture was coated onto the mold-releasing surface of a silicone-treated PET film (thickness 40 μm) of the same type as was used in Example A.1 so that the thickness of the coated layer was 100 μm, and this was dried by being heated at 70° C. for 1 hour, resulting in a thermosetting covering sheet with a releasing film.

By use of the covering sheet so obtained, the toughness of the said sheet was examined by applying the falling ball test in the following way, with the results shown in Table A.4.

Falling Ball Test

Figure 2:
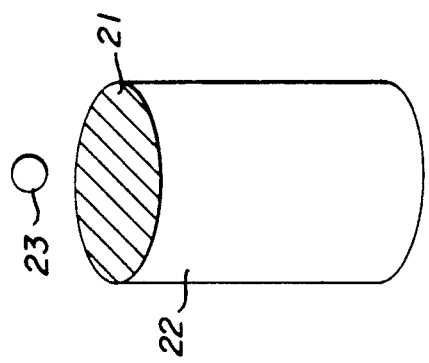
FIG. 2 is an perspective view illustrating the procedure for the falling-sphere test of the sheet of the present invention.

The releasing film was detached from a thermosetting covering sheet with releasing film, and sheet 21 was mounted on a circular cylinder 22 of diameter 10 cm, as shown in FIG. 2. Ball 23, of a prescribed weight, was dropped from specified heights and test results were assessed according to whether or not the sheet was ruptured in this way. The ball 23 used in this test was a No. 16 steel sphere (diameter 0.5 inches, weight 8.35 g) of the type used for the ball tack test.

TABLE A.4

|  | Examples | | | | | |
| --- | --- | --- | --- | --- | --- | --- |
|  | A.8 | A.9 | A.10 | A.11 | A.12 | A.13 |
| PARAPET BEADS GIP8 (parts) | 5 | 10 | 20 | 0 | 0 | 0 |
| PARAPET BEADS EH-1000P (parts) | 0 | 0 | 0 | 5 | 10 | 20 |
| Falling 10-cm height | ○ | ○ | ○ | ○ | ○ | ○ |
| ball 20-cm height | X | ○ | ○ | X | ○ | ○ |
| test 30-cm height | X | X | ○ | X | X | ○ |

X: Sheet was torn.
○: Sheet was not torn.

Example A.14

To 100 parts of acrylic polyol (AROTHANE 2040-145), 49 parts of blocked isocyanate (TAKENATE B-815N, with 1.0 equivalent of isocyanate groups for the total amount of hydroxyl groups in the aforesaid acrylic polyol), 3 parts of zinc chromate, and 40 parts of titanium oxide were added, and these ingredients were kneaded with a 3-cylinder mixing roller. This mixture was coated onto the mold releasing surface of a silicone-treated PET film (thickness 38 μm) of the same type as was used in Example A.1, and this was dried by being heated at 60° C. for 20 minutes. Then, the PET film was detached, giving an unhardened thermosetting covering sheet. This sheet was 100 μm thick.

The covering sheet obtained in this way was studied by the tensile test at 30° C. with the same testing procedure as was used in Example A.1. Next, by use of the aforesaid sheet, the covering test was done as described below to evaluate the satisfactoriness of covering. The surface hardness of the coated substrate so obtained and the degree of adhesion of the sheet to the substrate were evaluated by the same procedure as in Example A.5. The surfaces of the aforesaid covered substrates were also studied by rust-resistance testing. The results of these various tests are indicated in Table A.5. The covering tests and rust-resistance tests were done as followings.

Covering Test

A steel plate SS-41 treated with dilute nitric acid and then washed with deionized water before the test is used as the substrate. By the vacuum formation method using a temperature of 60° C., the substrate is covered with the covering sheet to be tested, and its satisfactoriness of covering is evaluated.

This covered steel plate is then heated at 160° C. for 30 minutes to harden the sheet.

Rust Resistance Test

This test is performed by the procedure for the salt-water spray test according to JIS Z 2371, and the occurrence of rusting is observed after 200 hours.

Examples A.15-A.16 and Comparative Example A.7

By use the components indicated in Table A.5, unhardened thermosetting covering sheets were obtained by the same process as in Example A.14. The thickness of the sheet so obtained was 100 μm in Example A.15, and 80 μm in Example A.16 and Comparative Example A.7. The sheets were tested by the same tests as those done in Example A.14. The results are shown in Table A.5.

In Comparative Example A.7, a sheet capable of maintaining sheet form was not obtained.

TABLE A.5

|  | Examples | | | Comparative Example |
| --- | --- | --- | --- | --- |
|  | A.14 | A.15 | A.16 | A.7 |
| AROTHANE 2040-132 | — | — | 100 | — |
| AROTHANE 2040-136 | — | — | — | 100 |
| AROTHANE 2040-145 | 100 | 100 | — | — |
| TAKENATE B-815N | 49 | 59 | 49 | 49 |
| NCO/OH | 1.0 | 1.2 | 1.0 | 1.0 |
| Zinc chromate | 3 | — | 5 | 3 |
| Titanium oxide | 60 | 40 | — | 45 |
| Zinc powder* | — | 3 | — | — |
| Tensile test (30° C.) | Not torn | Not torn | Not torn | Torn |
| State of coating | Excellent | Excellent | Excellent | Sheet form was not maintained. |
| Adhesion (number of squares remaining) | 100 | 100 | 100 | — |
| Hardness | H | 2H | HB | — |
| Rust formation | None | None | None | — |

NCO/OH: Ratio of the number of isocyanate groups of the blocked isocyanate to the number of hydroxyl groups in the acrylic polyol.
Zinc powder*: Powder with mean grain diameter of 0.5 μm Examples A.17-A.19 and Comparative Example A.8

Using the components shown in Table A.6, a mixture was obtained by the same procedure as was used in Example A.14. This mixture was coated onto the releasing surface of a PET film in the way indicated in the description of Example A.14, and this coated film was dried for 5 minutes at 80° C.

Then, the PET film was detached, giving an unhardened thermosetting covering sheet. This sheet so obtained was 50 μm thick.

The covering sheet so obtained was studied by the tensile test at room temperature in the same way as in Example A.1. Next, by use of the aforesaid sheet, the covering test was done as described below to evaluate the satisfactoriness of covering. The surface hardness and degree of adhesion of the sheet to the substrate were evaluated by the same procedures as in Example A.5.

Next, the electrical conductivity of the aforesaid covered substrate was measured. The covering test and the electrical conductivity test were done as indicated below. The results are shown in Table A.6.

In Comparative Example A.8, a sheet capable of maintaining sheet form was not obtained.

Covering Tests

A thermosetting covering sheet (30×30 cm) is positioned above the convex surface of a ceramic substrate bent into a convex form (radius of curvature 50 cm, base diameter 30 cm) and is then made to adhere to the substrate by reduced pressure at 80° C. The state of the coating so obtained is examined, and then the covered substrate is heated for 30 minutes at 160° C. to harden the sheet. The thickness of the coating so obtained is approximately 40 μm.

Electrical Conductivity Measurements

The volume resistivity of the coated substrate is measured at room temperature.

TABLE A.6

|  |  | Examples | | | Comparative Example |
|---|---|---|---|---|---|
|  |  | A.17 | A.18 | A.19 | A.8 |
| AROTHANE 2040-145 | | 100 | 100 | 100 | — |
| AROTHANE 2060 | | — | — | — | 100 |
| TAKENATE B-815N | | 49 | 49 | 49 | 49 |
| NCO/OH*[1] | | 1.0 | 1.0 | 1.0 | 1.0 |
| Additive | Material | Carbon black | Nickel powder | Silver powder | Carbon black |
|  | Amount (parts by weight) | 30 | 125 | 20 | 30 |
|  | Mean grain diameter (μm) | 0.3 | 0.1 | 0.1 | 0.3 |
| Tensile test (room temperature) | | Not torn | Not torn | Not torn | Torn |
| Covering test | | Excellent | Excellent | Excellent | Sheet form was not maintained. |
| Adhesion (number of squares remaining) | | 100 | 100 | 100 | — |
| Hardness | | H | 3H | 3H | — |
| Electrical conductivity | Volume resistivity (Ω cm) | 1 × 10⁻¹ | 2 × 10⁻³ | 1 × 10⁻⁴ | — |

*[1] Ratio of the number of the isocyanate groups of the blocked isocyanate to the number of hydroxyl groups in the acrylic polyol.

Examples A.20 and A.21

Using the components shown in Table A.7, unhardened thermosetting covering sheets were obtained by the same procedure as was used in Example A.14. The thickness of the covering sheet so obtained was 100 μm.

The covering sheet obtained in this way was studied by tensile testing at 80° C. by the same procedure as was used in Example A.1. Next, with use of the aforesaid sheet, covering tests were done in the same way as those used in Example A.17 to evaluate the satisfactoriness of covering. The coated ceramic substrates so obtained were heated for 30 minutes at the prescribed temperatures (160° C. for Example A.20, and 140° C. for Example A.21) to harden the sheets. The surface hardness of the coated substrate so obtained and the degree of adhesion of the sheet to the substrate were evaluated by the same procedures as in Example A.5. Furthermore, dew condensation tests of the aforesaid covered substrates were done by the method described below. The results are shown in Table A.7.

Dew Condensation Tests

Figure 3:
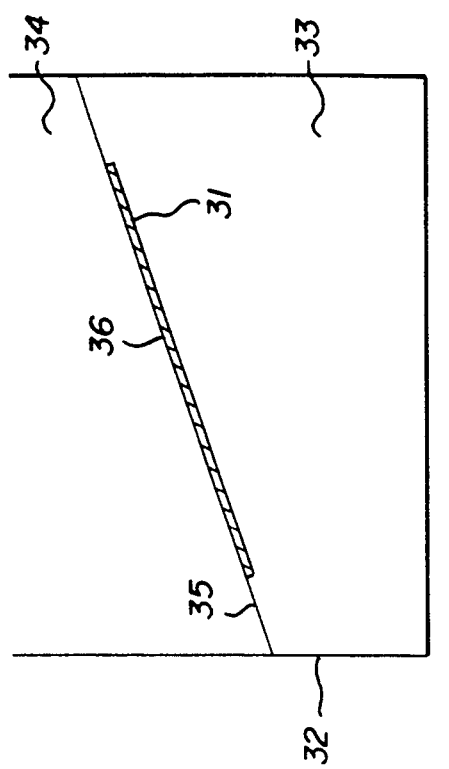
FIG. 3 is an schematic diagram illustrating the dew condensation test of the sheet of the present invention.

As shown in FIG. 3, a chamber 32 is divided into two compartments 33 and 34 with a hard-coated substrate 36, which has been obtained by attaching a sheet 31 to a substrate 35 and then hardening the sheet. Compartment 33 is maintained at 25° C. and 80% relative humidity, and compartment 34 is maintained at 0° C. After being left under these conditions for 1 hour, the surface of the sheet 31 is observed for dew condensation.

TABLE A.7

|  | Examples | |
|---|---|---|
|  | A.20 | A.21 |
| AROTHANE 2040-139 | 100 | — |
| AROTHANE 2040-147 | — | 100 |
| COLONATE 2515 | 57 | — |
| TAKENATE B-870N | — | 43 |
| Pearlite | 150 | — |
| Diatomaceous earth | — | 200 |
| Tensile test (80° C.) | Not torn | Not torn |
| Covering test | Excellent | Excellent |
| Adhesion (number of squares remaining) | 100 | 100 |
| Hardness | H | 2H |
| Dew condensation | None | None |

Example A.22

To 100 parts of acrylic polyol (AROTHANE 2040-145), 49 parts of blocked isocyanate (TAKENATE B-815N with 1.0 equivalent of isocyanate groups for the total amount of hydroxyl groups in the acrylic polyol), 80 parts (i.e., 80 parts for 100 parts of solid acrylic polyol) of methyl methacrylate, 1.5 parts of tert-butyl peroxyacetate, and 60 parts of titanium oxide were added, and these ingredients were thoroughly mixed by agitation. The mixture was coated onto the mold-releasing surface of silicone-treated PET film (40 μm thick), of the same type as used in Example A.1, and this was dried by being heated at 60° C. for 20 minutes. The PET film was released and a unhardened thermosetting covering sheet was obtained. The sheet so obtained was 100 μm thick.

The sheet was studied by the tensile test at 30° C. in the same way as in Example A.1. The results are shown in Table A.11. Next, by use of the aforesaid sheet, a covering test was done by the method described below, and the satisfactoriness of covering so obtained was evaluated. Moreover, the surface hardness of the coated substrate so obtained and the degree of adhesion of the sheet to the substrate were evaluated by the same procedures as in Example A.5. The results of these tests are shown in Tables A.11. and A.12.

Covering Tests

The sheet is attached to a given substrate and hardened through vacuum formation at 60° C., and the state of the coating obtained is observed.

The covered substrate obtained is heated at 160° C. for 30 minutes to harden the sheet.

The test results obtained when a naked and precoated steel plates were used as substrates are shown in Tables A.11 and A.12, respectively. When a naked steel plate was used as the substrate, a sheet without an adhesive layer was used, and this was attached directly to the surface of the plate. When a precoated steel plate was used as the substrate, to ensure adhesion between the sheet and the plate during vacuum formation, an adhesive layer (acrylic type adhesive agent SK DINE p-44, manufactured by Soken Chemical & Engineering Co., Ltd., thickness 10 μm) was provided on the side of the sheet that was attached to the said precoated steel plate.

Examples A.23-A.25

By use of the components indicated in Table A.8, unhardened thermosetting covering sheets were obtained by the same process as in Example A.22. With this sheet, tests were done by the same procedures as were used in Example A.22. The results of these tests are shown in Tables A.11 and A.12.

Examples A.26-A.29

By use of the components indicated in Table A.9, an unhardened thermosetting covering sheet was obtained by the same process as in Example A.22. The sheet so obtained were 80 μm thick. With this sheet, tests were done by the same procedure as in Example A.22. The results of these tests are shown in Tables A.11 and A.12.

Comparative Examples A.9-A.12

By use of the components indicated in Table A.10, an unhardened thermosetting covering sheet was obtained by the same process as was used in Example A.22. The thickness of the sheet so obtained was 80 μm. With the use of this sheet, tests were performed by the same procedures as was used in Example A.22. Furthermore, a covering test was done at 80° C. as well as 60° C.

The results of these tests showed that the sheets obtained in Comparative Examples A.9 and A.11 were almost inextendable at 30° C.; during the process of vacuum formation at 60° C. and 80° C., these sheets were torn and could not be attached to the substrate. The elongation of the sheets obtained in Comparative Examples A.10 and A.12 was 30%; these sheets could not be attached to the substrate by vacuum formation at 60° C. or 80° C.

TABLE A.8

| | Examples | | | |
|---|---|---|---|---|
| | A.22 | A.23 | A.24 | A.25 |
| AROTHANE 2040-145 | 100 | 100 | 100 | 100 |
| NIKALITE H-870 | — | — | 30 | 20 |
| TAKENATE B-815N | 49 | 59 | 86 | 89 |
| NCO/OH | *1 1.0 | *1 1.2 | *2 1.0 | *2 1.2 |
| Methyl methacrylate | 1) 80 | — | 3) 130 | — |
| Diethylene glycol dimethacrylate | — | 2) 40 | — | 4) 60 |
| tert-Butylperoxy acetate | 1.5 | — | 1.7 | — |
| 2,2-Bis(tert-butyl-peroxy)butane | — | 0.8 | — | 0.8 |
| Titanium oxide | 60 | 35 | 85 | 60 |

NCO/OH
*1 Ratio of the number of isocyanate groups of the blocked isocyanate to the number of hydroxyl groups in the acrylic polyol.
*2 Ratio of the number of isocyanate groups of the blocked isocyanate to the total number of hydroxyl groups in the acrylic polyol and the acrylic polyol oligomer.
1) 80 parts for every 100 parts of solid acrylic polyol.
2) 40 parts for every 100 parts of solid acrylic polyol.
3) 100 parts for every 100 parts in total of solid acrylic polyol and acrylic polyol oligomer.
4) 50 parts for every 100 parts in total of solid acrylic polyol and acrylic polyol oligomer.

TABLE A.9

| | Examples | | | |
|---|---|---|---|---|
| | A.26 | A.27 | A.28 | A.29 |
| AROTHANE 2040-132 | 100 | 100 | 100 | 100 |
| NIKALITE H-870 | — | — | 30 | 20 |
| TAKENATE B-815N | 49 | 59 | 86 | 74 |
| NCO/OH | *1 1.0 | *1 1.2 | *2 1.0 | *2 1.0 |
| HIPET HBS | 20 | 20 | 39 | 24 |
| Methyl methacrylate | 1) 96 | — | 3) 169 | — |
| Diethylene glycol dimethacrylate | — | 2) 66 | — | 4) 86 |
| 2,2-Bis(tert-butyl-peroxy)butane | 1.2 | — | 2.0 | — |
| Methyl ethyl ketone peroxide | — | 0.9 | — | 1.2 |
| Carbon black | 20 | — | 20 | — |
| Iron oxide | — | 22 | — | 42 |
| Ethyl acetate | 100 | 100 | 200 | 100 |

NCO/OH
*1 Ratio of the number of isocyanate groups of the blocked isocyanate to the number of hydroxyl groups in the acrylic polyol.
*2 Ratio of the number of isocyanate groups of the blocked isocyanate to the total number of hydroxyl groups in the acrylic polyol and the acrylic polyol oligomer.
1) 80 parts for every 100 parts in total of solid acrylic polyol and thermoplastic acrylic resin.
2) 60 parts for every 100 parts in total of solid acrylic polyol and thermoplastic acrylic resin.
3) 100 parts for every 100 parts in total of solid acrylic polyol, acrylic polyol oligomer, and thermoplastic acrylic resin.
4) 60 parts for every 100 parts in total of solid acrylic polyol, acrylic polyol oligomer, and thermoplastic acrylic resin.

TABLE A.10

| | Comparative Examples | | | |
|---|---|---|---|---|
| | A.9 | A.10 | A.11 | A.12 |
| AROTHANE 2040-136 | 100 | 100 | 100 | 100 |
| NIKALITE H-870 | — | — | 30 | 20 |
| TAKENATE B-815N | 49 | 49 | 86 | 74 |
| NCO/OH | *1 1.0 | *1 1.0 | *2 1.0 | *2 1.0 |
| HIPET HBS | — | 20 | — | 24 |
| Diethylene glycol dimethacrylate | 1) 80 | 2) 120 | 3) 104 | 4) 144 |
| Methyl ethyl ketone peroxide | 1.0 | — | 1.8 | — |
| tert-Butyl peroxybenzoate | — | 1.0 | — | 2.0 |
| Titanium oxide | 60 | 30 | 90 | 30 |

NCO/OH
*1 Ratio of the number of isocyanate groups of the blocked isocyanate to the number of hydroxyl groups in the acrylic polyol.
*2 Ratio of the number of isocyanate groups of the blocked isocyanate to the total number of hydroxyl groups in the acrylic polyol and the acrylic polyol oligomer.
1) 80 parts for every 100 parts in total of solid acrylic polyol.
2) 100 parts for every 100 parts in total of solid acrylic polyol and thermoplastic acrylic resin.
3) 80 parts for every 100 parts in total of solid acrylic polyol and acrylic polyol oligomer.
4) 100 parts for every 100 parts in total of solid acrylic polyol, acrylic polyol oligomer, and thermoplastic acrylic resin.

TABLE A.11

| Examples | A.22 | A.23 | A.24 | A.25 | A.26 | A.27 | A.28 | A.29 |
|---|---|---|---|---|---|---|---|---|
| Tensile test (30° C.) | Not torn | Not torn | Not torn | Not torn | Not torn | Not torn | Not torn | Not torn |
| State of coating | Excel- | Excel- | Excel- | Excel- | Excel- | Excel- | Excel- | Excel- |

TABLE A.11-continued

| Examples | A.22 | A.23 | A.24 | A.25 | A.26 | A.27 | A.28 | A.29 |
|---|---|---|---|---|---|---|---|---|
| | lent | lent | lent | lent | lent | lent | lent | lent |
| Adhesion (number of squares remaining) | 100 | 100 | 100 | 100 | 100 | 100 | 100 | 100 |
| Hardness | H | 2H | HB | H | H | 2H | H | H |

Substrate: Steel plate (a sheet without an adhesive layer was used).

TABLE A.12

| Examples | A.22 | A.23 | A.24 | A.25 | A.26 | A.27 | A.28 | A.29 |
|---|---|---|---|---|---|---|---|---|
| State of coating | Excellent | Excellent | Excellent | Excellent | Excellent | Excellent | Excellent | Excellent |
| Adhesion (number of squares remaining) | 100 | 100 | 100 | 100 | 100 | 100 | 100 | 100 |
| Hardness | HB | H | HB | HB | HB | H | B | HB |

Substrate: Coated steel plate
Adhesive layer: Acrylic adhesive (Soken Chemical & Engineering Co., Ltd.; SK DINE P-44) was used. Thickness, 10 μm.

Examples A.30–A.33

Using the components indicated in Table A.13, an unhardened thermosetting covering sheet was obtained by the same process as was used in Example A.22. The thickness of the sheet so obtained was 100 μm. By use of this sheet, tests were done by basically the same procedures as were used in Example A.22. In the covering test, the covered substrate was heated at 140° C. for 30 minutes, and irradiated with a high-pressure mercury lamp (160 W/cm$^2$) at 140° C. for 2 minutes. The distance between a high-pressure mercury lamp and covered substrate was 15 cm. Tables A.16 and A.17 show the results of the tests. Table A.16 shows the results when a naked steel plate was used as the substrate. Table A.17 shows the results when a precoated steel plate was used as the substrate. The results of the tensile tests are shown in Table A.16.

Examples A.34–A.37

By use of the components indicated in Table A.14, an unhardened thermosetting covering sheet was obtained by the same process as in Example A.22. The sheets so obtained were 80 μm thick. With this sheet, tests were done by the same procedure as in Example A.30. The results of these tests are shown in Tables A.16 and A.17.

Comparative Examples A.13–A.16

By use of the components indicated in Table A.15, an unhardened thermosetting covering sheet was obtained by the same process as in Example A.22. The sheets so obtained were 80 μm thick. With this sheet, tests were done by the same procedure as in Example A.30. The covering test was performed at 80° C. as well as 60° C.

The results of these tests demonstrated that the sheets obtained in Comparative Examples A.13 and A.15 were almost inextendable at 30° C.; during the process of vacuum formation at 60° C. and 80° C., these sheets were torn and could not be attached to the substrate. The elongation of the sheets obtained in Comparative Examples A.14 and A.16 was 30%; these sheets could not be attached to the substrate by vacuum formation at 60° C. or 80° C.

TABLE A.13

| | Examples | | | |
|---|---|---|---|---|
| | A.30 | A.31 | A.32 | A.33 |
| AROTHANE 2040-145 | 100 | 100 | 100 | 100 |
| NIKALITE H-870 | — | — | 30 | 20 |
| TAKENATE B-815N | 49 | 59 | 86 | 89 |
| NCO/OH | *$^1$1.0 | *$^1$1.2 | *$^2$1.0 | *$^2$1.2 |
| Methyl methacrylate | $^{1)}$80 | — | $^{3)}$130 | — |
| Diethylene glycol dimethacrylate | — | $^{2)}$40 | — | $^{4)}$72 |
| Benzil | 1.5 | 0.7 | 1.5 | 1.4 |
| Titanium oxide | 60 | 40 | 80 | 77 |

NCO/OH
*$^1$Ratio of the number of isocyanate groups of the blocked isocyanate to the number of hydroxyl groups in the acrylic polyol.
*$^2$Ratio of the number of isocyanate groups of the blocked isocyanate to the total number of hydroxyl groups in the acrylic polyol and the acrylic polyol oligomer.
$^{1)}$80 parts for every 100 parts of solid acrylic polyol.
$^{2)}$40 parts for every 100 parts of solid acrylic polyol.
$^{3)}$100 parts for every 100 parts in total of solid acrylic polyol and acrylic polyol oligomer.
$^{4)}$60 parts for every 100 parts in total of solid acrylic polyol and acrylic polyol oligomer.

TABLE A.14

| | Examples | | | |
|---|---|---|---|---|
| | A.34 | A.35 | A.36 | A.37 |
| AROTHANE 2040-132 | 100 | 100 | 100 | 100 |
| NIKALITE H-870 | — | — | 30 | 20 |
| TAKENATE B-815N | 49 | 59 | 86 | 89 |
| NCO/OH | *$^1$1.0 | *$^1$1.2 | *$^2$1.0 | *$^2$1.2 |
| HIPET HBS | 10 | 20 | 30 | 20 |
| Methyl methacrylate | $^{1)}$88 | — | $^{3)}$96 | — |
| Diethylene glycol dimethacrylate | — | $^{2)}$72 | — | $^{4)}$112 |
| Carbon black | 20 | — | 20 | — |
| Iron oxide | — | 35 | — | 60 |
| Benzophenone | 1.4 | 1.2 | 1.4 | 1.4 |
| Ethyl acetate | 100 | 100 | 100 | 200 |

NCO/OH
*$^1$Ratio of the number of isocyanate groups of the blocked isocyanate to the number of hydroxyl groups in the acrylic polyol.
*$^2$Ratio of the number of isocyanate groups of the blocked isocyanate to the total number of hydroxyl groups in the acrylic polyol and the acrylic polyol oligomer.
$^{1)}$80 parts for every 100 parts of solid acrylic polyol and thermoplastic acrylic resin.
$^{2)}$60 parts for every 100 parts of solid acrylic polyol and thermoplastic acrylic resin.
$^{3)}$60 parts for every 100 parts in total of solid acrylic polyol, acrylic polyol oligomer, and thermoplastic acrylic resin.
$^{4)}$80 parts for every 100 parts in total of solid acrylic polyol, acrylic polyol oligomer, and thermoplastic acrylic resin.

TABLE A.15

| | Comparative Examples | | | |
|---|---|---|---|---|
| | A.13 | A.14 | A.15 | A.16 |
| AROTHANE 2040-136 | 100 | 100 | 100 | 100 |
| NIKALITE H-870 | — | — | 30 | 20 |
| TAKENATE B-815N | 49 | 49 | 86 | 74 |
| NCO/OH | *1 1.0 | *1 1.0 | *2 1.0 | *2 1.0 |
| HIPET HBS | — | 10 | — | 20 |
| Diethylene glycol dimethacrylate | 1)80 | 2)110 | 3)104 | 4)140 |
| Benzil | 1.2 | 1.5 | 1.5 | 1.8 |
| Titanium oxide | 45 | 50 | 90 | 90 |

NCO/OH
*1 Ratio of the number of isocyanate groups of the blocked isocyanate to the number of hydroxyl groups in the acrylic polyol.
*2 Ratio of the number of isocyanate groups of the blocked isocyanate to the total number of hydroxyl groups in the acrylic polyol and the acrylic polyol oligomer.
1) 80 parts for every 100 parts of solid acrylic polyol.
2) 100 parts for every 100 parts of solid acrylic polyol and thermoplastic acrylic resin.
3) 80 parts for every 100 parts in total of solid acrylic polyol and acrylic polyol oligomer.
4) 100 parts for every 100 parts in total of solid acrylic polyol, acrylic polyol oligomer, and thermoplastic acrylic resin.

TABLE A.16

| Examples | A.30 | A.31 | A.32 | A.33 | A.34 | A.35 | A.36 | A.37 |
|---|---|---|---|---|---|---|---|---|
| Tensile test (30° C.) | Not torn | Not torn | Not torn | Not torn | Not torn | Not torn | Not torn | Not torn |
| State of coating | Excellent | Excellent | Excellent | Excellent | Excellent | Excellent | Excellent | Excellent |
| Adhesion (number of squares remaining) | 100 | 100 | 100 | 100 | 100 | 100 | 100 | 100 |
| Hardness | H | 2H | H | 2H | H | 3H | H | 3H |

Substrate: Steel plate (a sheet without an adhesive layer was used).

TABLE A.17

| Examples | A.30 | A.31 | A.32 | A.33 | A.34 | A.35 | A.36 | A.37 |
|---|---|---|---|---|---|---|---|---|
| State of coating | Excellent | Excellent | Excellent | Excellent | Excellent | Excellent | Excellent | Excellent |
| Adhesion (number of squares remaining) | 100 | 100 | 100 | 100 | 100 | 100 | 100 | 100 |
| Hardness | HB | H | HB | H | HB | H | HB | H |

Substrate: Coated steel plate
Adhesive layer: Acrylic adhesive (Soken Chemical & Engineering Co., Ltd.; SK DINE P-44) was used. Thickness, 10 μm.

EXAMPLES

For the series of Example B to be described below, the physical properties of the thermosetting covering sheets and covered substrates obtained with use of the said sheets were measured by the following procedures.

(1) Adhesion Test

A 100-square checkerboard pattern with 1-mm spacings is inscribed on the coating of the test sample plate, and commercially available adhesive tape is made to adhere onto the coating of this test sample, after which the tape is peeled off and the number of squares remaining of the coating is counted.

(2) Hardness

Hardness was measured by the pencil hardness test by the standards prescribed in JIS K5400.

(3) Rust Resistance Tests

This test is performed by the procedure for the salt-water spray test according to JIS Z 2371, and the occurrence of rusting is observed after 200 hours.

(4) Photochromic Property

Changes in color after exposure to sunlight are observed.

(5) The Proportion of Functional Groups that had Reacted with Isocyanate Groups in the Components of the Unhardened Covering Sheet The number of functional groups (e.g., hydroxyl, amino, carboxyl, etc.) is determined by infrared (IR) absorption analysis and the proportion of the functional groups that had reacted is calculated.

(6) Gloss Value

The gloss value is found by measurement of mirror reflection at $\theta = 60°$.

(7) Dew Condensation Tests

As shown in FIG. 3, a chamber 32 is divided into two compartments 33 and 34 with a hard-coated substrate 36, which has been obtained by attaching a sheet 31 to a substrate 35 and then hardening the sheet. Compartment 33 is maintained at 25° C. and 80% relative humidity, and compartment 34 is maintained at 0° C. After being left under these conditions for an hour, the surface of the sheet 31 is observed for dew condensation.

(8) Electrical Conductivity Measurements

The volume resistivity of the coated substrate is measured at room temperature.

The compositions used in Examples B.1–B.11 and Comparative Examples B.1–B.4 described below are listed collectively in Table B.1. The acrylic polyamine was obtained by copolymerization of the monomers specified under "Components" in Table B.1.

In Table B.1, *1 indicates the ratio of the number of isocyanate groups in the blocked isocyanate to the number of amino groups in the acrylic polyamine, and *2 indicates the ratio of the number of isocyanate groups in the blocked isocyanate to the total number of amino groups in the acrylic polyamine and blocked acrylic polyamine or acrylic polyamine oligomer.

The numbers in the parentheses in row *3 indicate the percentage of amino groups to be reacted with the isocyanate groups of COLONATE L, the amino groups being contained in the acrylic polyamine, in the acrylic polyamine and blocked acrylic polyamine, or in the acrylic polyamine and acrylic polyamine oligomer. The numbers in the parentheses in row *4 indicate the percentage of amino groups to be reacted in the acrylic polyamine with the crosslinking agent.

The values indicated by 1)–4) in Table B.1 represent parts by weight of the following compounds.

1) Copolymer of stearyl methacrylate and 6-aminohexylmethyl methacrylate, $\overline{Mw}=25,000$, Tg=20° C., NH$_2$ value 20.

2) Copolymer of stearyl methacrylate and 2-aminoethyl methacrylate, $\overline{Mw}=25,000$, Tg=20° C., NH$_2$ value 20.

3) Copolymer of butyl acrylate and 2-aminoethyl methacrylate, $\overline{Mw}=5,000$, Tg=35° C., NH$_2$ value 150.

4) Copolymer of ethyl acrylate and 4-aminobutyl methacrylate, $\overline{Mw}=5,000$, Tg=−20° C., NH$_2$ value 50.

Example B.1

A mixture containing the components indicated in Table B.1 was coated by use of an applicator onto the mold-release surface of a PET film (thickness 8 μm, manufactured by Soken Kako Co., Ltd.) that had been treated with a silicone mold-releasing agent, and the coating was then dried at 80° C. for 5 minutes. An unhardened thermosetting covering sheet was obtained by its being detached from the PET film. The thermosetting covering sheet was 100 μm thick.

In a vacuum package-forming machine, the aforesaid sheet was attached at 50° C. to a hemispherical substrate with a radius of 15 cm that had been precoated with an acrylic melamine paint, at the pressure of 10 torr. Then, the attached sheet was hardened by heating the coated substrate at 160° C. for 30 minutes. The surface hardness of the coated substrate so obtained and the degree of adhesion of the sheet to the substrate were evaluated. The results are shown in Table B.2.

Examples B.2-B.8 and Comparative Examples B.1-B.4

A series of thermosetting covering sheets was obtained by coating a mixture that contained the components indicated in Table B.1 onto PET films as described in Example B.1, and then drying the coating under the conditions indicated in Table B.1. The thicknesses of the sheets obtained are listed in Table B.2. Under the conditions shown in Table B.2, each of the aforesaid sheets was attached to a given substrate and hardened in the same way as described in Example B.1. In Examples B.3 and B.7, the sheets were first attached to the different substrates under the conditions shown in Table B.2, hardened by being heated at 120° C. for 2 minutes, and then further hardened by being heated at 100° C. for 60 minutes. The surface hardness of the coated substrate so obtained and the degree of adhesion of the sheet to the substrate were evaluated by the same procedures as in Example B.1. For Examples B.5 and B.8, rust resistance was also evaluated. These results are shown in Table B.2. In Comparative Examples B.1-B.4, when the sheets were attached under the conditions indicated in Table B.2, the sheets were torn and a coating could not be formed.

Example B.9

A thermosetting covering sheet was obtained by coating a mixture that contained the constituents indicated in Table B.1 onto a PET film as described in Example B.1, drying the coating for 5 minutes at 80° C., and then heating it for 5 minutes at 160° C. The proportion of constituents that reacted in this covering sheet was measured by infrared (IR) absorption analysis; the results showed that 25% of the amino groups had reacted. This sheet was 50 μm thick.

The aforesaid sheet was then set onto the inner surface of an injection mold constructed for the formation of disks of with a radius of 10 cm and 6 mm thick. Then, a polyetherimide resin was injected into this mold, resulting in a plastic disk with a covered surface. Then this disk was heated for 20 minutes at 160° C. to harden the attached sheet. The surface hardness of the coated substrate so obtained and the degree of adhesion of the sheet to the substrate were evaluated by the same procedures as in Example B.1. The results are shown in Table B.2.

Example B.10

A thermosetting covering sheet was obtained by coating a mixture that contained the constituents indicated in Table B.1 onto a PET film and drying the coating as described in Example B.1. The thickness of the sheet so obtained was 50 μm. The sheet was treated and hardened by the process that was used in Example B.9. The surface hardness of the coated substrate so obtained and the degree of adhesion of the sheet to the substrate were evaluated by the same procedures as in Example B.1. The results are shown in Table B.2.

Example B.11

A thermosetting covering sheet was obtained by coating a mixture that contained the constituents indicated in Table B.1 onto a PET film and drying the coating as described in Example B.1. The thickness of the sheet so obtained was 200 μm. Using a bowl-shaped mold, the aforesaid sheet was attached to a substrate at 100° C. with a vacuum press. This was heated for 30 minutes at 160° C. to harden the sheet. The surface hardness of the coated substrate so obtained and the degree of adhesion of the sheet to the substrate were evaluated by the same procedures as in Example B.1. The results are shown in Table B.2.

TABLE B.1

| | | | | | | Examples | | | | | | | Comparative Examples | | | |
|---|---|---|---|---|---|---|---|---|---|---|---|---|---|---|---|---|
| | | B.1 | B.2 | B.3 | B.4 | B.5 | B.6 | B.7 | B.8 | B.9 | B.10 | B.11 | B.1 | B.2 | B.3 | B.4 |
| Ethyl acetate | | 300 | 300 | 300 | 300 | 300 | 300 | 300 | 300 | 300 | 300 | 300 | 300 | 300 | 300 | 300 |
| Acrylic polyamine | Components | MM AM EA | MM AM EA | MM AM BA | MM AM EA | MM AM BA | MM AM EA | MM AM BA | MM AM BA | MM AM EA | MM AM EA | MM AM EA | MM AM EA | MM AM EA | MM AM EA | MM AM EA |
| | $\overline{Mw}$ (×10$^3$) | 153 | 260 | 580 | 260 | 320 | 153 | 530 | 200 | 260 | 260 | 260 | 52 | 60 | 52 | 60 |
| | Tg (°C.) | 35 | 35 | 10 | 35 | 10 | 35 | 10 | 10 | 35 | 35 | 35 | 35 | 15 | 35 | 15 |
| | NH$_2$ value | 60 | 80 | 40 | 80 | 40 | 60 | 40 | 40 | 80 | 80 | 80 | 60 | 80 | 60 | 80 |
| | Amount | 100 | 100 | 100 | 100 | 100 | 100 | 100 | 100 | 100 | 100 | 100 | 100 | 100 | 100 | 100 |
| Blocked acrylic polyamine | | — | — | 1)10 | — | — | — | 2)10 | — | — | — | — | — | — | — | — |
| Acrylic polyamine oligomer | | — | — | — | 3)50 | 4)20 | — | — | 4)20 | — | — | — | — | — | — | — |
| Blocked isocyanates | TAKENATE B-815N | 37 | 59 | — | 96 | — | 37 | — | — | 59 | 44 | 39 | 37 | 59 | 37 | 59 |
| | COLON- | — | — | 25 | — | 29 | — | 25 | 29 | — | — | — | — | — | — | — |

TABLE B.1-continued

| | | Examples | | | | | | | | | | | Comparative Examples | | | |
|---|---|---|---|---|---|---|---|---|---|---|---|---|---|---|---|---|
| | | B.1 | B.2 | B.3 | B.4 | B.5 | B.6 | B.7 | B.8 | B.9 | B.10 | B.11 | B.1 | B.2 | B.3 | B.4 |
| | ATE 2513 NCO/NH$_2$ | *$^1$1.0 | *$^1$1.2 | *$^2$1.0 | *$^2$1.0 | *$^2$1.0 | *$^1$1.0 | *$^2$1.0 | *$^2$1.0 | *$^1$1.2 | *$^1$0.9 | *$^1$0.8 | *$^1$1.0 | *$^1$1.2 | *$^1$1.0 | *$^1$1.2 |
| COLONATE L*$^3$ | | — | — | — | — | — | — | 1.8 (10%) | 2.2 (10%) | — | — | 14 (40%) | — | — | 2.6 (10%) | — |
| *$^4$Cross-linking agents | SUPER BECKAMINE J-820-60 | — | — | — | — | — | — | — | — | — | 28 (30%) | — | — | — | — | 28 (30%) |
| | ARALDITE CY175 | — | — | — | — | — | 5.5 (15%) | — | — | — | — | — | — | — | — | — |
| Titanium oxide | | — | — | — | 50 | — | — | — | — | — | — | — | — | — | — | — |
| Zinc chromate | | — | — | — | — | 2 | — | — | 2 | — | — | — | — | — | — | — |

Components of acrylic polyamine are abbreviated as follows: MM, methyl methacrylate; AM, 2-aminoethyl methacrylate; EA, ethyl acrylate; BA, butyl acrylate.

TABLE B.2

| | | Examples | | | | | | |
|---|---|---|---|---|---|---|---|---|
| | | B.1 | B.2 | B.3 | B.4 | B.5 | B.6 | B.7 |
| Preparation of sheet | Drying (°C.) | 80 | 80 | 70 | 80 | 70 | 80 | 70 |
| | conditions (minutes) | 5 | 5 | 10 | 5 | 10 | 5 | 10 |
| | Thickness (μm) | 100 | 200 | 120 | 150 | 80 | 100 | 120 |
| Covering conditions | Covering method*$^1$ | V | V | V | V | V | V | V |
| | Substrate$^2$ | a | b | c | d | e | a | c |
| | Attachment conditions | Temperature of sheet (°C.) | Room temperature | Room temperature | Room temperature | 100 | 100 | Room temperature | Room temperature |
| | | Temperature of substrate (°C.) | 50 | 100 | 60 | 80 | 80 | 50 | 60 |
| | | Pressure (torr) | 10 | 6 | 6 | 6 | 6 | 10 | 6 |
| | Heating (°C.) | 160 | 160 | 120 | 100 | 160 | 120 | 160 |
| | conditions (minutes) | 30 | 30 | 2 | 60 | 30 | 20 | 30 |
| Physical properties of coating | Hardness | H | H | B | H | H | H | H |
| | Adhesion (number of squares remaining) | 100 | 100 | 100 | 100 | 100 | 100 | 100 |
| | Rust formation | | | | | None | | |

| | | Examples | | | | Comparative Examples | | | |
|---|---|---|---|---|---|---|---|---|---|
| | | B.8 | B.9 | B.10 | B.11 | B.1 | B.2 | B.3 | B.4 |
| Preparation of sheet | Drying (°C.) | 70 | 80 | 160 | 80 | 80 | 80 | 80 | 80 |
| | conditions (minutes) | 10 | 5 | 5 | 5 | 5 | 5 | 5 | 5 |
| | Thickness (μm) | 80 | 50 | 50 | 200 | 100 | 200 | 100 | 200 |
| Covering conditions | Covering method*$^1$ | V | I | I | P | V | V | V | V |
| | Substrate$^2$ | e | | | g | a | b | a | b |
| | Attachment conditions | Temperature of sheet (°C.) | 100 | | | Room temperature | Room temperature | Room temperature | Room temperature | Room temperature |
| | | Temperature of substrate (°C.) | 80 | | | 100 | 80 | 100 | 80 | 100 |
| | | Pressure (torr) | 6 | | | | 6 | 4 | 6 | 4 |
| | Heating (°C.) | 120 | 160 | 160 | 160 | Sheet was torn | Sheet was torn | Sheet was torn | Sheet was torn |
| | conditions (minutes) | 20 | 20 | 20 | 30 | | | | |
| Physical properties of coating | Hardness | H | HB | HB | H | | | | |
| | Adhesion (number of squares remaining) | 100 | 100 | 100 | 100 | | | | |
| | Rust formation | None | | | | | | | |

*$^1$Abbreviations for covering methods are as follows: V, vacuum adhesion formation; I, insertion injection; P, vacuum pressing with bowl-shaped mold.
*$^2$Abbreviations concerning the substrate are as follows: a, hemispherical substrate with a radius of 15 cm coated with acrylic melamine; b, porcelain bowl with an uppermost radius of 10 cm, height of 6 cm, and base radius of 6 cm; c, polypropylene hemisphere with a radius of 15 cm; d, SUS-304 stainless steel rectangular parallelepiped with basal dimensions of 15 × 15 cm and height of 10 cm; g, SS-41 steel bowl with an uppermost radius of 10 cm, height of 6 cm, and base radius of 6 cm.

The compositions used in Examples B.12–B.22 and Comparative Examples B.5–B.8 described below are listed collectively in Table B.3. The acrylic polycarboxylic acid was obtained by copolymerization of the monomers specified under "Components" in Table B.3.

In Table B.3, *1 indicates the ratio of the number of isocyanate groups in the blocked isocyanate to the number of carboxyl groups in the acrylic polycarboxylic acid; *2 indicates the ratio of the number of isocyanate groups in the blocked isocyanate to the total number of carboxyl groups in the acrylic polycarboxylic acid, and in the blocked acrylic polycarboxylic acid or acrylic polycarboxylic acid oligomer; and *3 indicates the ratio of the number of isocyanate groups in the blocked isocyanate to the total number of carboxyl groups in the acrylic polycarboxylic acid and of amino groups in the acrylic polyamine oligomer. The numbers in the parentheses in row *4 indicate the percentage of carboxyl groups to be reacted with the isocyanate groups of COLONATE L, the carboxyl groups being contained in the acrylic polycarboxylic acid, in the acrylic polycarboxylic acid and blocked acrylic polycarboxylic acid, or in the acrylic polycarboxylic acid and acrylic polycarboxylic acid oligomer. The numbers in the parentheses in row *5 indicate the percentage of functional groups to be reacted in the acrylic polycarboxylic acid with the crosslinking agent.

The values indicated by 1)–4) in Table B.3 represent parts by weight of the following compounds.

1) Copolymer of stearyl methacrylate and methacrylic acid, $\overline{Mw}=25,000$, $Tg=20°$ C., COOH value 20.

2) Copolymer of stearyl methacrylate and 2-aminoethyl methacrylate, $\overline{Mw}=5,000$, $Tg=-10°$ C., $NH_2$ value 100 (classified into acrylic polyamine oligomer).

3) Copolymer of ethyl acrylate and methacrylic acid, $\overline{Mw}=5,000$, $Tg=-20°$ C., COOH value 50 (classified into acrylic polycarboxylic acid oligomer).

4) Copolymer of ethyl acrylate and acrylic acid, $\overline{Mw}=5,000$, $Tg=-20°$ C., COOH value 50 (classified into acrylic polycarboxylic acid oligomer).

Examples B.12–B.19 and Comparative Examples B.5–B.8

A series of thermosetting covering sheets was obtained by coating a mixture that contained the components indicated in Table B.3 onto PET films as described in Example B.1, and then drying the coating under the conditions indicated in Table B.4. The thicknesses of the sheets obtained are listed in Table B.4. Under the conditions shown in Table B.4, each of the aforesaid sheets was attached to a given substrate and hardened in the same way as described in Example B.1. In Examples B.14 and B.18, the sheets were first attached to the substrates under the conditions shown in Table B.4, hardened by being heated at 120° C. for 2 minutes, and then further hardened by being heated at 100° C. for 60 minutes. The surface hardness of the coated substrate so obtained and the degree of adhesion of the sheet to the substrate were evaluated by the same procedures as in Example B.1. For Examples B.16 and B.19, rust resistance was also evaluated. These results are shown in Table B.4. In Comparative Examples B.5–B.8, when the sheets were attached under the conditions indicated in Table B.4, the sheets were torn and a coating could not be formed.

Example B.20

A thermosetting covering sheet was obtained by coating a mixture that contained the constituents indicated in Table B.3 onto a PET film and drying the coating as described in Example B.9. The proportion of constituents that had reacted in this covering sheet was measured by infrared (IR) absorption analysis; the results showed that 25% of the amino groups had reacted. This sheet was 50 μm thick.

The aforesaid sheet was then hardened by the process that was used in Example B.9. The surface hardness of the coated substrate so obtained and the degree of adhesion of the sheet to the substrate were evaluated by the same procedures as in Example B.1. The results are shown in Table B.4.

Example B.21

A thermosetting covering sheet was obtained by coating a mixture that contained the constituents indicated in Table B.3 onto a PET film and drying the coating as described in Example B.1. The thickness of the sheet so obtained was 60 μm. The sheet was treated and hardened by the process that was used in Example B.9. The surface hardness of the coated substrate so obtained and the degree of adhesion of the sheet to the substrate were evaluated by the same procedures as in Example B.1. The results are shown in Table B.4.

Example B.22

A thermosetting covering sheet was obtained by coating a mixture that contained the constituents indicated in Table B.3 onto a PET film and drying the coating as described in Example B.1. The thickness of the sheet so obtained was 200 μm. The aforesaid sheet was hardened under the condition shown in Table B.4 by the process that was used in Example B.11. The surface hardness of the coated substrate so obtained and the degree of adhesion of the sheet to the substrate were evaluated by the same procedures as in Example B.1. The results are shown in Table B.4.

TABLE B.3

|  |  | Examples |  |  |  |  |  |  |  |  |  |  | Comparative Examples |  |  |  |
|---|---|---|---|---|---|---|---|---|---|---|---|---|---|---|---|---|
|  |  | B.12 | B.13 | B.14 | B.15 | B.16 | B.17 | B.18 | B.19 | B.20 | B.21 | B.22 | B.5 | B.6 | B.7 | B.8 |
| Ethyl acetate | | 300 | 300 | 300 | 300 | 300 | 300 | 300 | 300 | 300 | 300 | 300 | 300 | 300 | 300 | 300 |
| Acrylic poly-carboxylic acid | Com-ponents | MM M EA | MM M EA | MM A BA | MM A EA | MM M BA | MM M EA | MM M BA | MM A BA | MM M EA | MM M EA | MM M EA | MM M EA | MM M EA | MM M EA | MM M EA |
| | $\overline{Mw}$ (×10³) | 235 | 360 | 620 | 220 | 730 | 153 | 210 | 470 | 260 | 260 | 450 | 52 | 60 | 52 | 60 |
| | Tg (°C.) | 20 | 35 | 0 | 15 | 15 | 35 | 10 | 10 | 40 | 35 | 35 | 20 | 25 | 35 | 15 |
| | COOH value | 60 | 80 | 40 | 80 | 40 | 60 | 40 | 40 | 80 | 80 | 80 | 60 | 80 | 60 | 80 |
| | Amount | 100 | 100 | 100 | 100 | 100 | 100 | 100 | 100 | 100 | 100 | 100 | 100 | 100 | 100 | 100 |
| Blocked acrylic polycarboxylic acid | | — | — | 1)10 | — | — | — | 1)10 | — | — | — | — | — | — | — | — |
| Acrylic oligomer | | — | — | — | 2)40 | 3)20 | — | — | 4)20 | — | — | — | — | — | — | — |
| Blocked isocyan-ates | TAKE-NATE B-815N | 37 | 59 | — | 89 | — | 37 | — | — | 59 | 39 | 59 | 37 | 59 | 37 | 59 |
| | COLON-ATE 2513 | — | — | 25 | — | 29 | — | 25 | 29 | — | — | — | — | — | — | — |
| | NCO/functional group | *1 1.0 | *1 1.2 | *2 1.0 | *3 1.2 | *2 1.0 | *1 1.0 | *2 1.0 | *2 1.0 | *1 1.2 | *1 0.8 | *1 1.2 | *1 1.0 | *1 1.2 | *1 1.0 | *1 1.2 |
| COLONATE L*4 | | — | — | — | — | — | — | 1.8 (10%) | 2.2 (10%) | — | — | 10 (30%) | — | — | 2.8 (10%) | — |
| *5Cross- | SUPER | — | — | — | — | — | — | — | — | — | 56 | — | — | — | — | 28 |

TABLE B.3-continued

|  |  | Examples | | | | | | | | | | | Comparative Examples | | | |
|---|---|---|---|---|---|---|---|---|---|---|---|---|---|---|---|---|
|  |  | B.12 | B.13 | B.14 | B.15 | B.16 | B.17 | B.18 | B.19 | B.20 | B.21 | B.22 | B.5 | B.6 | B.7 | B.8 |
| linking agents | BECKA-MINE J-820-60 |  |  |  |  |  |  |  |  |  | (60%) |  |  |  |  | (30%) |
|  | ARAL-DITE CY175 | — | — | — | — | — | 3.7 (10%) | — | — | — | — | — | — | — | — | — |
| Titanium oxide |  | — | — | — | 40 | — | — | — | — | — | — | — | — | — | — | — |
| Zinc chromate |  | — | — | — | — | 2 | — | — | 2.5 | — | — | — | — | — | — | — |

Components of acrylic polycarboxylic acid are abbreviated as follows: MM, methyl methacrylate; M, methacrylic acid; EA, ethyl acrylate; A, acrylic acid; BA, butyl acrylate; MA, methyl acrylate.

TABLE B.4

|  |  |  | Examples | | | | | | |
|---|---|---|---|---|---|---|---|---|---|
|  |  |  | B.12 | B.13 | B.14 | B.15 | B.16 | B.17 | B.18 |
| Preparation of sheet | Drying (°C.) |  | 80 | 80 | 70 | 80 | 70 | 80 | 70 |
|  | conditions (minutes) |  | 5 | 5 | 10 | 5 | 10 | 5 | 10 |
|  | Thickness (μm) |  | 100 | 200 | 120 | 150 | 80 | 80 | 100 |
| Covering conditions | Covering method*1 |  | V | V | V | V | V | V | V |
|  | Substrate*2 |  | a | b | c | d | e | f | c |
|  | Attachment conditions | Temperature of sheet (°C.) | Room temperature | Room temperature | Room temperature | 100 | 100 | Room temperature | Room temperature |
|  |  | Temperature of substrate (°C.) | 50 | 100 | 60 | 80 | 80 | 50 | 60 |
|  |  | Pressure (torr) | 10 | 6 | 6 | 6 | 6 | 7 | 10 |
|  | Heating (°C.) |  | 160 | 160 | 120 | 100 | 160 | 120 | 160 | 120 | 100 |
|  | conditions (minutes) |  | 30 | 30 | 2 | 60 | 30 | 20 | 30 | 2 | 60 |
| Physical properties of coating | Hardness |  | H | H | B | H | H | H | B |
|  | Adhesion (number of squares remaining) |  | 100 | 100 | 100 | 100 | 100 | 100 | 100 |
|  | Rust formation |  |  |  |  | None |  |  |  |

|  |  |  | Examples | | | | Comparative Examples | | | |
|---|---|---|---|---|---|---|---|---|---|---|
|  |  |  | B.19 | B.20 | B.21 | B.22 | B.5 | B.6 | B.7 | B.8 |
| Preparation of sheet | Drying (°C.) |  | 70 | 80 | 160 | 80 | 80 | 80 | 80 | 80 |
|  | conditions (minutes) |  | 10 | 5 | 5 | 5 | 5 | 5 | 5 | 5 |
|  | Thickness (μm) |  | 80 | 50 | 60 | 200 | 100 | 200 | 100 | 200 |
| Covering conditions | Covering method*1 |  | V | I | I | P | V | V | V | V |
|  | Substrate*2 |  | e |  |  | g | a | b | f | b |
|  | Attachment conditions | Temperature of sheet (°C.) | 100 |  |  | Room temperature | Room temperature | Room temperature | Room temperature | Room temperature |
|  |  | Temperature of substrate (°C.) | 80 |  |  | 100 | 80 | 100 | 80 | 100 |
|  |  | Pressure (torr) | 10 |  |  |  | 6 | 4 | 6 | 4 |
|  | Heating (°C.) |  | 120 | 160 | 160 | 160 | Sheet was torn | Sheet was torn | Sheet was torn | Sheet was torn |
|  | conditions (minutes) |  | 20 | 20 | 20 | 30 |  |  |  |  |
| Physical properties of coating | Hardness |  | H | HB | HB | H |  |  |  |  |
|  | Adhesion (number of squares remaining) |  | 100 | 100 | 100 | 100 |  |  |  |  |
|  | Rust formation |  | None |  |  |  |  |  |  |  |

*1 Abbreviations for covering methods are as follows: V, vacuum adhesion formation; I, insertion injection; P, vacuum pressing with bowl-shaped mold.
*2 Abbreviations concerning the substrate are as follows: a, hemispherical substrate with a radius of 15 cm coated with acrylic melamine; b, porcelain bowl with an uppermost radius of 10 cm, height of 6 cm, and basel radius of 6 cm. c, polypropylene hemisphere with a radius of 15 cm; d, SUS-304 stainless steel rectangular parallelepiped with basal dimensions of 15 × 15 cm and height of 10 cm; e, 10 cm cube of S-41 steel plate surface-treated with dilute nitric acid and washed with deionized water; f, hemisphere with a radius of 15 cm coated with alkyd melamine; g, SS-41 steel bowl with an uppermost radius of 10 cm, height of 6 cm, and base radius of 6 cm.

The compositions used in Examples B.23–B.33 and Comparative Examples B.9–B.12 described below are listed collectively in Table B.5. The reactive acrylic resin was obtained by copolymerization of the monomers specified under "Components" in Table B.5.

In Table B.5, *1 indicates the ratio of the number of isocyanate groups in the blocked isocyanate to the number of functional groups in the reactive acrylic resin; *2 indicates the ratio of the number of isocyanate groups in the blocked isocyanate to the total number of functional groups in the reactive acrylic resin and blocked acrylic polycarboxylic acid; *3 indicates the ratio of the number of isocyanate groups in the blocked isocyanate to the total number of functional groups in the reactive acrylic resin and acrylic polyamine oligomer; *4 indicates the ratio of the number of isocyanate groups in the blocked isocyanate to the total number of functional groups in the reactive acrylic resin and acrylic polycarboxylic acid oligomer; and *5 indicates the ratio of the number of isocyanate groups in the blocked isocyanate to the total number of functional groups in the reactive acrylic resin and blocked reactive acrylic resin. The numbers in the parentheses in row *6 indicate the percentage of total functional groups to be reacted with the isocyanate groups of COLONATE L, the functional groups being contained in the reactive acrylic resin, in the reactive acrylic resin and blocked reactive acrylic resin, or in the reactive acrylic resin and acrylic polycarboxylic acid oligomer. The numbers in the parentheses in row *7 indicate the percentage of functional groups to be reacted in the acrylic polyamine with the crosslinking agent.

The values indicated by 1)-5) in Table B.5 represent parts by weight of the following compounds.

1) Copolymer of stearyl methacrylate and methacrylic acid, $\overline{Mw}=25,000$, $Tg=20°$ C., COOH value 20 (classified into blocked acrylic polycarboxylic acid).

2) Copolymer of methyl methacrylate and 2-hydroxyethyl methacrylate, $\overline{Mw}=36,000$, $Tg=40°$ C., OH value 40 (classified into blocked reactive acrylic resin).

3) Copolymer of butyl acrylate and 2-aminoethyl methacrylate, $\overline{Mw}=4,000$, $Tg=-35°$ C., $NH_2$ value 150 (classified into acrylic polyamine oligomer).

4) Copolymer of ethyl acrylate and methacrylic acid, $\overline{Mw}=5,000$, $Tg=-20°$ C., COOH value 50 (classified into acrylic polycarboxylic acid oligomer).

5) Copolymer of ethyl acrylate and acrylic acid, $\overline{Mw}=2,500$, $Tg=-30°$ C., COOH value 100 (classified into acrylic polycarboxylic acid oligomer).

Examples B.23-B.30 and Comparative Examples B.9-B.12

A series of thermosetting covering sheets was obtained by coating a mixture that contained the components indicated in Table B.5 onto PET films as described in Example B.1, and then drying the coating under the conditions indicated in Table B.6. The thicknesses of the sheets obtained are listed in Table B.6. Under the conditions shown in Table B.6, each of the aforesaid sheets was attached to a given substrate and hardened in the same way as described in Example B.1. In the case of Examples B.25 and B.29, the sheets were first attached to the substrates under the conditions shown in Table B.6, hardened by being heated at 120° C. for 2 minutes, and then further hardened by being heated at 100° C. for 60 minutes. The surface hardness of the coated substrate so obtained and the degree of adhesion of the sheet to the substrate were evaluated by the same procedures as shown in Example B.1. For Examples B.27 and B.30, rust resistance was also evaluated. These results are shown in Table B.6. In Comparative Examples B.9-B.12, when the sheets were attached under the conditions indicated in Table B.6, the sheets were torn and a coating could not be formed.

Example B.31

A thermosetting covering sheet was obtained by coating a mixture that contained the constituents indicated in Table B.5 onto a PET film and drying the coating as described in Example B.9. The proportion of constituents that had reacted in this covering sheet was measured by infrared (IR) absorption analysis; the results showed that 25% of the total functional groups had reacted. This sheet was 50μm thick.

The aforesaid sheet was then treated and hardened by the process that was used in Example B.9. The surface hardness of the coated substrate so obtained and the degree of adhesion of the sheet to the substrate were evaluated by the same procedures as in Example B.1. The results are shown in Table B.6.

Example B.32

A thermosetting covering sheet was obtained by coating a mixture that contained the constituents indicated in Table B.5 onto a PET film and drying the coating as described in Example B.1. The thickness of the sheet so obtained was 60 μm. The sheet was processed and hardened by the same procedure as was used in Example B.9, except that an injection mold that could form a disk with a radius of 10 cm and thickness of 3 mm was used. The surface hardness of the coated substrate so obtained and the degree of adhesion of the sheet to the substrate were evaluated by the same procedures as in Example B.1. The results are shown in Table B.6.

Example B.33

A thermosetting covering sheet was obtained by coating a mixture that contained the constituents indicated in Table B.5 onto a PET film and drying the coating as described in Example B.1. The thickness of the sheet so obtained was 200 μm. Under the condition shown in Table B.6, the sheet was treated and hardened by the process that was used in Example B.11. The surface hardness of the coated substrate so obtained and the degree of adhesion of the sheet to the substrate were evaluated by the same procedures as shown in Example B.1. The results are shown in Table B.6.

TABLE B.5

| | | Examples | | | | | | | | | | | Comparative Examples | | | |
|---|---|---|---|---|---|---|---|---|---|---|---|---|---|---|---|---|
| | | B.23 | B.24 | B.25 | B.26 | B.27 | B.28 | B.29 | B.30 | B.31 | B.32 | B.33 | B.9 | B.10 | B.11 | B.12 |
| Ethyl acetate | | 300 | 300 | 300 | 300 | 300 | 300 | 300 | 300 | 300 | 300 | 300 | 300 | 300 | 300 | 300 |
| Reactive acrylic resin | Components | MMM AE | MM HE EA | MM HE AB | MM M AP | MM M AE | MM M AE | MM M AB | MM HE AP | MM M AM | MM HE A AM | MM HE A | MM M AE | MM HE A | MM M AE | MM HE A |
| | $\overline{Mw}\ (\times 10^3)$ | 565 | 250 | 368 | 621 | 565 | 492 | 368 | 621 | 360 | 480 | 250 | 32 | 63 | 32 | 63 |
| | Tg (°C.) | 35 | 15 | 10 | 10 | 35 | 35 | 10 | 10 | 35 | 35 | 15 | 30 | 15 | 30 | 15 |
| | COOH value | 20 | 40 | — | 40 | 20 | 40 | — | 40 | 20 | 20 | 40 | 40 | 40 | 40 | 40 |
| | $NH_2$ value | 40 | — | 40 | 40 | 40 | 40 | 40 | 40 | 40 | 40 | — | 20 | — | 20 | — |
| | OH value | — | 40 | 40 | — | — | — | 40 | — | 20 | 20 | 40 | — | 40 | — | 40 |
| | Amount | 100 | 100 | 100 | 100 | 100 | 100 | 100 | 100 | 100 | 100 | 100 | 100 | 100 | 100 | 100 |
| Blocked acrylic polyamine acid or blocked reactive acrylic resin | | — | — | 1)10 | — | — | — | 2)10 | — | — | — | — | — | — | — | — |
| Acrylic oligomer | | — | — | — | 3)50 | 4)20 | — | — | 5)20 | — | — | — | — | — | — | — |
| Blocked isocyanates | TAKENATE B-815N | 37 | 59 | — | 115 | — | 39 | — | 62 | 59 | 39 | 59 | 37 | 59 | 37 | 59 |
| | COLONATE 2513 | — | — | 48 | — | 41 | — | 49 | — | — | — | — | — | — | — | — |

TABLE B.5-continued

|  |  | Examples | | | | | | | | | | | Comparative Examples | | | |
|---|---|---|---|---|---|---|---|---|---|---|---|---|---|---|---|---|
|  |  | B.23 | B.24 | B.25 | B.26 | B.27 | B.28 | B.29 | B.30 | B.31 | B.32 | B.33 | B.9 | B.10 | B.11 | B.12 |
|  | NCO/functional group | *¹1.0 | *¹1.2 | *²1.0 | *³1.2 | *⁴1.0 | *¹0.8 | *⁵1.0 | *⁴1.0 | *¹1.2 | *¹0.8 | *¹1.2 | *¹1.0 | *¹1.2 | *¹1.0 | *¹1.2 |
| COLONATE L*⁴ |  | — | — | — | — | — | — | 3.6 (10%) | 4.3 (10%) | — | — | 10 (30%) | — | — | 2.6 (10%) | — |
| *⁷Crosslinking agents | SUPER BECKAMINE J-820-60 | — | — | — | — | — | — | — | — | — | 56 (60%) | — | — | — | — | 28 (30%) |
|  | ARALDITE CY175 | — | — | — | — | — | 4.9 (10%) | — | — | — | — | — | — | — | — | — |
| Titanium oxide |  | — | — | — | 40 | — | — | — | — | — | — | — | — | — | — | — |
| Zinc chromate |  | — | — | — | — | 2 | — | — | 2.5 | — | — | — | — | — | — | — |

Components of reactive acrylic resin are abbreviated as follows: MM, methyl methacrylate; M, methacrylic acid; AE, 2-aminoethyl acrylate; HE, 2-hydroxyethyl methacrylate; EA, ethyl acrylate; AB, 4-aminobutyl methacrylate; A, acrylic acid; AM, 2-aminoethyl methacrylate; AP, 3-aminopropyl acrylate.

TABLE B.6

|  |  | Examples | | | | | | |
|---|---|---|---|---|---|---|---|---|
|  |  | B.23 | B.24 | B.25 | B.26 | B.27 | B.28 | B.29 |
| Preparation of sheet | Drying (°C.) | 80 | 80 | 70 | 80 | 70 | 80 | 70 |
|  | conditions (minutes) | 5 | 5 | 10 | 5 | 10 | 5 | 10 |
|  | Thickness (μm) | 80 | 200 | 100 | 150 | 80 | 80 | 100 |
| Covering conditions | Covering method*¹ | V | V | V | V | V | V | V |
|  | Substrate*² | a | b | c | d | e | f | h |
|  | Attachment conditions — Temperature of sheet (°C.) | Room temperature | Room temperature | Room temperature | 100 | 100 | Room temperature | Room temperature |
|  | Temperature of substrate (°C.) | 50 | 100 | 60 | 80 | 80 | 60 | 60 |
|  | Pressure (torr) | 10 | 6 | 5 | 6 | 6 | 6 | 10 |
|  | Heating (°C.) | 160 | 160 | 120 | 100 | 160 | 120 | 160 | 120 | 100 |
|  | conditions (minutes) | 30 | 30 | 2 | 60 | 30 | 20 | 30 | 2 | 60 |
| Physical properties of coating | Hardness | H | H | B | H | H | H | B |
|  | Adhesion (number of squares remaining) | 100 | 100 | 100 | 100 | 100 | 100 | 100 |
|  | Rust formation | | | | None | | | |

|  |  | Examples | | | | Comparative Examples | | | |
|---|---|---|---|---|---|---|---|---|---|
|  |  | B.30 | B.31 | B.32 | B.33 | B.9 | B.10 | B.11 | B.12 |
| Preparation of sheet | Drying (°C.) | 70 | 80 | 160 | 80 | 80 | 80 | 80 | 80 |
|  | conditions (minutes) | 10 | 5 | 5 | 5 | 5 | 5 | 5 | 5 |
|  | Thickness (μm) | 80 | 50 | 60 | 200 | 100 | 200 | 100 | 200 |
| Covering conditions | Covering method*¹ | V | I | I | P | V | V | V | V |
|  | Substrate*² | e | | | g | a | b | f | b |
|  | Attachment conditions — Temperature of sheet (°C.) | 100 | | | Room temperature | Room temperature | Room temperature | Room temperature | Room temperature |
|  | Temperature of substrate (°C.) | 80 | | | 110 | 80 | 100 | 80 | 100 |
|  | Pressure (torr) | 6 | | | | 6 | 4 | 6 | 4 |
|  | Heating (°C.) | 120 | 160 | 160 | 160 | Sheet was torn | Sheet was torn | Sheet was torn | Sheet was torn |
|  | conditions (minutes) | 20 | 20 | 20 | 30 | | | | |
| Physical properties of coating | Hardness | H | 2H | HB | H | | | | |
|  | Adhesion (number of squares remaining) | 100 | 100 | 100 | 100 | | | | |
|  | Rust formation | None | | | | | | | |

*¹Abbreviations for covering methods are as follows: V, vacuum adhesion formation; I, insertion injection; P, vacuum pressing with bowl-shaped mold.
*²Abbreviations concerning the substrate are as follows: a, hemispherical substrate with a radius of 15 cm coated with acrylic melamine; b, porcelain bowl with an uppermost radius of 10 cm, height of 6 cm, and base radius of 6 cm; c, polypropylene hemisphere with a radius of 15 cm, d, SUS-304 stainless steel rectangular parallelepiped with basal dimensions of 15 × 15 cm and height of 10 cm; e, 10 cm cube of SS-41 steel plate surface-treated with dilute nitric acid and washed with deionized water; f, hemisphere with a radius of 15 cm coated with alkyd melamine; g SS-41 steel bowl with an uppermost radius of 10 cm, height of 6 cm, and base radius of 6 cm; h, polypropylene hemisphere with a radius of 12 cm.

The compositions used in Examples B.34–B.43 and Comparative Examples B.13–B.15 described below are listed collectively in Table B.7. The acrylic polyol was obtained by copolymerization of the monomers specified under "Components" in Table B.7.

In Table B.7, *1 indicates the ratio of the number of isocyanate groups in the blocked isocyanate to the number of OH groups in the acrylic polyol, and *2 indicates the ratio of the number of isocyanate groups in the blocked isocyanate to the total number of OH groups in the acrylic polyol, and blocked acrylic polyol or acrylic polyol oligomer.

The numbers in the parentheses in row *3 indicate the percentage of total functional groups to be reacted with the isocyanate groups of COLONATE L, the functional groups being contained in the acrylic polyol, or in the acrylic polyol and blocked acrylic polyol.

The numbers in the parentheses in row *4 indicate the percentages of additives by volume. The additives used were as follows.

Iron Oxide

Micaceous iron oxide crushed to a mean grain diameter of 2 μm (grain size distribution, 0.5-5.0 μm) with a grinder.

Polyetherimide (ULTEM 1000, manufactured by Engineering Plastics Co.):

Formed by the press molding method and pulverized with a grinder to a mean grain diameter of 5 μm (grain size distribution, 1.0-10 μm).

Titanium Oxide

Pulverized with a grinder to a mean grain diameter of 2 μm (grain size distribution, 0.5-5.0 μm).

The values indicated by 1)-7) in Table B.7 represent parts by weight of the following compounds.

1) Copolymer of stearyl methacrylate and 4-hydroxybutyl methacrylate, $\overline{Mw}$=25,000, Tg=$-5°$ C., OH value 20 (classified into blocked acrylic polyol).

2) Copolymer of ethyl acrylate and 4-hydroxybutyl methacrylate, $\overline{Mw}$=5,000, Tg=$-20°$ C., OH value 50 (classified into acrylic polyol oligomer).

3) Copolymer of ethyl acrylate and 4-hydroxybutyl methacrylate, $\overline{Mw}$=2,500, Tg=$-25°$ C., OH value (classified into acrylic polyol oligomer).

4) 1,3,3-Trimethylnaphtoxazine.
5) 1,3,3-Trimethyl-6'-nitronaphtoxazine.
6) 1,3,3-Trimethyl-6-chloronaphtoxazine.
7) 1-Benzo-3,3-dimethylnaphtoxazine.

Example B.34

A mixture was obtained by thorough kneading of the components indicated in Table B.7 with a 3-cylinder mixing roller. A thermosetting covering sheet was obtained by coating the mixture onto a PET film and drying the coating as described in Example B.1. The thickness of the sheet so obtained was 100 μm. Under the conditions shown in Table B.8, the sheet was attached to a given substrate and hardened in the same way as in Example B.1. The surface hardness and gloss value of the coated substrate and the degree of adhesion of the sheet to the substrate were evaluated. The results are shown in Table B.8.

Example B.35

A mixture was obtained by thorough kneading of the components indicated in Table B.7, other than the isocyanate (COLONATE L), with a 3-cylinder mixing roller. Then the isocyanate (COLONATE L) was added and mixed with agitation. A thermosetting covering sheet was obtained by coating the mixture thus obtained onto a PET film and drying the coating as described in Example B.1. The thickness of the sheet so obtained was 60μm. Under the conditions shown in Table B.8, the sheet was attached to a given substrate in the same way as described in Example B.1, after which the sheet was hardened by being heated for 2 minutes at 120° C., and then by being heated further for 60 minutes at 70° C. The surface hardness and gloss value of the coated substrate and the degree of adhesion of the sheet to the substrate were evaluated. The results are shown in Table B.8.

Examples B.36-B.37 and Comparative Examples B.13-B.15

A mixture was obtained by kneading of the components indicated in Table B.7 in the same way as used in Example B.34. A thermosetting covering sheet was obtained by coating the mixture onto a PET film as described in Example B.1 and drying the coating under the conditions indicated in Table B.8. The thickness of the sheet so obtained is shown in Table B.8. Under the conditions shown in Table B.8, the sheets were attached to given substrates and hardened in the same way as described in Example B.1. The surface hardness and gloss value of the coated substrate so obtained, and the degree of adhesion of the sheet to the substrate were evaluated. In Example B.36, the rust resistance of the coating was also evaluated. The results of these tests were as shown in Table B.8.

In Comparative Examples B.13-B.15, when the sheets were attached under the conditions indicated in Table B.8, the sheets were torn and a coating could not be formed.

Example B 38

A mixture was obtained by thorough kneading of the components indicated in Table B.7, other than the isocyanate (COLONATE L), with a 3-cylinder mixing roller. Then, the isocyanate (COLONATE L) was added and mixed with agitation. A thermosetting covering sheet was obtained by coating the mixture so obtained onto a PET film and drying the coating as described in Example B.1. The thickness of the sheet so obtained was 60 μm. Under the conditions shown in Table B.8, the sheet was attached to a given substrate and then hardened in the same way as described in Example B.1. The surface hardness of the coated substrate so obtained and the degree of adhesion of the sheet to the substrate were evaluated. The results are shown in Table B.8.

Examples B.39-B.41

A mixture was obtained by kneading of the components indicated in Table B.7 in the same way as used in Example B.34. A thermosetting covering sheet was obtained by coating the mixture onto a PET film as described in Example B.1 and drying the coating under the conditions indicated in Table B.8. The thickness of the each sheet so obtained is shown in Table B.8. Under the conditions shown in Table B.8, the each sheet was attached to a given substrate in the same way as described in Example B.1. The surface hardness of the coated substrate so obtained, the degree of adhesion of the sheet to the substrate, and the photochromic properties of the coating were evaluated. In Example B.41, the rust resistance of the coating was also evaluated. The results of these tests were as shown in Table B.8.

Example B.42

A mixture was obtained by thorough kneading of the components indicated in Table B.7, other than the isocyanate (COLONATE L), with a 3-cylinder mixing roller. Then, the isocyanate (COLONATE L) was added and mixed with agitation. A thermosetting covering sheet was obtained by coating the mixture so obtained onto a PET film as described in Example B.1 and drying the coating under the conditions shown in Table B.8. The thickness of the sheet so obtained was 120 μm. Under the conditions shown in Table B.8, the sheet was attached to a given substrate and then hardened in the same way as described in Example B.11. The surface hardness and gloss value of the coated substrate so obtained and the degree of adhesion of the sheet to the substrate were evaluated. The results are shown in Table B.8.

Example B.43

A mixture was obtained by kneading of the components indicated in Table B.7 in the same way as used in Example B.42. A thermosetting covering sheet was obtained by coating the mixture onto a PET film as described in Example B.1, and drying the coating under the conditions indicated in Table B.8. The thickness of the sheet so obtained was 100 μm. Under the conditions shown in Table B.8, the sheet was attached to a given substrate and the hardened in the same way as described in Example B.11. The surface hardness of the coated substrate so obtained, the degree of adhesion of the sheet to the substrate, and the photochromic properties of the coating were evaluated.

TABLE B.7

|  |  | Examples |  |  |  |  |  |  |  |  |  | Comparative Examples |  |  |
|---|---|---|---|---|---|---|---|---|---|---|---|---|---|---|
|  |  | B.34 | B.35 | B.36 | B.37 | B.38 | B.39 | B.40 | B.41 | B.42 | B.43 | B.13 | B.14 | B.15 |
| Acrylic polyol | Ethyl acetate | 300 | 300 | 300 | 300 | 300 | 300 | 300 | 300 | 300 | 300 | 300 | 300 | 300 |
|  | Components | MM HE EA | MM HE EA | MM HE BA | MM HE EA | MM HE EA | MM HE EA | MM HE EA | MM HE BA | MM HP BA | MM HA BA | MM HE EA | MM HE EA | MM HE EA |
|  | $\overline{Mw}$ ($\times 10^3$) | 230 | 568 | 200 | 230 | 568 | 230 | 568 | 200 | 150 | 150 | 52 | 20 | 20 |
|  | Tg (°C.) | 35 | 35 | 10 | 35 | 35 | 35 | 35 | 10 | 10 | 10 | 35 | 15 | 15 |
|  | OH value | 60 | 80 | 40 | 60 | 80 | 60 | 80 | 40 | 40 | 40 | 60 | 80 | 80 |
|  | Amount | 100 | 100 | 100 | 100 | 100 | 100 | 100 | 100 | 100 | 100 | 100 | 100 | 100 |
| Blocked acrylic polyol |  | — | — | — | — | — | — | — | — | 1)10 | 1)10 | — | — | — |
| Acrylic polyol oligomer |  | — | — | 2)20 | — | — | — | 3)20 | — | — | — | — | — | — |
| Blocked isocyanates | TAKE-NATE B-815N | 37 | 39 | — | 37 | 39 | 37 | 39 | — | — | — | 37 | 39 | 39 |
|  | COLONATE 2513 | — | — | 29 | — | — | — | — | 41 | 25 | 25 | — | — | — |
|  | NCO/OH | *1 1.0 | *1 0.8 | *2 1.0 | *1 1.0 | *1 0.8 | *1 1.0 | *1 0.8 | *2 1.0 | *2 1.0 | *2 1.0 | *1 1.0 | *1 1.2 | *1 1.0 |
| COLONATE L*3 |  | — | 3.5 (10%) | — | — | 3.5 (10%) | — | — | — | 7.3 (40%) | 7.3 (40%) | 2.6 (10%) | — | — |
| Additives*4 |  | Iron oxide 85 (10%) | Silica 285 (30%) | Ferrocyan blue 50 (10%) zinc chromate 2 | Titanium oxide 66 (10%) | Iron oxide 258 (30%) | — | — | Minimum 3 | Poly-ether-imide (1.0%) | — | — | — | — |
| Photochromic compound |  | — | — | — | — | — | 4)2 | 5)3 | 6)3 | — | 7)2 | — | — | 5)5 |

Components of acrylic polyol are abbreviated as follows: MM, methyl methacrylate; HE, 2-hydroxyethyl methacrylate; EA, ethyl acrylate; HP, 3-hydroxypropyl methacrylate; BA, butyl acrylate; HM, hydroxymethyl methacrylate.

TABLE B.8

|  |  | Examples |  |  |  |  |  |
|---|---|---|---|---|---|---|---|
|  |  | B.34 | B.35 | B.36 | B.37 | B.38 | B.39 |
| Preparation of sheet | Drying (°C.) | 80 | 80 | 70 | 80 | 80 | 80 |
|  | conditions (minutes) | 5 | 5 | 10 | 5 | 5 | 5 |
|  | Thickness (μm) | 100 | 60 | 80 | 100 | 60 | 100 |
| Covering conditions | Covering method*1 | V | V | V | V | V | V |
|  | Substrate*2 | a | c | e | a | a | a |
|  | Attachment conditions | Temperature of sheet (°C.) | Room temperature | Room temperature | 100 | Room temperature | Room temperature | Room temperature |
|  |  | Temperature of substrate (°C.) | 50 | 60 | 80 | 50 | 50 | 50 |
|  |  | Pressure (torr) | 10 | 6 | 6 | 10 | 10 | 10 |
|  |  | Heating (°C.) | 160 | 120 70 | 120 | 160 | 160 | 160 |
|  |  | conditions (minutes) | 30 | 2 60 | 20 | 30 | 30 | 30 |
| Physical properties of coating | Hardness | H | B | H | H | H | H |
|  | Adhesion (number of squares remaining) | 100 | 100 | 100 | 100 | 100 | 100 |
|  | Gross value | 82 | 26 | 89 | 86 |  |  |
|  | Rust formation |  |  | None |  |  |  |
|  | Photochromic property *3 |  |  |  |  |  | ○ |

|  |  | Examples |  |  | Comparative Examples |  |  |
|---|---|---|---|---|---|---|---|
|  |  | B.40 | B.41 | B.42 | B.43 | B.13 | B.14 | B.15 |
| Preparation | Drying (°C.) | 80 | 70 | 70 | 70 | 80 | 80 | 80 |

TABLE B.8-continued

| | | | | | | | | |
|---|---|---|---|---|---|---|---|---|
| of sheet | conditions (minutes) | 5 | 10 | 10 | 10 | 5 | 5 | 5 |
| | Thickness (μm) | 60 | 80 | 120 | 100 | 100 | 100 | 100 |
| Covering conditions | Covering method*1 | V | V | P | P | V | V | V |
| | Substrate*2 | a | e | g | g | a | b | b |
| | Attachment conditions | Temperature of sheet (°C.) | Room temperature | 100 | Room temperature | Room temperature | Room temperature | Room temperature | Room temperature |
| | | Temperature of substrate (°C.) | 50 | 80 | 80 | 80 | 80 | 100 | 100 |
| | | Pressure (torr) | 10 | 6 | | | 6 | 4 | 4 |
| | Heating (°C.) | 160 | 120 | 160 | 160 | Sheet was torn | Sheet was torn | Sheet was torn |
| | conditions (minutes) | 30 | 20 | 30 | 20 | | | |
| Physical properties of coating | Hardness | H | H | H | H | | | |
| | Adhesion (number of squares remaining) | 100 | 100 | 100 | 100 | | | |
| | Gross value | | | 88 | | | | |
| | Rust formation | | | None | | | | |
| | Photochromic property*3 | ○ | ○ | | ○ | | | |

*1 Abbrevations for covering methods are as follows: V, vacuum adhesion formation; I, insertion injection; P, vacuum pressing with bowl-shaped mold.
*2 Abbreviations concerning the substrate are as follows: a, hemispherical substrate with a radius of 15 cm coated with acrylic melamine; b, percelain bowl with an uppermost radius of 10 cm, height of 6 cm, and base radius of 6 cm; c, polypropylene hemisphere with a radius of 15 cm, e, 10 cm cube of SS-41 steel plate surface-treated with dilute nitric acid and washed with deionized water; g, SS-41 steel bowl with an uppermost radius of 10 cm, height of 6 cm, and base radius of 6 cm.
*3 The coatings indicated with the mark "○" have photochromic property.

The compositions used in Examples B.44–B.47 described below are listed collectively in Table B.9. The acrylic polyamine was obtained by copolymerization of the monomers specified under "Components" in Table B.9.

In Table B.9, *1 indicates the ratio of the number of isocyanate groups in the blocked isocyanate to the number of amino groups in the acrylic polyamine, and *2 indicates the ratio of the number of isocyanate groups in the blocked isocyanate to the total number of amino groups in the acrylic polyamine and acrylic polyamine oligomer. The numbers in parentheses in row *3 indicate the percentage of amino groups to be reacted in the acrylic polyamine with the isocyanate groups of CO-LONATE L.

The following copolymer was used as the acrylic polyamine oligomer: a copolymer of butyl acrylate, ethyl methacrylate and 4-aminobutyl methacrylate, $\overline{Mw}=5,000$, $Tg=-20°$ C., $NH_2$ value 100.

The compositions used in Examples B.48–B.51 described below are listed collectively in Table B.10. The acrylic polycarboxylic acid was obtained by copolymerization of the monomers specified under "Components" in Table B.10.

In Table B.10, *1 indicates the ratio of the number of isocyanate groups in the blocked isocyanate to the number of carboxyl groups in the acrylic polycarboxylic acid, and *2 indicates the ratio of the number of isocyanate groups in the blocked isocyanate to the total number of carboxyl groups in the acrylic polycarboxylic acid and acrylic polycarboxylic acid oligomer. The numbers in parentheses in row *3 indicate the percentage of functional groups to be reacted in the acrylic polycarboxylic acid with the isocyanate groups of CO-LONATE L.

The following copolymer was used as the acrylic polycarboxylic acid oligomer: a copolymer of butyl acrylate, butyl methacrylate and methacrylic acid, $\overline{Mw}=3,000$, $Tg=-35°$ C., COOH value 150.

The compositions used in Examples B.52–B.55 described below are listed collectively in Table B.11. The acrylic polyamine was obtained by copolymerization of the monomers specified under "Components" in Table B.11.

In Table B.11, *1 indicates the ratio of the number of isocyanate groups in the blocked isocyanate to the number of functional groups in the reactive acrylic resin; *2 indicates the ratio of the number of isocyanate groups in the blocked isocyanate to the total number of functional groups in the reactive acrylic resin and acrylic polyol oligomer; and *3 indicates the ratio of the number of isocyanate groups in the blocked isocyanate to the total number of functional groups in the reactive acrylic resin, and the acrylic polyamine oligomer and/or the acrylic polycarboxylic acid oligomer. The numbers in parentheses in row *4 indicate the percentage of total functional groups to be reacted with the isocyanate groups of COLONATE L, the functional groups being contained in the reactive acrylic resin, acrylic polyamine oligomer and acrylic polycarboxylic acid oligomer.

The values indicated by 1)–3) in Table B.11 represent parts by weight of the following compounds.

1) NIKALITE H-870 (classified into acrylic polyol oligomer).

2) Copolymer of butyl acrylate, ethyl methacrylate and 4-aminobutyl methacrylate, $\overline{Mw}=5,000$, $Tg=-20°$ C., $NH_2$ value 100 (classified into acrylic polyamine oligomer).

3) Copolymer of butyl acrylate, butyl methacrylate and methacrylic acid, $\overline{Mw}=3,000$, $Tg=-35°$ C., COOH value 150 (classified into acrylic polycarboxylic acid oligomer).

Examples B.44–B.46

A mixture was obtained by kneading of the components indicated in Table B.9 in the same way as used in Example B.34. A thermosetting covering sheet was obtained by coating the mixture onto a PET film as described in Example B.1 and drying the coating under the conditions indicated in Table B.12. The thickness of the sheet so obtained is shown in Table B.12. Under the conditions shown in Table B.12, the sheet was attached to a given substrate and hardened in the same way as described in Example B.1. The surface hardness of the coated substrate so obtained and the degree of adhesion of the sheet to the substrate were evaluated. The dew condensation test was also carried out. The results of these tests are as shown in Table B.12.

Example B.47

A mixture was obtained by thorough kneading of the components indicated in Table B.9, other than the isocyanate (COLONATE L), with a 3-cylinder mixing roller. Then the isocyanate (COLONATE L) was added and mixed with agitation. A thermosetting covering sheet was obtained by coating the mixture thus obtained onto a PET film and drying the coating as described in Example B.1. The thickness of the sheet so obtained was 60 μm. The sheet was treated and hardened in the same way as described in Example B.9. The surface hardness of the coated substrate so obtained and the degree of adhesion of the sheet to the substrate were evaluated. The dew condensation test was also carried out. The results are shown in Table B.12.

Examples B.48–B.50

A mixture was obtained by kneading of the components indicated in Table B.10 in the same way as used in Example B.34. A thermosetting covering sheet was obtained by coating the mixture onto a PET film as described in Example B.1 and drying the coating under the conditions indicated in Table B.12. The thickness of the sheet so obtained is shown in Table B.12. Under the conditions shown in Table B.12, the sheet was attached to a given substrate and hardened in the same way as described in Example B.1. The surface hardness of the coated substrate so obtained and the degree of adhesion of the sheet to the substrate were evaluated. The dew condensation test was also carried out. The results of these tests are as shown in Table B.12.

Example B.51

A mixture was obtained by thorough kneading of the components indicated in Table B.10, other than the isocyanate (COLONATE L), With a 3-cylinder mixing roller. Then the isocyanate (COLONATE L) was added and mixed with agitation. A thermosetting covering sheet was obtained by coating the mixture thus obtained onto a PET film as described in Example B.1 and drying the coating under the conditions shown in Table B.12. The thickness of the sheet so obtained was 150 μm. Under the conditions shown in Table B.12, the sheet was attached to a given substrate and hardened in the same way as described in Example B.11. The surface hardness of the coated substrate so obtained and the degree of adhesion of the sheet to the substrate were evaluated. The dew condensation test was also carried out. The results are shown in Table B.12.

Examples B.52–B.54

A mixture was obtained by kneading of the components indicated in Table B.11 in the same way as used in Example B.34. A thermosetting covering sheet was obtained by coating the mixture onto a PET film as described in Example B.1 and drying the coating under the conditions indicated in Table B.12. The thickness of the sheet so obtained is shown in Table B.12. Under the conditions shown in Table B.12, the sheet was attached to a given substrate and hardened in the same way as described in Example B.1. The surface hardness of the coated substrate so obtained and the degree of adhesion of the sheet to the substrate were evaluated. The dew condensation test was also carried out. The results of these tests are as shown in Table B.12.

Example B.55

A mixture was obtained by thorough kneading of the components indicated in Table B.11, other than the isocyanate (COLONATE L), with a 3-cylinder mixing roller. Then the isocyanate (COLONATE L) was added and mixed with agitation. A thermosetting covering sheet was obtained by coating the mixture thus obtained onto a PET film as described in Example B.1 and drying the coating under the conditions shown in Table B.12. The thickness of the sheet so obtained was 150 μm. Under the conditions shown in Table B.12, the sheet was attached to a given substrate and hardened in the same way as described in Example B.11. The surface hardness of the coated substrate so obtained and the degree of adhesion of the sheet to the substrate were evaluated. The dew condensation test was also carried out. The results are shown in Table B.12.

TABLE B.9

| | | Examples | | | |
|---|---|---|---|---|---|
| | | B.44 | B.45 | B.46 | B.47 |
| | Ethyl acetate | 300 | 300 | 300 | 300 |
| Acrylic poly- amine | Components | MM AM MA | MM AM BA | MM AM MB | MM AM BA MB |
| | $\overline{Mw}$ (×10³) | 432 | 352 | 552 | 456 |
| | Tg (°C.) | 20 | 30 | 40 | 30 |
| | $NH_2$ value | 80 | 60 | 80 | 100 |
| | Amount | 100 | 100 | 100 | 100 |
| Acrylic polyamine oligomer | | — | — | 30 | — |
| Blocked iso- cyanate | COLONATE 2513 | 47 | 35 | 65 | 47 |
| | $NCO/NH_2$ | *¹1.0 | *¹1.2 | *²1.0 | *¹0.8 |
| COLONATE L*³ | | — | — | — | 13 (30%) |
| Additives | Diatomaceous earth | 150 | 200 | — | — |
| | Pearlite | — | — | 150 | 200 |

Components of acrylic polyamine are abbreviated as follows: MM: Methyl methacrylate, AM: 2-Aminoethyl methacrylate, BA: Butyl acrylate, MA: Methyl acrylate, MB: Butyl methacrylate

TABLE B.10

| | | Examples | | | |
|---|---|---|---|---|---|
| | | B.48 | B.49 | B.50 | B.51 |
| | Ethyl acetate | 300 | 300 | 300 | 300 |
| Acrylic poly- carboxylic acid | Components | MM M BA MB | MM M MA | M MB ME | M MB ME A |
| | $\overline{Mw}$ (×10³) | 400 | 215 | 365 | 295 |
| | Tg (°C.) | 20 | 0 | 10 | 10 |
| | COOH value | 100 | 80 | 50 | 80 |
| | Amount | 100 | 100 | 100 | 100 |
| Acrylic polycarboxylic acid oligomer | | — | — | 20 | — |
| Blocked iso- cyanate | TAKENATE B-870N | 36 | 34 | 29 | 29 |
| | NCO/COOH | *¹1.0 | *¹1.2 | *²1.0 | *¹1.0 |
| COLONATE L*³ | | — | — | — | 6.9 (20%) |
| Additives | Diatomaceous earth | 150 | 200 | — | — |
| | Pearlite | — | — | 150 | 200 |

Components of acrylic polycarboxylic acid are abbreviated as follows: MM: Methyl methacrylate, M: Methacrylate acid, A: Acrylate acid, BA: Butyl acrylate, MA: Methyl acrylate, MB: Butyl methacrylate, ME: Ethyl methacrylate

TABLE B.11

|  |  | Examples |  |  |  |
|---|---|---|---|---|---|
|  |  | B.52 | B.53 | B.54 | B.55 |
|  | Ethyl acetate | 300 | 300 | 300 | 300 |
| Reactive acrylic resin | Components | MM M HA MB | MM HA M AM MB | MM HA AM ME | A MB AM ME |
|  | $\overline{Mw}$ (×10³) | 405 | 336 | 532 | 304 |
|  | Tg (°C.) | 40 | 20 | 30 | −10 |
|  | COOH value | 15 | 40 | — | 40 |
|  | NH₂ value | — | 40 | 60 | 40 |
|  | OH value | 80 | 40 | 40 | — |
|  | Amount | 100 | 100 | 100 | 100 |
| Acrylic polyamine oligomer |  | — | — | 2)20 | 2)20 |
| Acrylic polycarboxylic acid oligomer |  | — | — | — | 3)20 |
| Acrylic polyol oligomer |  | — | 1)10 | — | — |
| Blocked isocyanate | TAKENATE B-870N | 34 | 50 | 51 | 46 |
|  | NCO/functional group | *1.0 | *2.0 | *3.2 | *3.0 |
| COLONATE L*3 |  | — | — | — | 34 (60%) |
| Additives | Diatomaceous earth | 150 | 200 | — | — |
|  | Pearlite | — | — | 150 | 200 |

Components of reactive acrylic resin are abbreviated as follows: MM: Methyl methacrylate, M: Methacrylate acid, HA: 2-Hydroxyethyl acrylate, AM: 2-Aminoethyl methacrylate, MB: Butyl methacrylate, ME: Ethyl methacrylate The compositions used in Examples B.56–B.59 described below are listed collectively in Table B.13. The acrylic polyamine was obtained by copolymerization of the monomers specified under "Components" in Table B.13.

In Table B.13, *1 indicates the ratio of the number of isocyanate groups in the blocked isocyanate to the number of amino groups in the acrylic polyamine, and *2 indicates the ratio of the number of isocyanate groups in the blocked isocyanate to the total number of amino groups in the acrylic polyamine and acrylic polyamine oligomer. The numbers in parentheses in row *3 indicate the percentage of amino groups to be reacted in the acrylic polyamine with the isocyanate groups of COLONATE L.

The following copolymer was used as the acrylic polyamine oligomer: a copolymer of butyl acrylate, ethyl methacrylate and 4-aminobutyl methacrylate, $\overline{Mw}=5,000$, Tg = −20° C., NH₂ value 100.

In Table B.13, the values indicated by a)–d) represent parts by weight of the following components.

a) 1,3,3-Trimethylnaphthoxazine
b) 1,3,3-Trimethyl-6'-nitronaphthoxazine.
c) 1,3,3-Trimethyl-6-chloronaphthoxazine.
d) 1-Benzo-3,3-dimethylnaphthoxazine.

The compositions used in Examples B.60–B.63 described below are listed collectively in Table B.14. The acrylic polycarboxylic acid was obtained by copolymerization of the monomers specified under "Components" in Table B.14.

In Table B.14, *1 indicates the ratio of the number of isocyanate groups in the blocked isocyanate to the number of carboxyl groups in the acrylic polycarboxylic acid, and *2 indicates the ratio of the number of isocyanate groups in the blocked isocyanate to the total number of carboxyl groups in the acrylic polycarboxylic acid and acrylic polycarboxylic acid oligomer. The numbers in parentheses in row *3 indicate the percentage of functional groups to be reacted in the acrylic polycarboxylic acid with the isocyanate groups of COLONATE L.

TABLE B.12

|  |  | Examples |  |  |  |  |  |  |  |  |  |  |  |
|---|---|---|---|---|---|---|---|---|---|---|---|---|---|
|  |  | B.44 | B.45 | B.46 | B.47 | B.48 | B.49 | B.50 | B.51 | B.52 | B.53 | B.54 | B.55 |
| Preparation of sheet | Drying (°C.) | 80 | 80 | 80 | 80 | 80 | 80 | 80 | 80 | 80 | 80 | 80 | 80 |
|  | conditions (minutes) | 10 | 10 | 10 | 10 | 10 | 10 | 10 | 10 | 10 | 10 | 10 | 10 |
|  | Thickness (μm) | 100 | 100 | 60 | 60 | 100 | 100 | 60 | 150 | 100 | 100 | 60 | 150 |
| Covering conditions | Covering method*1 | V | V | V | I | V | V | V | P | V | V | V | P |
|  | Substrate*2 | a | b | c |  | a | b | c | g | a | b | c | g |
|  | Attachment conditions of sheet | Temperature (°C.) | Room temperature | Room temperature | Room temperature |  | Room temperature | Room temperature | Room temperature | Room temperature | Room temperature | Room temperature | Room temperature | Room temperature |
|  |  | Temperature of substrate (°C.) | 70 | 70 | 70 |  | 70 | 70 | 70 | 120 | 70 | 70 | 70 | 100 |
|  |  | Pressure (torr) | 10 | 6 | 10 |  | 10 | 6 | 10 |  | 10 | 6 | 10 |  |
|  | Heating (°C.) | 160 | 160 | 160 | 160 | 160 | 160 | 160 | 160 | 160 | 160 | 160 | 160 |
|  | conditions (minutes) | 30 | 30 | 30 | 30 | 20 | 30 | 20 | 20 | 30 | 30 | 30 | 30 |
| Physical properties of coating | Hardness | H | H | 2H | H | HB | HB | HB | 2H | H | 2H | B |  |
|  | Adhesion (number of squares remaining) | 100 | 100 | 100 | 100 | 100 | 100 | 100 | 100 | 100 | 100 | 100 | 100 |
|  | Dew condensation test | None | None | None | None | None | None | None | None | None | None | None | None |

*1 Abbreviations for covering methods are as follows: V, vacuum adhesion formation; I, insertion injection; P, vacuum pressing with bowl-shaped mold.
*2 Abbreviations concerning the substrate are as follows: a, hemispherical substrate with a radius of 15 cm coated with acrylic melamine; b, percelain bowl with an uppermost radius of 10 cm, height of 6 cm, and base radius of 6 cm; c, polypropylene hemisphere with a radius of 15 cm; g, SS-41 steel bowl with an uppermost radius of 10 cm, height of 6 cm, and base radius of 6 cm.

The following copolymer was used as the acrylic polycarboxylic acid: a copolymer of butyl acrylate, butyl methacrylate and methacrylic acid, $\overline{Mw}=3,000$, Tg = −35° C., COOH value 150.

In Table B.14, the values indicated by a)–d) represent parts by weight of the following components.

a) 1,3,3-Trimethylnaphthoxazine.
b) 1,3,3-Trimethyl-6'-nitronaphthoxazine.
c) 1,3,3-Trimethyl-6-chloronaphthoxazine.
d) 1-Benzo-3,3-dimethylnaphthoxazine.

The compositions used in Examples B.64–B.67 described below are listed collectively in Table B.15. The reactive acrylic resin was obtained by copolymerization of the monomers specified under "Components" in Table B.15.

In Table B.15, *1 indicates the ratio of the number of isocyanate groups in the blocked isocyanate to the number of functional groups in the reactive acrylic resin; *2 indicates the ratio of the number of isocyanate groups in the blocked isocyanate to the total number of functional groups in the reactive acrylic resin and acrylic polyol oligomer; and *3 indicates the ratio of the number of isocyanate groups in the blocked isocyanate to the total number of functional groups in the reactive acrylic resin, and in the acrylic polyamine oligomer and/or the acrylic polycarboxylic acid oligomer. The numbers in parentheses in row *4 indicate the percentage of total functional groups to be reacted in the reactive acrylic resin, acrylic polyamine oligomer and acrylic polycarboxylic acid oligomer, with the isocyanate groups of COLONATE L.

The values indicated by 1)-3) in Table B.15 represent parts by weight of the following compounds.

1) NIKALITE H-870 (classified into acrylic polyol oligomer).

2) Copolymer of butyl acrylate, ethyl methacrylate and 4-aminobutyl methacrylate, $\overline{Mw}=5,000$, $Tg=-20°$ C., $NH_2$ value 100 (classified into acrylic polyamine oligomer).

3) Copolymer of butyl acrylate, butyl methacrylate and methacrylic acid, $\overline{Mw}=3,000$, $Tg=-35°$ C., COOH value 150 (classified into acrylic polycarboxylic acid oligomer).

In Table B.15, the values indicated by a)-d) represent parts by weight of the following components.

a) 1,3,3-Trimethylnaphthoxazine.
b) 1,3,3-Trimethyl-6'-nitronaphthoxazine.
c) 1,3,3-Trimethyl-6-chloronaphthoxazine.
d) 1-Benzo-3,3-dimethylnaphthoxazine.

Examples B.56-B.58

A mixture was obtained by kneading of the components indicated in Table B.13 in the same way as used in Example B.34. A thermosetting covering sheet was obtained by coating the mixture onto a PET film as described in Example B.1 and drying the coating under the conditions indicated in Table B.16. The thickness of the sheet so obtained is shown in Table B.16. Under the conditions shown in Table B.16, the sheet was attached to a given substrate and hardened in the same way as described in Example B.1. The surface hardness and photochromic properties of the coated substrate so obtained and the degree of adhesion of the sheet to the substrate were evaluated. The results of these tests are as shown in Table B.16.

Example B.59

A mixture was obtained by thorough kneading of the components indicated in Table B.13, other than the isocyanate (COLONATE L), with a 3-cylinder mixing roller. Then the isocyanate (COLONATE L) was added and mixed with agitation. A thermosetting covering sheet was obtained by coating the mixture thus obtained onto a PET film and drying the coating as described in Example B.1. The thickness of the sheet so obtained was 60 μm. The sheet was hardened in the same way as described in Example B.9. The surface hardness and photochromic properties of the coated substrate so obtained and the degree of adhesion of the sheet to the substrate were evaluated. The results are shown in Table B.16.

Examples B.60-B.62

A mixture was obtained by kneading of the components indicated in Table B.14 in the same way as used in Example B.34. A thermosetting covering sheet was obtained by coating the mixture onto a PET film as described in Example B.1 and drying the coating under the conditions indicated in Table B.16. The thickness of the sheet so obtained is shown in Table B.16. Under the conditions shown in Table B.16, the sheet was attached to a given substrate and hardened in the same way as described in Example B.1. The surface hardness and photochromic properties of the coated substrate so obtained and the degree of adhesion of the sheet to the substrate were evaluated. The results of these tests are as shown in Table B.16.

Example B.63

A mixture was obtained by thorough kneading of the components indicated in Table B.14, other than the isocyanate (COLONATE L), with a 3-cylinder mixing roller. Then the isocyanate (COLONATE L) was added and mixed with agitation. A thermosetting covering sheet was obtained by coating the mixture thus obtained onto a PET film as described in Example B.1 and drying the coating under the conditions shown in Table B.16. The thickness of the sheet so obtained was 150 μm. Under the conditions shown in Table B.16, the sheet was attached to a given substrate and hardened in the same way as described in Example B.11. The surface hardness and photochromic properties of the coated substrate so obtained and the degree of adhesion of the sheet to the substrate were evaluated. The results are shown in Table B.16.

Examples B.64-B.66

A mixture was obtained by kneading of the components indicated in Table B.15 in the same way as used in Example B.34. A thermosetting covering sheet was obtained by coating the mixture onto a PET film as described in Example B.1 and drying the coating under the conditions indicated in Table B.16. The thickness of the sheet so obtained is shown in Table B.16. Under the conditions shown in Table B.16, the sheet was attached to a given substrate and hardened in the same way as described in Example B.1. The surface hardness and photochromic properties of the coated substrate so obtained and the degree of adhesion of the sheet to the substrate were evaluated. The results of these tests are as shown in Table B.16.

Example B.67

A mixture was obtained by thorough kneading of the components indicated in Table B.15, other than the isocyanate (COLONATE L), with a 3-cylinder mixing roller. Then the isocyanate (COLONATE L) was added and mixed with agitation. A thermosetting covering sheet was obtained by coating the mixture thus obtained onto a PET film as described in Example B.1 and drying the coating under the conditions shown in Table B.16. The thickness of the sheet so obtained was 150 m. Under the conditions shown in Table B.16, the sheet was attached to a given substrate and hardened in the same way as described in Example B.11. The surface hardness and photochromic properties of the coated substrate so obtained and the degree of adhesion of the sheet to the substrate were evaluated. The results are shown in Table B.16.

TABLE B.13

|  |  | Examples | | | |
|---|---|---|---|---|---|
|  |  | B.56 | B.57 | B.58 | B.59 |
|  | Ethyl acetate | 300 | 300 | 300 | 300 |
| Acrylic poly-amine | Components | MM AM MA | MM AM BA | MM AM MB | MM AM BA MB |
|  | $\overline{Mw}$ (×10³) | 432 | 352 | 552 | 456 |
|  | Tg (°C.) | 20 | 30 | 40 | 30 |
|  | NH₂ value | 80 | 60 | 80 | 100 |
|  | Amount | 100 | 100 | 100 | 100 |
| Acrylic polyamine oligomer |  | — | — | 30 | — |
| Blocked iso-cyanate | COLONATE 2513 NCO/NH₂ | 47 *1.0 | 35 *1.2 | 65 *1.0 | 47 *0.8 |
| COLONATE L*³ |  | — | — | — | 13 (30%) |
| Photochromic compound |  | a)2 | b)3 | c)3 | d)2 |

Components of acrylic polyamine are abbreviated as follows: MM: Methyl methacrylate, AM: 2-Aminoethyl methacrylate, BA: Butyl acrylate, MA: Methyl acrylate, MB: Butyl methacrylate

TABLE B.14

|  | Examples | | | |
|---|---|---|---|---|
|  | B.60 | B.61 | B.62 | B.63 |
| Ethyl acetate | 300 | 300 | 300 | 300 |
| Acrylic poly-carboxy-lic acid | Components | MM M BA MB | MM M MA | M MB ME | M MB ME A |
|  | $\overline{Mw}$ (×10³) | 400 | 215 | 365 | 295 |
|  | Tg (°C.) | 20 | 0 | 10 | 10 |
|  | COOH value | 100 | 80 | 50 | 80 |
|  | Amount | 100 | 100 | 100 | 100 |
| Acrylic polycarboxylic acid oligomer |  | — | — | 20 | — |
| Blocked iso-cyanate | TAKENATE B-870N NCO/COOH | 36 *1.0 | 34 *1.2 | 29 *1.0 | 29 *1.0 |
| COLONATE L*³ |  | — | — | — | 6.9 (20%) |
| Photochromic compound |  | a)3 | b)3 | c)2 | d)2 |

Components of acrylic polycarboxylic acid are abbreviated as follows: MM: Methyl methacrylate, M: Methacrylic acid, A: Acrylic acid, BA: Butyl acrylate, MA: Methyl acrylate, MB: Butyl methacrylate, ME: Ethyl methacrylate

TABLE B.15

|  |  | Examples | | | |
|---|---|---|---|---|---|
|  |  | B.64 | B.65 | B.66 | B.67 |
|  | Ethyl acetate | 300 | 300 | 300 | 300 |
| Reactive acrylic resin | Components | MM M HA MB | MM HA M AM MB | MM HA AM ME | A MB AM ME |
|  | $\overline{Mw}$ (×10³) | 405 | 336 | 532 | 304 |
|  | Tg (°C.) | 40 | 20 | 30 | −10 |
|  | COOH value | 15 | 40 | — | 40 |
|  | NH₂ value | — | 40 | 60 | 40 |
|  | OH value | 80 | 40 | 40 | — |
|  | Amount | 100 | 100 | 100 | 100 |
| Acrylic polyamine oligomer |  | — | — | 2)20 | 2)20 |
| Acrylic polycarboxylic acid oligomer |  | — | — | — | 3)20 |
| Acrylic polyol oligomer |  | — | 1)10 | — | — |
| Blocked iso-cyanate | TAKENATE B-870N NCO/ functional group | 34 *1.0 | 50 *2 1.0 | 51 *3 1.2 | 46 *3 1.0 |
| COLONATE L*³ |  | — | — | — | 34 (60%) |
| Photochromic compound |  | a)3 | b)2 | c)3 | d)2 |

Components of reactive acrylic resin are abbreviated as follows. MM: Methyl methacrylate, M: Methacrylate acid, HA: 2-Hydroxyethyl acrylate, AM: 2-Aminoethyl methacrylate, MB: Butyl methacrylate, ME: Ethyl methacrylate

TABLE B.16

|  |  | Examples | | | | | | | | | | | |
|---|---|---|---|---|---|---|---|---|---|---|---|---|---|
|  |  | B.56 | B.57 | B.58 | B.59 | B.60 | B.61 | B.62 | B.63 | B.64 | B.65 | B.66 | B.67 |
| Preparation of sheet | Drying (°C.) | 80 | 80 | 80 | 80 | 80 | 80 | 80 | 80 | 80 | 80 | 80 | 80 |
|  | conditions (minutes) | 10 | 10 | 10 | 10 | 10 | 10 | 10 | 10 | 10 | 10 | 10 | 10 |
|  | Thickness (μm) | 100 | 100 | 60 | 60 | 100 | 100 | 60 | 150 | 100 | 100 | 60 | 150 |
| Covering conditions | Covering method*¹ | V | V | V | I | V | V | V | P | V | V | V | P |
|  | Substrate*² | a | b | c | c | a | b | c | g | a | b | c | g |
| Attachment conditions | Temperature of sheet | Room temperature | Room temperature | Room temperature | Room temperature | Room temperature | Room temperature | Room temperature | Room temperature | Room temperature | Room temperature | Room temperature | Room temperature |
|  | Temperature of substrate (°C.) | 70 | 70 | 70 |  | 70 | 70 | 70 | 120 | 70 | 70 | 70 | 100 |
|  | Pressure (torr) | 10 | 6 | 10 |  | 10 | 6 | 10 |  | 10 | 6 | 10 |  |
|  | Heating (°C.) | 160 | 160 | 160 | 160 | 160 | 160 | 160 | 160 | 160 | 160 | 160 | 160 |
|  | conditions (minutes) | 30 | 30 | 30 | 30 | 20 | 30 | 20 | 20 | 30 | 30 | 30 | 30 |
| Physical properties of coating | Hardness | H | H | 2H | 2H | H | HB | HB | HB | 2H | H | 2H | B |
|  | Adhesion (number of squares remaining) | 100 | 100 | 100 | 100 | 100 | 100 | 100 | 100 | 100 | 100 | 100 | 100 |
|  | Photochromic property*³ | ○ | ○ | ○ | ○ | ○ | ○ | ○ | ○ | ○ | ○ | ○ | ○ |

*¹Abbreviations for covering methods are as follows: V, vacuum adhesion formation; I, insertion injection; P, vacuum pressing with bowl-shaped mold.
*²Abbreviations concerning the substrate are as follows: a, hemispherical substrate with a radius of 15 cm coated with acrylic melamine; b, percelain bowl with an uppermost radius of 10 cm, height of 6 cm, and base radius of 6 cm; c, polypropylene hemisphere with a radius of 15 cm; g, SS-41 steel bowl with an uppermost radius of 10 cm, height of 6 cm, and base radius of 6 cm.
*³The coatings indicated with the mark "○" have photochromic property.

The compositions used in Examples B.68–B.71 described below are listed collectively in Table B.17. The acrylic polyamine was obtained by copolymerization of the monomers specified under "Components" in Table B.17.

In Table B.17, *1 indicates the ratio of the number of isocyanate groups in the blocked isocyanate to the number of amino groups in the acrylic polyamine, and *2 indicates the ratio of the number of isocyanate groups in the blocked isocyanate to the total number of amino groups in the acrylic polyamine and acrylic polyamine oligomer. The numbers in parentheses in row *3 indicate the percentage of amino groups to be reacted in the acrylic polyamine with the isocyanate groups of COLONATE L.

The following copolymer was used as the acrylic polyamine oligomer: a copolymer of butyl acrylate, ethyl methacrylate and 4-aminobutyl methacrylate, $\overline{Mw}=5,000$, $Tg=-20°$ C., $NH_2$ value 100.

The compositions used in Examples B.72–B.75 described below are listed collectively in Table B.18. The acrylic polycarboxylic acid was obtained by copolymerization of the monomers specified under "Components" in Table B.18.

In Table B.18, *1 indicates the ratio of the number of isocyanate groups in the blocked isocyanate to the number of carboxyl groups in the acrylic polycarboxylic acid, and *2 indicates the ratio of the number of isocyanate groups in the blocked isocyanate to the total number of carboxyl groups in the acrylic polycarboxylic acid and acrylic polycarboxylic acid oligomer. The numbers in parentheses in row *3 indicate the percentage of functional groups to be reacted in the acrylic polycarboxylic acid with the isocyanate groups of COLONATE L.

The following copolymer was used as the acrylic polycarboxylic acid oligomer: a copolymer of butyl acrylate, butyl methacrylate and methacrylic acid, $\overline{Mw}=3,000$, $Tg=-35°$ C., COOH value 150.

The compositions used in Examples B.76–B.79 described below are listed collectively in Table B.19. The reactive acrylic resin was obtained by copolymerization of the monomers specified under "Components" in Table B.19.

In Table B.19, *1 indicates the ratio of the number of isocyanate groups in the blocked isocyanate to the number of functional groups in the reactive acrylic resin; *2 indicates the ratio of the number of isocyanate groups in the blocked isocyanate to the total number of functional groups in the reactive acrylic resin and acrylic polyol oligomer; and *3 indicates the ratio of the number of isocyanate groups in the blocked isocyanate to the total number of functional groups in the reactive acrylic resin, and in the acrylic polyamine oligomer and/or the acrylic polycarboxylic acid oligomer. The numbers in parentheses in row *4 indicate the percentage of total functional groups that had reacted in the reactive acrylic resin, acrylic polyamine oligomer and acrylic polycarboxylic acid oligomer with the isocyanate groups of COLONATE L.

The values indicated by 1)–3) in Table B.19 represent parts by weight of the following compounds.

1) NIKALITE H-870 (classified into acrylic polyol oligomer).

2) Copolymer of butyl acrylate, ethyl methacrylate and 4-aminobutyl methacrylate, $\overline{Mw}=5,000$, $Tg=-20°$ C., $NH_2$ value 100 (classified into acrylic polyamine oligomer).

3) Copolymer of butyl acrylate, butyl methacrylate and methacrylic acid, $\overline{Mw}=3,000$, $Tg=-35°$ C., COOH value 150 (classified into acrylic polycarboxylic acid oligomer).

Examples B.68–B.70

A mixture was obtained by kneading of the components indicated in Table B.17 in the same way as used in Example B.34. A thermosetting covering sheet was obtained by coating the mixture onto a PET film as described in Example B.1 and drying the coating under the conditions indicated in Table B.20. The thickness of the sheet so obtained is shown in Table B.20. Under the conditions shown in Table B.20, the sheet was attached to a given substrate and hardened in the same way as described in Example B.1. The surface hardness and gross value of the coated substrate so obtained and the degree of adhesion of the sheet to the substrate were evaluated. The results of these tests are as shown in Table B.20.

Example B.71

A mixture was obtained by thorough kneading of the components indicated in Table B.17, other than the isocyanate (COLONATE L), with a 3-cylinder mixing roller. Then the isocyanate (COLONATE L) was added and mixed with agitation. A thermosetting covering sheet was obtained by coating the mixture thus obtained onto a PET film and drying the coating as described in Example B.1. The thickness of the sheet so obtained was 60 μm. The sheet was hardened in the same way as described in Example B.9. The surface hardness and gross value of the coated substrate so obtained and the degree of adhesion of the sheet to the substrate were evaluated. The results are shown in Table B.20.

Examples B.72–B.74

A mixture was obtained by kneading of the components indicated in Table B.18 in the same way as used in Example B.34. A thermosetting covering sheet was obtained by coating the mixture onto a PET film as described in Example B.1 and drying the coating under the conditions indicated in Table B.20. The thickness of the sheet so obtained is shown in Table B.20. Under the conditions shown in Table B.20, the sheet was attached to a given substrate and hardened in the same way as described in Example B.1. The surface hardness and gross value of the coated substrate so obtained and the degree of adhesion of the sheet to the substrate were evaluated. The results of these tests are as shown in Table B.20.

Example B.75

A mixture was obtained by thorough kneading of the components indicated in Table B.18, other than the isocyanate (COLONATE L), with a 3-cylinder mixing roller. Then the isocyanate (COLONATE L) was added and mixed with agitation. A thermosetting covering sheet was obtained by coating the mixture thus obtained onto a PET film as described in Example B.1 and drying the coating under the conditions shown in Table B.20. The thickness of the sheet so obtained was 150 μm. Under the conditions shown in Table B.20, the sheet was attached to a given substrate and hardened in the same way as described in Example B.11. The surface hardness and gross value of the coated substrate so obtained and the degree of adhesion of the sheet to the substrate were evaluated. The results are shown in Table B.20.

Examples B.76–B.78

A mixture was obtained by kneading of the components indicated in Table B.19 in the same way as used in Example B.34. A thermosetting covering sheet was obtained by coating the mixture onto a PET film as described in Example B.1 and drying the coating under the conditions indicated in Table B.20. The thickness of the sheet so obtained is shown in Table B.20. Under the conditions shown in Table B.20, the sheet was attached to a given substrate and hardened in the same way as described in Example B.1. The surface hardness and gross value of the coated substrate so obtained and the degree of adhesion of the sheet to the substrate were evaluated. The results of these tests are as shown in Table B.20.

Example B.79

A mixture was obtained by thorough kneading of the components indicated in Table B.19, other than the isocyanate (COLONATE L), with a 3-cylinder mixing roller. Then the isocyanate (COLONATE L) was added and mixed with agitation. A thermosetting covering sheet was obtained by coating the mixture thus obtained onto a PET film as described in Example B.1 and drying the coating under the conditions shown in Table B.20. The thickness of the sheet so obtained was 150 μm. Under the conditions shown in Table B.20, the sheet was attached to a given substrate and hardened in the same way as described in Example B.11. The surface hardness and gross value of the coated substrate so obtained and the degree of adhesion of the sheet to the substrate were evaluated. The results are shown in Table B.20.

TABLE B.17

| | | Examples | | | |
|---|---|---|---|---|---|
| | | B.68 | B.69 | B.70 | B.71 |
| | Ethyl acetate | 300 | 300 | 300 | 300 |
| Acrylic poly-amine | Components | MM AM MA | MM AM BA | MM AM MB | MM AM BA MB |
| | $\overline{M}w$ (×10$^3$) | 432 | 352 | 552 | 456 |
| | Tg (°C.) | 20 | 30 | 40 | 30 |
| | NH$_2$ value | 80 | 60 | 80 | 100 |
| | Amount | 100 | 100 | 100 | 100 |
| Acrylic polyamine oligomer | | — | — | 30 | — |
| Blocked iso-cyanate | COLONATE 2513 NCO/NH$_2$ | 47 *$^1$1.0 | 35 *$^1$1.2 | 65 *$^2$1.0 | 47 *$^1$0.8 |
| COLONATE L*$^3$ | | — | — | — | 13 (30%) |
| Silica | | 200 | 250 | 250 | 300 |

Components of acrylic polyamine are abbreviated as follows. MM: Methyl methacrylate, AM: 2-Aminoethyl methacrylate, BA: Butyl acrylate, MA: Methyl acrylate, MB: Butyl methacrylate

TABLE B.18

| | Examples | | | |
|---|---|---|---|---|
| | B.72 | B.73 | B.74 | B.75 |
| Ethyl acetate | 300 | 300 | 300 | 300 |
| Acrylic polycarboxylic acid | | | | |
| Components | MM M BA MB | MM M MA | M MB ME | M MB ME A |
| $\overline{M}w$ (×10$^3$) | 400 | 215 | 365 | 295 |
| Tg (°C.) | 20 | 0 | 10 | 10 |
| COOH value | 100 | 80 | 50 | 80 |
| Amount | 100 | 100 | 100 | 100 |
| Acrylic polycarboxylic acid oligomer | — | — | 20 | — |
| Blocked isocyanate | | | | |
| TAKENATE B-870N NCO/COOH | 36 *$^1$1.0 | 34 *$^1$1.2 | 29 *$^2$1.0 | 29 *$^1$1.0 |
| COLONATE L*$^3$ | — | — | — | 6.9 (20%) |
| Silica | 200 | 250 | 250 | 300 |

Components of acrylic polycarboxylic acid are abbreviated as follows.
MM: Methyl methacrylate; M: Methacrylic acid, A: Acrylic acid, BA: Butyl acrylate, MA: Methyl acrylate, MB: Butyl methacrylate, ME: Ethyl methacrylate

TABLE B.19

| | Examples | | | |
|---|---|---|---|---|
| | B.76 | B.77 | B.78 | B.79 |
| Ethyl acetate | 300 | 300 | 300 | 300 |
| Reactive acrylic resin | | | | |
| Components | MM M HA MB | MM HA M AM MB | MM HA AM ME | A MB AM ME |
| $\overline{M}w$ (×10$^3$) | 405 | 336 | 532 | 304 |
| Tg (°C.) | 40 | 20 | 30 | −10 |
| COOH value | 15 | 40 | — | 40 |
| NH$_2$ value | — | 40 | 60 | 40 |
| OH value | 80 | 40 | 40 | — |
| Amount | 100 | 100 | 100 | 100 |
| Acrylic polyamine oligomer | — | — | $^{2)}$20 | $^{2)}$20 |
| Acrylic polycarboxylic acid oligomer | — | — | — | $^{3)}$20 |
| Acrylic polyol oligomer | — | $^{1)}$10 | — | — |
| Blocked isocyanate | | | | |
| TAKENATE B-870N NCO/functional group | 34 *$^1$1.0 | 50 *$^2$1.0 | 51 *$^3$1.2 | 46 *$^3$1.0 |
| COLONATE L*$^4$ | — | — | — | 34 (60%) |
| Silica | 200 | 250 | 250 | 300 |

Components of reactive acrylic resin are abbreviated as follows.
MM: Methyl methacrylate, M: Methacrylic acid, HA: 2-Hydroxyethyl acrylate, AM: 2-Aminoethyl methacrylate, MB: Butyl methacrylate, ME: Ethyl methacrylate

TABLE B.20

| | | Examples | | | | | | | | | | | |
|---|---|---|---|---|---|---|---|---|---|---|---|---|---|
| | | B.68 | B.69 | B.70 | B.71 | B.72 | B.73 | B.74 | B.75 | B.76 | B.77 | B.78 | B.79 |
| Preparation of sheet | Drying conditions | | | | | | | | | | | | |
| | (°C.) | 80 | 80 | 80 | 80 | 80 | 80 | 80 | 80 | 80 | 80 | 80 | 80 |
| | (minutes) | 10 | 10 | 10 | 10 | 10 | 10 | 10 | 10 | 10 | 10 | 10 | 10 |
| | Thickness (μm) | 100 | 100 | 60 | 60 | 100 | 100 | 60 | 150 | 100 | 100 | 60 | 150 |
| Covering conditions | Covering method*$^1$ | V | V | V | I | V | V | V | P | V | V | V | P |
| | Substrate*$^2$ | a | b | c | | a | b | c | g | a | b | c | g |
| | Attachment conditions | | | | | | | | | | | | |
| | Temperature of sheet (°C.) | Room temperature | Room temperature | Room temperature | | Room temperature | Room temperature | Room temperature | Room temperature | Room temperature | Room temperature | Room temperature | Room temperature |
| | Temperature of substrate (°C.) | 70 | 70 | 70 | | 70 | 70 | 70 | 120 | 70 | 70 | 70 | 100 |
| | Pressure (torr) | 10 | 6 | 10 | | 10 | 6 | 10 | | 10 | 6 | 10 | |
| | Heating conditions | | | | | | | | | | | | |
| | (°C.) | 160 | 160 | 160 | 160 | 160 | 160 | 160 | 160 | 160 | 160 | 160 | 160 |

TABLE B.20-continued

| | | Examples | | | | | | | | | | | |
|---|---|---|---|---|---|---|---|---|---|---|---|---|---|
| | | B.68 | B.69 | B.70 | B.71 | B.72 | B.73 | B.74 | B.75 | B.76 | B.77 | B.78 | B.79 |
| | (minutes) | 30 | 30 | 30 | 30 | 20 | 30 | 20 | 20 | 30 | 30 | 30 | 30 |
| Physical properties of coating | Hardness | H | H | 2H | 2H | H | HB | HB | HB | 2H | H | 2H | B |
| | Adhesion (number squares remaining) | 100 | 100 | 100 | 100 | 100 | 100 | 100 | 100 | 100 | 100 | 100 | 100 |
| | Gross value (%) | 40 | 30 | 30 | 25 | 40 | 30 | 30 | 30 | 40 | 30 | 25 | 25 |

*¹Abbreviations for covering methods are as follows:
V, vacuum adhesion formation;
I, insertion injection;
P, vacuum pressing with bowl-shaped mold.
*²Abbreviations concerning the substrate are as follows:
a, hemispherical substrate with a radius of 15 cm coated with acrylic melamine;
b, porcelain bowl with an uppermost radius of 10 cm, height of 6 cm, and base radius of 6 cm;
c, polypropylene hemisphere with a radius of 15 cm;
g, SS-41 steel bowl with an uppermost radius of 10 cm, height of 6 cm, and base radius of 6 cm.

The compositions used in Examples B.80–B.83 described below are listed collectively in Table B.21. The acrylic polyamine was obtained by copolymerization of the monomers specified under "Components" in Table B.21.

In Table B.21, *1 indicates the ratio of the number of isocyanate groups in the blocked isocyanate to the number of amino groups in the acrylic polyamine, and *2 indicates the ratio of the number of isocyanate groups in the blocked isocyanate to the total number of amino groups in the acrylic polyamine and acrylic polyamine oligomer. The numbers in parentheses in row *3 indicate the percentage of amino groups to be reacted with the isocyanate groups of COLONATE L.

The following copolymer was used as the acrylic polyamine oligomer: a copolymer of butyl acrylate, ethyl methacrylate and 4-aminobutyl methacrylate, $\overline{Mw}=5,000$, $Tg=-20°$ C., $NH_2$ value 100.

The values indicated by a)–c) in Table B.21 represent parts by weight of the following compounds.

a) Carbon black, mean particle size 0.3 μm.

b) Nickel powder, mean particle size 0.1 μm.

c) Silver powder, mean particle size 0.1 μm.

The compositions used in Examples B.84–B.87 described below are listed collectively in Table B.22. The acrylic polycarboxylic acid was obtained by copolymerization of the monomers specified under "Components" in Table B.22.

In Table B.22, *1 indicates the ratio of the number of isocyanate groups in the blocked isocyanate to the number of carboxyl groups in the acrylic polycarboxylic acid, and *2 indicates the ratio of the number of isocyanate groups in the blocked isocyanate to the total number of carboxyl groups in the acrylic polycarboxylic acid and acrylic polycarboxylic acid oligomer. The numbers in parentheses in row *3 indicate the percentage of functional groups to be reacted in the acrylic polycarboxylic acid with the isocyanate groups of COLONATE L.

The following copolymer was used as the acrylic polycarboxylic acid oligomer: a copolymer of butyl acrylate, butyl methacrylate and methacrylic acid, $\overline{Mw}=3,000$, $Tg=-35°$ C., COOH value 150.

The value indicated by a)–c) in Table B.22 represent parts by weight of the following compounds.

a) Carbon black, mean particle size 0.3 μm.

b) Nickel powder, mean particle size 0.1 μm.

c) Silver powder, mean particle size 0.1 μm.

The compositions used in Examples B.88–B.91 described below are listed collectively in Table B.23. The reactive acrylic resin was obtained by copolymerization of the monomers specified under "Components" in Table B.23.

In Table B.23, *1 indicates the ratio of the number of isocyanate groups in the blocked isocyanate to the number of functional groups in the reactive acrylic resin; *2 indicates the ratio of the number of isocyanate groups in the blocked isocyanate to the total number of functional groups in the reactive acrylic resin and acrylic polyol oligomer; and *3 indicates the ratio of the number of isocyanate groups in the blocked isocyanate to the total number of functional groups in the reactive acrylic resin, and the acrylic polyamine oligomer and/or the acrylic polycarboxylic acid oligomer. The numbers in parentheses in row *4 indicate the percentage of total functional groups to be reacted in the reactive acrylic resin, acrylic polyamine oligomer and acrylic polycarboxylic acid oligomer with the isocyanate groups of COLONATE L.

The values indicated by 1)–3) and a)–c) in Table B.23 represent parts by weight of the following compounds.

1) NIKALITE H-870 (classified into acrylic polyol oligomer).

2) Copolymer of butyl acrylate, ethyl methacrylate and 4-aminobutyl methacrylate, $\overline{Mw}=5,000$, $Tg=-20°$ C., $NH_2$ value 100 (classified into acrylic polyamine oligomer).

3) Copolymer of butyl acrylate, butyl methacrylate and methacrylic acid, $\overline{Mw}=3,000$, $Tg=-35°$ C., COOH value 150 (classified into acrylic polycarboxylic acid oligomer).

a) Carbon black, mean particle size 0.3 μm.

b) Nickel powder, mean particle size 0.1 μm.

c) Silver powder, mean particle size 0.1 μm.

Examples B.80–B.82

A mixture was obtained by kneading of the components indicated in Table B.21 in the same way as used in Example B.34. A thermosetting covering sheet was obtained by coating the mixture onto a PET film as described in Example B.1 and drying the coating under the conditions indicated in Table B.24. The thickness of the sheet so obtained is shown in Table B.24. Under the conditions shown in Table B.24, the sheet was attached to a given substrate and hardened in the same way as described in Example B.1. The surface hardness and volume resistivity of the coated substrate so obtained and the degree of adhesion of the sheet to the substrate were evaluated. The results of these tests are as shown in Table B.24.

Example B.83

A mixture was obtained by thorough kneading of the components indicated in Table B.21, other than the isocyanate (COLONATE L), with a 3-cylinder mixing roller. Then the isocyanate (COLONATE L) was added and mixed with agitation. A thermosetting covering sheet was obtained by coating the mixture thus obtained onto a PET film and drying the coating as described in Example B.1. The thickness of the sheet so obtained was 60 μm. The sheet was hardened in the same way as described in Example B.9. The surface hardness and volume resistivity of the coated substrate so obtained and the degree of adhesion of the sheet to the substrate were evaluated. The results are shown in Table B.24.

Examples B.84–B.86

A mixture was obtained by kneading of the components indicated in Table B.22 in the same way as used in Example B.34. A thermosetting covering sheet was obtained by coating the mixture onto a PET film as described in Example B.1 and drying the coating under the conditions indicated in Table B.24. The thickness of the sheet so obtained is shown in Table B.24. Under the conditions shown in Table B.24, the sheet was attached to a given substrate and hardened in the same way as described in Example B.1. The surface hardness and volume resistivity of the coated substrate so obtained and the degree of adhesion of the sheet to the substrate were evaluated. The results of these tests are as shown in Table B.24.

Example B.87

A mixture was obtained by thorough kneading of the components indicated in Table B.22, other than the isocyanate (COLONATE L), with a 3-cylinder mixing roller. Then the isocyanate (COLONATE L) was added and mixed with agitation. A thermosetting covering sheet was obtained by coating the mixture thus obtained onto a PET film as described in Example B.1 and drying the coating under the conditions shown in Table B.24. The thickness of the sheet so obtained was 150 μm. Under the conditions shown in Table B.24, the sheet was attached to a given substrate and hardened in the same way as described in Example B.11. The surface hardness and volume resistivity of the coated substrate so obtained and the degree of adhesion of the sheet to the substrate were evaluated. The results are shown in Table B.24.

Examples B.88–B.9

A mixture was obtained by kneading of the components indicated in Table B.23 in the same way as used in Example B.34. A thermosetting covering sheet was obtained by coating the mixture onto a PET film as described in Example B.1 and drying the coating under the conditions indicated in Table B.24. The thickness of the sheet so obtained is shown in Table B.24. Under the conditions shown in Table B.24, the sheet was attached to a given substrate and hardened in the same way as described in Example B.1. The surface hardness and volume resistivity of the coated substrate so obtained and the degree of adhesion of the sheet to the substrate were evaluated. The results of these tests are as shown in Table B.24.

Example B.91

A mixture was obtained by thorough kneading of the components indicated in Table B.23, other than the isocyanate (COLONATE L), with a 3-cylinder mixing roller. Then the isocyanate (COLONATE L) was added and mixed with agitation. A thermosetting covering sheet was obtained by coating the mixture thus obtained onto a PET film as described in Example B.1 and drying the coating under the conditions shown in Table B.24. The thickness of the sheet so obtained was 150 m. Under the conditions shown in Table B.24, the sheet was attached to a given substrate and hardened in the same way as described in Example B.11. The surface hardness and volume resistivity of the coated substrate so obtained and the degree of adhesion of the sheet to the substrate were evaluated. The results are shown in Table B.24.

TABLE B.21

|  | Examples | | | |
|---|---|---|---|---|
|  | B.80 | B.81 | B.82 | B.83 |
| Ethyl acetate | 300 | 300 | 300 | 300 |
| Acrylic polyamine | | | | |
| Components | MM | MM | MM | MM |
|  | AM | AM | AM | AM |
|  | MA | BA | MB | BA |
|  |  |  |  | MB |
| $\overline{Mw}$ (×$10^3$) | 432 | 352 | 552 | 456 |
| Tg (°C.) | 20 | 30 | 40 | 30 |
| $NH_2$ value | 80 | 60 | 80 | 100 |
| Amount | 100 | 100 | 100 | 100 |
| Acrylic polyamine oligomer | — | — | 30 | — |
| Blocked isocyanate | | | | |
| COLONATE 2513 | 47 | 35 | 65 | 47 |
| $NCO/NH_2$ | *[1]1.0 | *[1]1.2 | *[2]1.0 | *[1]0.8 |
| COLONATE L*[3] | — | — | — | 13 |
|  |  |  |  | (30%) |
| Additive | a)30 | b)125 | c)20 | c)30 |

Components of acrylic polyamine are abbreviated as follows.
MM: Methyl methacrylate, AM: 2-Aminoethyl methacrylate, BA: Butyl acrylate, MA: Methyl acrylate, MB: Butyl methacrylate

TABLE B.22

|  | Examples | | | |
|---|---|---|---|---|
|  | B.84 | B.85 | B.86 | B.87 |
| Ethyl acetate | 300 | 300 | 300 | 300 |
| Acrylic polycarboxylic acid | | | | |
| Components | MM | MM | M | M |
|  | M | M | MB | MB |
|  | BA | MA | ME | ME |
|  | MB |  |  | A |
| $\overline{Mw}$ (×$10^3$) | 400 | 215 | 365 | 295 |
| Tg (°C.) | 20 | 0 | 10 | 10 |
| COOH value | 100 | 80 | 50 | 80 |
| Amount | 100 | 100 | 100 | 100 |
| Acrylic polycarboxylic acid oligomer | — | — | 20 | — |
| Blocked isocyanate | | | | |
| TAKENATE B-870N | 36 | 34 | 29 | 29 |
| NCO/COOH | *[1]1.0 | *[1]1.2 | *[2]1.0 | *[1]1.0 |
| COLONATE L*[3] | — | — | — | 6.9 |
|  |  |  |  | (20%) |
| Additive | a)15 | b)125 | c)20 | c)30 |

Components of acrylic polycarboxylic acid are abbreviated as follows.
MM: Methyl methacrylate, M: Methacrylic acid, A: Acrylic acid, BA: Butyl acrylate, MA: Methyl acrylate, MB: Butyl methacrylate, ME: Ethyl methacrylate

TABLE B.23

|  | Examples | | | |
|---|---|---|---|---|
|  | B.88 | B.89 | B.90 | B.91 |
| Ethyl acetate | 300 | 300 | 300 | 300 |
| Reactive acrylic resin | | | | |
| Components | MM | MM | MM | A |
|  | M | HA | HA | MB |
|  | HA | M | AM | AM |
|  | MB | AM | ME | ME |
|  |  | MB |  |  |
| $\overline{Mw}$ (×$10^3$) | 405 | 336 | 532 | 304 |
| Tg (°C.) | 40 | 20 | 30 | −10 |
| COOH value | 15 | 40 | — | 40 |
| $NH_2$ value | — | 40 | 60 | 40 |
| OH value | 80 | 40 | 40 | — |

TABLE B.23-continued

|  | Examples | | | |
|---|---|---|---|---|
|  | B.88 | B.89 | B.90 | B.91 |
| Amount | 100 | 100 | 100 | 100 |
| Acrylic polyamine oligomer | — | — | 2)20 | 2)20 |
| Acrylic polycarboxylic acid oligomer | — | — | — | 3)20 |
| Acrylic polyol oligomer | — | 1)10 | — | — |
| Blocked isocyanate | | | | |
| TAKENATE B-870N | 34 | 50 | 51 | 46 |
| NCO/functional group | *1)1.0 | *2)1.0 | *3)1.2 | *3)1.0 |
| COLONATE L*4 | — | — | — | 34 (60%) |
| Additive | a)30 | b)125 | c)30 | c)40 |

Components of reactive acrylic resin are abbreviated as follows.
MM: Methyl methacrylate, M: Methacrylic acid, HA: 2-Hydroxyethyl acrylate, AM: 2-Aminoethyl methacrylate, MB: Butyl methacrylate, ME: Ethyl methacrylate Preparation of Surface Resin Layers Surface Resin Layer I First, 49 parts of blocked isocyanate (TAKENATE B-815N) were added to 100 parts of acrylic polyol (AROTHANE 2040-145), and then, after mixing by agitation, the mixture was coated onto a PET film (thickness 40 μm, manufactured by Soken Kako Co., Ltd.) treated with a silicone releasing agent so that the thickness of the coating after drying would be 100 μm. The desired surface resin layer was obtained by drying of this coating for 1 hour at 70° C.

Surface Resin Layers II-V

Using the components indicated in Table C.1, surface resin layers were prepared by the same procedure as used in the preparation of surface resin layer I.

TABLE B.24

|  |  | Examples | | | | | | | | | | | |
|---|---|---|---|---|---|---|---|---|---|---|---|---|---|
|  |  | B.80 | B.81 | B.82 | B.83 | B.84 | B.85 | B.86 | B.87 | B.88 | B.89 | B.90 | B.91 |
| Preparation of sheet | Drying conditions | | | | | | | | | | | | |
|  | (°C.) | 80 | 80 | 80 | 80 | 80 | 80 | 80 | 80 | 80 | 80 | 80 | 80 |
|  | (minutes) | 10 | 10 | 10 | 10 | 10 | 10 | 10 | 10 | 10 | 10 | 10 | 10 |
|  | Thickness (μm) | 100 | 100 | 60 | 60 | 100 | 100 | 60 | 150 | 100 | 100 | 60 | 150 |
| Covering conditions | Covering method*1 | V | V | V | I | V | V | V | P | V | V | V | P |
|  | Substrate*2 | a | b | c |  | a | b | c | g | a | b | c | g |
|  | Attachment conditions | | | | | | | | | | | | |
|  | Temperature of sheet (°C.) | Room temperature | Room temperature | Room temperature |  | Room temperature | Room temperature | Room temperature | Room temperature | Room temperature | Room temperature | Room temperature | Room temperature |
|  | Temperature of subsrate (°C.) | 70 | 70 | 70 |  | 70 | 70 | 70 | 120 | 70 | 70 | 70 | 100 |
|  | Pressure (torr) | 10 | 6 | 10 |  | 10 | 6 | 10 |  | 10 | 6 | 10 |  |
|  | Heating conditions | | | | | | | | | | | | |
|  | (°C.) | 160 | 160 | 160 | 160 | 160 | 160 | 160 | 160 | 160 | 160 | 160 | 160 |
|  | (minutes) | 30 | 30 | 30 | 30 | 20 | 30 | 20 | 20 | 30 | 30 | 30 | 30 |
| Physical properties of coating | Hardness | H | H | 2H | 2H | H | HB | HB | HB | 2H | H | 2H | B |
|  | Adhesion (number of squares remaining) | 100 | 100 | 100 | 100 | 100 | 100 | 100 | 100 | 100 | 100 | 100 | 100 |
|  | Volume resistivity (Ω cm) | $1.0 \times 10^{-1}$ | $2.0 \times 10^{-3}$ | $1.0 \times 10^{-4}$ | $1.8 \times 10^{-4}$ | $4.0 \times 10^{-2}$ | $2.0 \times 10^{-3}$ | $1.0 \times 10^{-4}$ | $1.8 \times 10^{-4}$ | $1.0 \times 10^{-1}$ | $2.0 \times 10^{-3}$ | $1.7 \times 10^{-4}$ | $2.0 \times 10^{-4}$ |

*1 Abbreviations for covering methods are as follows:
V. vacuum adhesion formation;
I, insertion injection;
P, vacuum pressing with bowl-shaped mold.
*2 Abbreviations concerning the subtrate are as follows:
a, hemispherical substrate with a radius of 15 cm coated with acrylic melamine;
b, porcelain bowl with an uppermost radius of 10 cm, height of 6 cm, and base radius of 6 cm;
c, polypropylene hemisphere with a radius of 15 cm;
g, SS-41 steel bowl with an uppermost radius of 10 cm, height of 6 cm, and base radius of 6 cm.

TABLE C.1

|  | AROTHANE 2040-145 | TAKENATE B-815N | NIKALITE H-870 | PARAPET BEADS GIP8 | Ethyl acetate | COLONATE HL |
|---|---|---|---|---|---|---|
| Surface resin layers | | | | | | |
| I | 100 | 49 | — | — | — | — |
| II | 100 | 86 | 30 | — | — | — |
| III | 100 | 49 | — | 10 | 100 | — |
| IV | 100 | 86 | 30 | 10 | 100 | — |
| V | 100 | 69 | 30 | — | — | 12.6 |

EXAMPLES C

The surface resin layers I-V used in the present Examples C.1-C.85 and Comparative Examples C.1-C.11 were prepared in the following way.

Example C.1

To 100 solid parts of an acrylic adhesive agent (a mixture of 100 solid parts of P44, manufactured by Soken Chemical & Engineering Co., Ltd., and 1.7 parts of COLONATE L45, manufactured by Nippon Polyurethane Industry Co., Ltd.), 100 parts of acrylic polyol oligomer (NIKALITE H-270) and 123 parts of blocked isocyanate (TAKENATE B-815N) were added, and after mixing by agitation, the mixture (adhesive composition A) was coated onto surface resin layer I so that the thickness of the coat after drying would be 30 μm. The coat was then dried for 1 hour at 70° C. Thus, an adhesive layer was formed and a thermosetting covering sheet with a double-layer structure was obtained.

The adhesive layer of the sheet so obtained was applied to the surface of a precoated steel plate (i.e., the substrate) and the sheet was pressed onto the surface. The PET film surface-treated with silicone was then removed and the sheet was hardened by heating for 30 minutes at 160° C. The surface hardness of the coated substrate so obtained and the degree of adhesion of the sheet to the substrate were evaluated. The procedures used in these tests were as follows, and the results are shown in Table C.3.

Hardness

A pencil hardness test is performed at 25° C. and 80° C. in accordance with the procedures specified by JIS K5400.

Adhesion Test

A 100-square checkerboard pattern with 1-mm spacings is inscribed on the coating of the test sample plate, and commercially available adhesive tape is adhered onto the coating of this test sample, after which the tape is peeled off and the number of squares remaining of the coating is counted.

Examples C.2–C.5 and Comparative Example C.1

Using the components shown in Table C.2, an adhesive mixture (adhesive composition B, C, D, E, or F) was obtained by the same procedure as shown in Example C.1. This adhesive composition was coated onto surface resin layer I, and a double-layered thermosetting covering sheet was obtained in the same way as in Example C.1.

The covering sheet so obtained was then hardened and a covered substrate was obtained by the same process as was used in Example C.1. The surface hardness of the coated substrate so obtained and the degree of adhesion of the sheet to the substrate were evaluated by the same procedures as in Example C.1. The results of these tests are shown in Table C.3.

TABLE C.3-continued

| | Examples | | | | | Comparative Example |
|---|---|---|---|---|---|---|
| | C.1 | C.2 | C.3 | C.4 | C.5 | C.1 |
| Hardness | | | | | | |
| at 25° C. | HB | HB | H | H | H | 2B |
| at 80° C. | 5B | 5B | 2B | 5B | 5B | <6B |
| Adhesion (number of squares remaining) | 100 | 100 | 100 | 100 | 100 | 100 |

Examples C.6–C.10 and Comparative Example C.2

Adhesive compositions A–F, the components of which are shown in Table C.2, were separately coated onto surface resin layer II, and double-layered thermosetting covering sheets were obtained in the same way as indicated in Example C.1. The covering sheets so obtained were hardened and coated substrates were prepared by the same process as in Example C.1. The surface hardness of the coated substrate so obtained and the degree of adhesion of the sheet to the substrate were evaluated by the same procedures as in Example C.1. The results are shown in Table C.4.

TABLE C.4

| | Examples | | | | | Comparative Example |
|---|---|---|---|---|---|---|
| | C.6 | C.7 | C.8 | C.9 | C.10 | C.2 |
| Surface resin layer | II | II | II | II | II | II |
| Adhesive composition | A | B | C | D | E | F |
| Hardness | | | | | | |
| at 25° C. | HB | HB | H | H | H | 2B |
| at 80° C. | 5B | 5B | 2B | 5B | 5B | <6B |
| Adhesion (number of squares remaining) | 100 | 100 | 100 | 100 | 100 | 100 |

Examples C.11–C.15 and Comparative Example C.3

Double-layered thermosetting covering sheets were obtained in the same way as shown in Example C.1, except that here, the adhesive compositions indicated in Table C.2 were coated onto surface resin layers III, the components of which are shown in Table C.1. The covering sheets obtained in this way were hardened by the same process as was used in Example C.1, thus giving covered substrates. The surface hardness of the coated substrate so obtained and the degree of adhesion of the sheet to the substrate were evaluated by the same procedures as in Example C.1. The results are shown in Table C.5.

TABLE C.2

| | P44 + COLONATE L45 | NIKALITE H-270 | NIKALITE H-470 | NIKALITE H-870 | TAKENATE B-815N |
|---|---|---|---|---|---|
| Adhesive compositions | | | | | |
| A | 100 | 100 | — | — | 123 |
| B | 100 | 200 | — | — | 246 |
| C | 100 | 500 | — | — | 615 |
| D | 100 | — | 500 | — | 615 |
| E | 100 | — | — | 500 | 615 |
| F | 100 | — | — | — | — |

TABLE C.3

| | Examples | | | | | Comparative Example |
|---|---|---|---|---|---|---|
| | C.1 | C.2 | C.3 | C.4 | C.5 | C.1 |
| Surface resin layer | I | I | I | I | I | I |
| Adhesive composition | A | B | C | D | E | F |

TABLE C.5

|  | Examples | | | | | Comparative Example |
|---|---|---|---|---|---|---|
|  | C.11 | C.12 | C.13 | C.14 | C.15 | C.3 |
| Surface resin layer | III | III | III | III | III | III |
| Adhesive composition | A | B | C | D | E | F |
| Hardness |  |  |  |  |  |  |
| at 25° C. | HB | HB | H | H | H | 2B |
| at 80° C. | 6B | 5B | 3B | 5B | 3B | <6B |
| Adhesion (number of squares remaining) | 100 | 100 | 100 | 100 | 100 | 100 |

Examples C.16–C.20 and Comparative Example C.4

Double-layered thermosetting covering sheets were obtained in the same way as shown in Example C.1, except that here, the adhesive compositions indicated in Table C.2 were coated onto surface resin layers IV, the components of which are shown in Table C.1. The covering sheets obtained in this way were hardened by the same process as was used in Example C.1, thus giving covered substrates. The surface hardness of the coated substrate so obtained and the degree of adhesion of the sheet to the substrate were evaluated by the same procedures as in Example C.1. The results are shown in Table C.6.

TABLE C.6

|  | Examples | | | | | Comparative Example |
|---|---|---|---|---|---|---|
|  | C.16 | C.17 | C.18 | C.19 | C.20 | C.4 |
| Surface resin layer | IV | IV | IV | IV | IV | IV |
| Adhesive composition | A | B | C | D | E | F |
| Hardness |  |  |  |  |  |  |
| at 25° C. | HB | HB | H | H | H | 2B |
| at 80° C. | 6B | 5B | 3B | 5B | 3B | <6B |
| Adhesion (number of squares remaining) | 100 | 100 | 100 | 100 | 100 | 100 |

Comparative Example C.5

Thermosetting covering sheets were obtained in the same way as shown in Example C.1, except that here, the acrylic polyol used for surface resin layer I was AROTHANE 2040-134, which has a weight-average molecular weight that is relatively small. The resulting sheets were tested as in Example C.1. However, the maintenance of the sheet form was difficult.

Examples C.21–C.25 and Comparative Example C.6

Adhesive compositions F–K, the components of which were indicated in Table C.7, were obtained. These adhesive compositions were separately coated onto surface resin layer I, and double-layered thermosetting covering sheets were obtained in the same way as indicated in Example C.1. The covering sheets so obtained were hardened and coated substrates were prepared by the same process as in Example C.1. The surface hardness of the coated substrate so obtained and the degree of adhesion of the sheet to the substrate were evaluated by the same procedures as in Example C.1. The results are shown in Table C.8.

TABLE C.7

|  | P44 + COLONATE L45 | NIKALITE H-270 | NIKALITE H-470 | NIKALITE H-870 | COLONATE L | TAKENATE B-815N |
|---|---|---|---|---|---|---|
| Adhesive compositions |  |  |  |  |  |  |
| G | 100 | 100 | — | — | 17 | 99 |
| H | 100 | 200 | — | — | 35 | 197 |
| I | 100 | 500 | — | — | 87 | 493 |
| J | 100 | — | 500 | — | 87 | 493 |
| K | 100 | — | — | 500 | 87 | 493 |
| F | 100 | — | — | — | — | — |

TABLE C.8

|  | Examples | | | | | Comparative Example |
|---|---|---|---|---|---|---|
|  | C.21 | C.22 | C.23 | C.24 | C.25 | C.6 |
| Surface resin layer | I | I | I | I | I | I |
| Adhesive composition | G | H | I | J | K | F |
| Hardness |  |  |  |  |  |  |
| at 25° C. | HB | HB | H | H | H | 2B |
| at 80° C. | 5B | 5B | 2B | 5B | 5B | <6B |
| Adhesion (number of squares remaining) | 100 | 100 | 100 | 100 | 100 | 100 |

Examples C.26–C.30 and Comparative Example C.7

Double-layered thermosetting covering sheets were obtained in the same way as shown in Example C.1, except that here, the adhesive compositions indicated in Table C.7 were coated onto surface resin layers II, the components of which are shown in Table C.1. The covering sheets obtained in this way were hardened by the same process as was used in Example C.1, thus giving covered substrates. The surface hardness of the coated substrate so obtained and the degree of adhesion of the sheet to the substrate were evaluated by the same procedures as in Example C.1. The results are shown in Table C.9.

TABLE C.9

|  | Examples | | | | | Comparative Example |
|---|---|---|---|---|---|---|
|  | C.26 | C.27 | C.28 | C.29 | C.30 | C.7 |
| Surface resin layer | II | II | II | II | II | II |
| Adhesive composition | G | H | I | J | K | F |
| Hardness |  |  |  |  |  |  |
| at 25° C. | HB | HB | H | H | H | 2B |
| at 80° C. | 5B | 5B | 2B | 5B | 5B | <6B |
| Adhesion (number of squares remaining) | 100 | 100 | 100 | 100 | 100 | 100 |

Examples C.31–C.35 and Comparative Example C.8

Double-layered thermosetting covering sheets were obtained in the same way as shown in Example C.1, except that here, the adhesive compositions indicated in Table C.7 were coated onto surface resin layers III, the components of which are shown in Table C.1. The covering sheets obtained in this way were hardened by the same process as was used in Example C.1, thus giving covered substrates. The surface hardness of the coated substrate so obtained and the degree of adhesion of the sheet to the substrate were evaluated by the same procedures as in Example C.1. The results are shown in Table C.10.

TABLE C.10

|  | Examples | | | | | Comparative Example |
|---|---|---|---|---|---|---|
|  | C.31 | C.32 | C.33 | C.34 | C.35 | C.8 |
| Surface resin layer | III | III | III | III | III | III |
| Adhesive composition | G | H | I | J | K | F |
| Hardness | | | | | | |
| at 25° C. | HB | HB | H | H | H | 2B |
| at 80° C. | 5B | 5B | 4B | 5B | 5B | <6B |
| Adhesion (number of squares remaining) | 100 | 100 | 100 | 100 | 100 | 100 |

Examples C.36–C.40 and Comparative Example C.9

Double-layered thermosetting covering sheets were obtained in the same way as shown in Example C.1, except that here, the adhesive compositions indicated in Table C.7 were coated onto surface resin layers IV, the components of which are shown in Table C.1. The covering sheets obtained in this way were hardened by the same process as was used in Example C.1, thus giving covered substrates. The surface hardness of the coated substrate so obtained and the degree of adhesion of the sheet to the substrate were evaluated by the same procedures as in Example C.1. The results are shown in Table C.11.

TABLE C.11

|  | Examples | | | | | Comparative Example |
|---|---|---|---|---|---|---|
|  | C.36 | C.37 | C.38 | C.39 | C.40 | C.9 |
| Surface resin layer | IV | IV | IV | IV | IV | IV |
| Adhesive composition | G | H | I | J | K | F |
| Hardness | | | | | | |
| at 25° C. | HB | HB | H | H | H | 2B |
| at 80° C. | 5B | 5B | 4B | 5B | 5B | <6B |
| Adhesion (number of squares remaining) | 100 | 100 | 100 | 100 | 100 | 100 |

Examples C.41–C.45 and Comparative Example C.10

Double-layered thermosetting covering sheets were obtained in the same way as shown in Example C.1, except that here, the adhesive compositions indicated in Table C.7 were coated onto surface resin layers V, the components of which are shown in Table C.1. The covering sheets obtained in this way were hardened by the same process as was used in Example C.1, thus giving covered substrates. The surface hardness of the coated substrate so obtained and the degree of adhesion of the sheet to the substrate were evaluated by the same procedures as in Example C.1. The results are shown in Table C.12.

TABLE C.12

|  | Examples | | | | | Comparative Example |
|---|---|---|---|---|---|---|
|  | C.41 | C.42 | C.43 | C.44 | C.45 | C.10 |
| Surface resin layer | V | V | V | V | V | V |
| Adhesive composition | G | H | I | J | K | F |
| Hardness | | | | | | |
| at 25° C. | HB | HB | H | H | H | 2B |
| at 80° C. | 5B | 5B | 2B | 5B | 5B | <6B |
| Adhesion (number of squares remaining) | 100 | 100 | 100 | 100 | 100 | 100 |

Comparative Example C.11

Thermosetting covering sheets were obtained in the same way as shown in Example C.21, except that here, the acrylic polyol used for surface resin layer V was AROTHANE 2040-134, which has a weight-average molecular weight that is relatively small. The resulting sheets were tested as in Example C.1. However, the maintenance of the sheet form was difficult.

Examples C.46–C.51

The adhesive compositions L-Q, the components of which were indicated in Table C.13, were obtained. These adhesive compositions were separately coated onto surface resin layer I, and double-layered thermosetting covering sheets were obtained in the same way as indicated in Example C.1. The covering sheets so obtained were hardened and coated substrates were prepared by the same process as in Example C.1. The surface hardness of the coated substrate so obtained and the degree of adhesion of the sheet to the substrate were evaluated by the same procedures as in Example C.1. The results are shown in Table C.14.

TABLE C.13

|  | P44 + COLO-NATE L45 | Acrylic monomers | | | PER-HEXA 3M |
|---|---|---|---|---|---|
|  |  | ACB200 | AMP20G | NPA10G |  |
| Adhesive compositions | | | | | |
| L | 100 | 200 | — | — | 3 |
| M | 100 | 500 | — | — | 3 |
| N | 100 | — | 200 | — | 3 |
| O | 100 | — | 500 | — | 3 |
| P | 100 | — | — | 200 | 3 |
| Q | 100 | — | — | 500 | 3 |

TABLE C.14

|  | Examples | | | | | |
|---|---|---|---|---|---|---|
|  | C.46 | C.47 | C.48 | C.49 | C.50 | C.51 |
| Surface resin layer | I | I | I | I | I | I |
| Adhesive composition | L | M | N | O | P | Q |
| Hardness | | | | | | |
| at 25° C. | HB | HB | HB | HB | HB | HB |
| at 80° C. | 5B | 5B | 5B | 4B | 5B | 4B |
| Adhesion (number of squares remaining) | 100 | 100 | 100 | 100 | 100 | 100 |

Examples C.52–C.57

Double-layered thermosetting covering sheets were obtained in the same way as shown in Example C.1, except that here, the adhesive compositions indicated in Table C.13 were coated onto surface resin layers II, the components of which are shown in Table C.1. The covering sheets obtained in this way were hardened by the same process as was used in Example C.1, thus giving covered substrates The surface hardness of the coated substrate so obtained and the degree of adhesion of the sheet to the substrate were evaluated by the same procedures as in Example C.1. The results are shown in Table C.15.

TABLE C.15

| | Examples | | | | | |
|---|---|---|---|---|---|---|
| | C.52 | C.53 | C.54 | C.55 | C.56 | C.57 |
| Surface resin layer | II | II | II | II | II | II |
| Adhesive composition | L | M | N | O | P | Q |
| Hardness | | | | | | |
| at 25° C. | HB | HB | HB | HB | HB | HB |
| at 80° C. | 5B | 5B | 5B | 4B | 5B | 4B |
| Adhesion (number of squares remaining) | 100 | 100 | 100 | 100 | 100 | 100 |

Examples C.58–C.63

Double-layered thermosetting covering sheets were obtained in the same way as shown in Example C.1, except that here, the adhesive compositions indicated in Table C.13 were coated onto surface resin layers III, the components of which are shown in Table C.1. The covering sheets obtained in this way were hardened by the same process as was used in Example C.1, thus giving covered substrates. The surface hardness of the coated substrate so obtained and the degree of adhesion of the sheet to the substrate were evaluated by the same procedures as in Example C.1. The results are shown in Table C.16.

TABLE C.16

| | Examples | | | | | |
|---|---|---|---|---|---|---|
| | C.58 | C.59 | C.60 | c.61 | C.62 | C.63 |
| Surface resin layer | III | III | III | III | III | III |
| Adhesive composition | L | M | N | O | P | Q |
| Hardness | | | | | | |
| at 25° C. | HB | HB | HB | HB | HB | HB |
| at 80° C. | 6B | 5B | 6B | 5B | 5B | 4B |
| Adhesion (number of squares remaining) | 100 | 100 | 100 | 100 | 100 | 100 |

Examples C.64–C.69

Double-layered thermosetting covering sheets were obtained in the same way as shown in Example C.1, except that here, the adhesive compositions indicated in Table C.13 were coated onto surface resin layers IV, the components of which are shown in Table C.1. The covering sheets obtained in this way were hardened by the same process as was used in Example C.1, thus giving covered substrates. The surface hardness of the coated substrate so obtained and the degree of adhesion of the sheet to the substrate were evaluated by the same procedures as in Example C.1. The results are shown in Table C.17.

TABLE C.17

| | Examples | | | | | |
|---|---|---|---|---|---|---|
| | C.64 | C.65 | C.66 | C.67 | C.68 | C.69 |
| Surface resin layer | IV | IV | IV | IV | IV | IV |
| Adhesive composition | L | M | N | O | P | Q |
| Hardness | | | | | | |
| at 25° C. | HB | HB | HB | HB | HB | HB |
| at 80° C. | 6B | 5B | 6B | 5B | 5B | 4B |
| Adhesion (number of squares remaining) | 100 | 100 | 100 | 100 | 100 | 100 |

Examples C.70–C.73

Adhesive compositions were obtained by dissolving each of the saturated polyester resins indicated in Table C.18 in ethyl acetate so as to form a solution that was 30% by weight, adding a blocked isocyanate (TAKENATE B-815N), and mixing these ingredients by agitation. The amount of the aforesaid blocked isocyanate added was such that the number of isocyanate groups would be equal to the number of hydroxyl groups in the saturated polyester resin. These adhesive compositions were separately coated onto surface resin layer I, and double-layered thermosetting covering sheets were prepared in the same way as shown in Example C.1.

The covering sheets so obtained were hardened and coated substrates were obtained by the same process as in Example C.1. The surface hardness of the coated substrate so obtained and the degree of adhesion of the sheet to the substrate were evaluated by the same procedures as in Example C.1. The results are shown in Table C.19.

TABLE C.18

| | | Saturated polyester resin | Amount of TAKENATE B-815N |
|---|---|---|---|
| Adhesive compositions | R | ELITEL 8551 (UNITIKA LTD.; OH value 11) | NCO/OH = 1 |
| | S | ELITEL 8552 (UNITIKA LTD.; OH value 12) | NCO/OH = 1 |
| | T | ELITEL 8553 (UNITIKA LTD.; OH value 13) | NCO/OH = 1 |
| | U | ELITEL 8554 (UNITIKA LTD.; OH value 11) | NCO/OH = 1 |

TABLE C.19

| | Examples | | | |
|---|---|---|---|---|
| | C.70 | C.71 | C.72 | C.73 |
| Surface resin layer | I | I | I | I |
| Adhesive composition | R | S | T | U |
| Hardness at 25° C. | H | H | H | H |
| at 80° C. | 2B | 3B | 4B | 4B |
| Adhesion (number of squares remaining) | 100 | 100 | 100 | 100 |

Examples C.74–C.77

Double-layered thermosetting covering sheets were obtained in the same way as shown in Example C.1, except that here, the adhesive compositions indicated in Table C.18 were coated onto surface resin layers II, the components of which are shown in Table C.1. The covering sheets obtained in this way were hardened by the same process as was used in Example C.1, thus giving covered substrates. The surface hardness of the coated substrate so obtained and the degree of adhesion of the sheet to the substrate were evaluated by the same procedures as in Example C.1. The results are shown in Table C.20.

TABLE C.20

| | Examples | | | |
|---|---|---|---|---|
| | C.74 | C.75 | C.76 | C.77 |
| Surface resin layer | II | II | II | II |
| Adhesive composition | R | S | T | U |
| Hardness at 25° C. | H | H | H | H |

TABLE C.20-continued

|  | Examples | | | |
|---|---|---|---|---|
|  | C.74 | C.75 | C.76 | C.77 |
| at 80° C. | 3B | 3B | 4B | 4B |
| Adhesion (number of squares remaining) | 100 | 100 | 100 | 100 |

Examples C.78–C.81

Double-layered thermosetting covering sheets were obtained in the same way as shown in Example C.1, except that here, the adhesive compositions indicated in Table C.18 were coated onto surface resin layers III, the components of which are shown in Table C.1. The covering sheets obtained in this way were hardened by the same process as was used in Example C.1, thus giving covered substrates. The surface hardness of the coated substrate so obtained and the degree of adhesion of the sheet to the substrate were evaluated by the same procedures as in Example C.1. The results are shown in Table C.21.

TABLE C.21

|  | Examples | | | |
|---|---|---|---|---|
|  | C.78 | C.79 | C.80 | C.81 |
| Surface resin layer | III | III | III | III |
| Adhesive composition | R | S | T | U |
| Hardness at 25° C. | H | H | H | H |
| at 80° C. | 4B | 4B | 4B | 4B |
| Adhesion (number of squares remaining) | 100 | 100 | 100 | 100 |

Examples C.82–C.85

Double-layered thermosetting covering sheets were obtained in the same way as shown in Example C.1, except that here, the adhesive compositions indicated in Table C.18 were coated onto surface resin layers IV, the components of which are shown in Table C.1 The covering sheets obtained in this way were hardened by the same process as was used in Example C.1, thus giving covered substrates. The surface hardness of the coated substrate so obtained and the degree of adhesion of the sheet to the substrate were evaluated by the same procedures as in Example C.1 The results are shown in Table C.22.

TABLE C.22

|  | Examples | | | |
|---|---|---|---|---|
|  | C.82 | C.83 | C.84 | C.85 |
| Surface resin layer | IV | IV | IV | IV |
| Adhesive composition | R | S | T | U |
| Hardness at 25° C. | H | H | H | H |
| at 80° C. | 4B | 4B | 4B | 4B |
| Adhesion (number of squares remaining) | 100 | 100 | 100 | 100 |

EXAMPLES D

The colored resin compositions a)–e) used in Examples D.1–D.16 and Comparative Examples D.1–D.4 were prepared by the following procedures.

Preparation of Colored Resin Compositions

Colored Resin Composition a)

This colored resin composition was obtained by adding 49 parts of blocked isocyanate (TAKENATE B-815N) and 15 parts of titanium oxide to 100 parts of an acrylic polyol (AROTHANE 2040-145) and mixing by agitation.

Colored Resin Compositions b)–e)

Using the components indicated in Table D.1, colored resin compositions were obtained by the same procedure as for the preparation of the colored resin composition a).

TABLE D.1

|  | Colored resin compositions | | | | |
|---|---|---|---|---|---|
|  | a | b | c | d | e |
| AROTHANE 2040-144 | — | — | — | 100 | 100 |
| AROTHANE 2040-145 | 100 | 100 | 100 | — | — |
| NIKALITE H-270 | — | — | 40 | — | — |
| NIKALITE H-870 | — | 30 | — | — | 30 |
| TAKENATE B-815N | 49 | 86 | 98 | 49 | 86 |
| Titanium oxide | 15 | 15 | 15 | 15 | 15 |

Example D.1

To 100 parts of acrylic polyol (AROTHANE 2040-145) was added 49 parts of blocked isocyanate (TAKENATE B-815N, this amount of the blocked isocyanate having the same number of isocyanate groups as the number of hydroxyl groups in the aforesaid acrylic polyol), and these ingredients were mixed by agitation. The resulting mixture was coated onto the releasing surface of a PET film (thickness 40 μm, manufactured by Soken Kako Co., Ltd.) that had been treated with a silicone mold-releasing agent. A curable (i.e., capable of being hardened) transparent resin layer was then obtained by drying of this coating for 5 minutes at 80° C.

The above-mentioned colored resin composition a) was coated onto the transparent resin layer obtained in this way, and a colored resin layer was formed by drying this coating for 5 minutes at 80° C. An unhardened thermosetting covering sheet was obtained by removal of the PET film. The thickness of the transparent resin layers and colored resin layers of this sheet were 30 and 70 μm, respectively.

This covering sheet was studied by a tensile test. The results are shown in Table D.5. Next, covering tests were done using the aforesaid sheet, and the satisfactoriness of covering was evaluated. Also, the surface hardness of the coated substrate so obtained and the degree of adhesion of the sheet to the substrate were evaluated. The procedures used for these various tests were as follows, and the results of these tests are shown in Table D.6.

Tensile Tests

The thermosetting covering sheet is cut to form a 20×100 mm test strip. The test strip is then elongated 100% in the longitudinal direction at 30° C., while observations are made of whether it is torn.

Covering Tests

The sheet is attached to a given substrate and hardened through vacuum formation at 60° C., and the state of the coating obtained is observed.

The covered substrate obtained is heated at 160° C. for 30 minutes to harden the sheet.

Hardness

Hardness was measured by the pencil hardness test in accordance with the standards prescribed by JIS K5400.

The results obtained when a naked steel plate was used as the substrate are shown in Table D.5, and the results obtained when a precoated steel plate was used as the substrate are shown in Table D.6. In the latter case, to improve the adhesion between the sheet and the precoated steel plate achieved in the vacuum forming process, an adhesive layer (composed of the acrylic adhesive agent S DINE WHD manufactured by Sekisui Kagaku Kogyo Kabushiki Kaisha. and applied with a thickness of 10 μm) was provided on the surface of the colored resin layer of the sheet that was attached to the said precoated steel plate.

Examples D.2–D.3

The curable transparent resin layer obtained in Example D.1 was coated with one of the colored resin compositions specified in Table D.2, and colored resin layers were formed in the same way as indicated in the description of Example D.1. Unhardened thermosetting coating sheets were then obtained by removal of the PET films. The thickness of these sheets was the same as that of the sheets obtained in Example D.1. The sheets obtained in this way were studied by the same tests as in Example D.1. The results are shown in Tables D.5 and D.6.

Examples D.4–D.6

A curable transparent resin layer was formed in the same way as in Example D.1, except that 62 parts of blocked isocyanate (TAKENATE B-815N) was added to 100 parts of acrylic polyol (AROTHANE 2040-139), this amount of blocked isocyanate having the same number of isocyanate groups as to the number of hydroxyl groups in the aforesaid acrylic polyol.

The transparent resin layer so obtained was coated with one of the colored resin compositions indicated in Table D.2, and colored resin layers were formed in the same way as in Example D.1. Unhardened thermosetting covering sheet were obtained by removal of the PET films. The sheets so obtained were studied by the same tests as in Example D.1. The results of these tests are shown in Tables D.5 and D.6.

Example D.7

To 300 parts of ethyl acetate, 100 parts of thermoplastic acrylic resin (HIPET HBS), 40 parts of diethyleneglycol dimethacrylate, and 1.0 parts of t-butylperoxybenzoate were added, and these ingredients were mixed by agitation. This mixture was coated onto the releasing surface of the same type of silicone-pretreated PET film as was used in Example D.1, and this coating was dried for 15 minutes at 70° C., thus forming a curable transparent resin layer.

The transparent resin layer so obtained was coated with the colored resin composition indicated in Table D.3 (the components of which are shown in Table D.1), a colored resin layer was formed by heating this coating for 30 minutes at 70° C., and an unhardened thermosetting covering sheet was obtained by removal of the PET film. The thicknesses of the transparent resin layers and the colored resin layers of this sheet were 20 and 80 μm, respectively. Using the sheets obtained in this way, the same tests were done as in Example D.1. The results are shown in Tables D.5 and D.6.

Examples D.8–D.12 and Comparative Examples D.1–D.2

By use of the components indicated in Table D.3, a curable transparent resin layer was obtained by the same process as was used in Example D.7. Then, an unhardened thermosetting covering sheet was obtained in the same way as in Example D.7, except that here, the colored resin compositions indicated in Table D.3 (the components of which are shown in Table D.1) were coated onto the transparent resin layer obtained above. The thickness of the sheet so obtained is shown in Table D.3. Using this sheet, the same tests were done as in Example D.1. For Comparative Examples D.1 and D.2, the covering tests were done at 80° C. and 100° C. The results are shown in Tables D.5 and D.6.

The sheets obtained in Comparative Examples D.1 and D.2 could not be elongated by 100%; moreover, when applied by vacuum formation at 80° C. and 100° C., these sheets could not be attached to the steel plate.

Examples D.13–D.20 and Comparative Examples D.3–D.4

With the components indicated in Table D.3 or D.4, a curable transparent resin layer was obtained by the same process as in Example D.1. The transparent resin layer was coated with one of the colored resin compositions indicated in Table D.3 or D.4, the components of which are shown in Table D.1, and a colored resin layer was formed by drying of this coating for 10 minutes at 80° C. An unhardened thermosetting covering sheet was obtained by removal of the PET film. The thickness of the transparent resin compositions and colored resin compositions of this sheet are shown in Table D.3 or D.4. This covering sheet was studied by a tensile test as in Example D.1. The results are shown in Table D.5. Next, covering tests were done as in Example D.1 with the aforesaid sheet, and the satisfactoriness of covering was evaluated. The coated substrate was heated for 30 minutes at 160° C., and irradiated with a high-pressure mercury lamp (160 W/cm², height 15 cm) for 2 minutes, whereby the sheet was hardened. The surface hardness of the coated substrate so obtained and the degree of adhesion of the sheets were measured by the same procedures as in Example D.1. The results are shown in Tables D.5 and D.6. For Comparative Examples D.3 and D.4, the covering tests were done at 80° C. and 100° C.

The sheets obtained in Comparative Examples D.3 and D.4 could not be elongated by 100%; moreover, when applied by vacuum formation at 80° C. or 100° C., these sheets could not be attached to the steel plate.

TABLE D.2

| | Examples | | | | | |
|---|---|---|---|---|---|---|
| | D.1 | D.2 | D.3 | D.4 | D.5 | D.6 |
| Colored resin composition | a | b | b | a | b | c |

TABLE D.3

|  |  | Examples |  |  |  |  |  |  |  |  |  | Comparative Examples |  |
|---|---|---|---|---|---|---|---|---|---|---|---|---|---|
|  |  | D.7 | D.8 | D.9 | D.10 | D.11 | D.12 | D.13 | D.14 | D.15 | D.16 | D.1 | D.2 |
| Ethyl acetate |  | 300 | 300 | 300 | 300 | 300 | 300 | 300 | 300 | 300 | 300 | 300 | 300 |
| HIPET HBS |  | 100 | — | — | 100 | — | — | 100 | — | 100 | — | 100 | — |
| DELPET 7500 |  | — | 100 | 100 | — | 100 | 100 | — | 100 | — | 100 | — | 100 |
| Diethylene glycol dimethacrylate |  | 40 | — | 40 | — | — | — | 20 | 20 | — | — | — | — |
| Dipropylene glycol dimethacrylate |  | — | 40 | — | — | — | — | — | — | — | — | — | — |
| Methyl methacrylate |  | — | — | — | 60 | 60 | 60 | 30 | 30 | — | — | — | — |
| Pentaerythritol trimethacrylate |  | — | — | — | — | — | — | — | — | 10 | 10 | 10 | 10 |
| p-Methoxystyrene |  | — | — | — | — | — | — | — | — | 30 | 30 | 30 | 30 |
| tert-Butylperoxy benzoate |  | 1.0 | 1.0 | 1.0 | 1.0 | 1.0 | 1.0 | — | — | — | — | — | — |
| Methyl ethyl ketone peroxide |  | — | — | — | — | — | — | 0.8 | 0.8 | 0.8 | 0.8 | 0.8 | 0.8 |
| Benzophenon |  | — | — | — | — | — | — | 0.4 | 0.4 | 0.5 | 0.5 | — | — |
| Colored resin composition |  | a | b | c | a | b | c | a | b | a | b | d | e |
| Thickness | Transparent resin layer (μm) | 20 | 20 | 40 | 20 | 20 | 40 | 20 | 15 | 30 | 15 | 30 | 30 |
|  | Colored resin layer (μm) | 80 | 80 | 100 | 80 | 80 | 80 | 60 | 70 | 60 | 70 | 70 | 80 |

TABLE D.4

|  |  | Examples |  |  |  | Comparative Examples |  |
|---|---|---|---|---|---|---|---|
|  |  | D.17 | D.18 | D.19 | D.20 | D.3 | D.4 |
| Ethyl acetate |  | 300 | 300 | 300 | 300 | 300 | 300 |
| HIPET HBS |  | 100 | — | 100 | — | 100 | — |
| DELPET 7500 |  | — | 100 | — | 100 | — | 100 |
| Diethylene glycol dimethacrylate |  | 20 | — | — | — | 20 | 20 |
| Dipropylene glycol dimethacrylate |  | — | 20 | — | — | — | — |
| Methyl methacrylate |  | 30 | — | — | — | 30 | 30 |
| Pentaerythritol trimethacrylate |  | — | — | 10 | 10 | — | — |
| p-Methoxystyrene |  | — | — | 30 | 30 | — | — |
| p-Chlorostyrene |  | — | 30 | — | — | — | — |
| Thioxanthone |  | 1.0 | 1.0 | 1.0 | 1.0 | 1.0 | 1.0 |
| Colored resin composition |  | a | b | a | b | d | e |
| Thickness | Transparent resin layer (μm) | 40 | 30 | 40 | 30 | 30 | 20 |
|  | Colored resin layer (μm) | 60 | 70 | 60 | 60 | 70 | 70 |

TABLE D.5

| Examples | D.1 | D.2 | D.3 | D.4 | D.5 | D.6 | D.7 | D.8 | D.9 | D.10 |
|---|---|---|---|---|---|---|---|---|---|---|
| Tensile test (30° C.) | Not torn | Not torn | Not torn | Not torn | Not torn | Not torn | Not torn | Not torn | Not torn | Not torn |
| State of coating | Excellent | Excellent | Excellent | Excellent | Excellent | Excellent | Excellent | Excellent | Excellent | Excellent |
| Adhesion (number of squares remaining) | 100 | 100 | 100 | 100 | 100 | 100 | 100 | 100 | 100 | 100 |
| Hardness | H | HB | H | H | HB | H | 2H | H | 2H | 2H |

| Examples | D.11 | D.12 | D.13 | D.14 | D.15 | D.16 | D.17 | D.18 | D.19 | D.20 |
|---|---|---|---|---|---|---|---|---|---|---|
| Tensile test (30° C.) | Not torn | Not torn | Not torn | Not torn | Not torn | Not torn | Not torn | Not torn | Not torn | Not torn |
| State of coating | Excellent | Excellent | Excellent | Excellent | Excellent | Excellent | Excellent | Excellent | Excellent | Excellent |
| Adhesion (number of squares remaining) | 100 | 100 | 100 | 100 | 100 | 100 | 100 | 100 | 100 | 100 |
| Hardness | 2H | 2H | H | HB | 2H | H | H | H | H | H |

Substrate: Steel plate (a sheet without an adhesive layer was used)

TABLE D.6

| Examples | D.1 | D.2 | D.3 | D.4 | D.5 | D.6 | D.7 | D.8 | D.9 | D.10 |
|---|---|---|---|---|---|---|---|---|---|---|
| State of coating | Excellent | Excellent | Excellent | Excellent | Excellent | Excellent | Excellent | Excellent | Excellent | Excellent |
| Adhesion | 100 | 100 | 100 | 100 | 100 | 100 | 100 | 100 | 100 | 100 |

TABLE D.6-continued

| (number of squares remaining) Hardness | HB | B | H | H | B | H | H | HB | 2H | H |
|---|---|---|---|---|---|---|---|---|---|---|
| Examples | D.11 | D.12 | D.13 | D.14 | D.15 | D.16 | D.17 | D.18 | D.19 | D.20 |
| State of coating | Excellent | Excellent | Excellent | Excellent | Excellent | Excellent | Excellent | Excellent | Excellent | Excellent |
| Adhesion (number of squares remaining) | 100 | 100 | 100 | 100 | 100 | 100 | 100 | 100 | 100 | 100 |
| Hardness | H | 2H | HB | B | H | HB | HB | HB | HB | HB |

Substrate: Steel plate
Adhesive layer: Acrylic adhesive (SEKISUI KAGAKU KOGYO KABUSHIKI KAISHA,S DINE WHD) was used. Thickness, 10 μm.

The curable transparent resin layers (i)–(iv) used in the following Examples D.21–D.36 were prepared by the following procedures.

Preparation of Curable Transparent Resin Layers

Curable Transparent Resin Layer (i)

To 100 parts of acrylic polyol (AROTHANE 2040-145), was added 49 parts of blocked isocyanate (TAKENATE B-815N, this amount of the blocked isocyanate having the same number of isocyanate groups as the number of hydroxyl groups in the aforesaid acrylic polyol), and these ingredients were mixed by agitation. The resulting mixture was coated onto the releasing surface of a PET film that was the same type used in Example D.1. A curable transparent resin layer was then obtained by drying this coating for 5 minutes at 80° C.

Curable Transparent Resin Layers (ii)–(iv)

Using the components indicated in Table D.7, curable transparent resin layers were obtained by the same process as was used in the preparation of the curable transparent resin layer (i).

TABLE D.7

| | Curable transparent resin layers | | | |
|---|---|---|---|---|
| | (i) | (ii) | (iii) | (iv) |
| AROTHANE 2040-139 | — | 100 | — | 100 |
| AROTHANE 2040-145 | 100 | — | 100 | — |
| NIKALITE H-870 | — | — | 30 | — |
| AROTHANE 2040-134 | — | — | — | 20 |
| TAKENATE B-815N | 49 | 62 | 86 | 72 |
| NCO/OH | *[1]1.0 | *[1]1.0 | *[2]1.0 | *[2]1.0 |

NCO/OH
*[1]Ratio of the number of isocyanate groups of the blocked isocyanate to the number of hydroxyl groups in the acrylic polyol.
*[2]Represents ratio of the number of isocyanate groups of the blocked isocyanate to the total number of hydroxyl groups in the acrylic polyol and the acrylic polyol oligomer.

Example D.21

To 300 parts of ethyl acetate, 100 parts of thermoplastic acrylic resin (DELPET 8500), 40 parts of methyl methacrylate, 0.6 parts of tert-butylperoxyacetate, and 50 parts of titanium oxide were added, and these ingredients were mixed by agitation. This mixture (colored resin composition (1)) was coated onto the curable transparent resin layer (i), (the components of which are shown in Table D.7). This coating was dried for 10 minutes at 80° C., forming a colored resin layer, and an unhardened thermosetting covering sheet was obtained by removal of the PET film. The thicknesses of the transparent and colored resin layers of this sheet were 20 and 100 μm, respectively.

By use of the sheet obtained in this way, the same tests as in Example D.1 were done. The results obtained when a naked steel plate was used as the substrate are shown in Table D.12, and the results obtained when a precoated steel plate was used as the substrate are shown in Table D.13. The results of the tensile tests are shown in Table D.12.

Examples D.22–D.24

By use of the same process as in Example D.21, each of the colored resin compositions (1) and (2) (the components of which are shown in Table D.8) indicated in Table D.9 was coated onto one of the curable transparent resin layers (the components of which are shown in Table D.7) specified in Table D.9. The thicknesses of the unhardened thermosetting covering sheets so obtained are given in Table D.9. The sheets obtained in this way were tested by the same tests as in Example D.1. The results of these tests are shown in Tables D.12 and D.13.

Examples D.25–D.28

Unhardened thermosetting covering sheets were obtained by use of the same process as in Example D.21, except that each of the colored resin compositions (the components of which are shown in Table D.8) indicated in Table D.9 were coated onto one of the curable transparent resin layers (the components of which are shown in Table D.7) specified in Table D.9, and the coatings were then dried for 10 minutes at 80° C. The thicknesses of the sheets so obtained are shown in Table D.9. The sheets obtained in this way were tested by the same tests as in Example D.13. The results of these tests are shown in Tables D.12 and D.13.

TABLE D.8

| | Colored resin compositions | | | |
|---|---|---|---|---|
| | (1) | (2) | (3) | (4) |
| Ethyl acetate | 300 | 300 | 300 | 300 |
| DELPET 8500 | 100 | 100 | 100 | 100 |
| Methyl methacrylate | 40 | — | — | — |
| Neopentyl glycol dimethacrylate | — | 50 | — | — |
| Phenoxydiethylene glycol methacrylate | — | — | 40 | — |
| Phenoxydipropylene glycol methacrylate | — | — | — | 40 |
| tert-Butylperoxy acetate | 0.6 | — | — | — |
| Dibutylperoxy isophthalate | — | 0.8 | — | — |
| o-Chlorostylene | — | — | 40 | — |
| p-Chlorostyrene | — | — | — | 40 |
| Benzoin | — | — | 0.8 | 0.8 |

TABLE D.8-continued

|  | Colored resin compositions | | | |
|---|---|---|---|---|
|  | (1) | (2) | (3) | (4) |
| Titanium oxide | 50 | 50 | 50 | 50 |

TABLE D.9

|  |  | Examples | | | | | | | |
|---|---|---|---|---|---|---|---|---|---|
|  |  | D.21 | D.22 | D.23 | D.24 | D.25 | D.26 | D.27 | D.28 |
| Curable transparent resin layer | | (i) | (ii) | (iii) | (iv) | (i) | (ii) | (iii) | (iv) |
| Colored resin composition | | (1) | (2) | (1) | (2) | (3) | (4) | (3) | (4) |
| Thickness | Transparent resin layer ($\mu$m) | 20 | 15 | 20 | 15 | 30 | 15 | 30 | 15 |
|  | Colored resin layer ($\mu$m) | 100 | 70 | 100 | 70 | 55 | 60 | 55 | 60 |

Examples D.29–D.36

Unhardened thermosetting covering sheets were obtained by use of the same process as in Example D.21, except that each of the colored resin compositions (the components of which are shown in Table D.10) indicated in Table D.11 were coated onto one of the curable transparent resin layers (the components of which are shown in Table D.7) specified in Table D.11, and the coatings were then dried for 30 minutes at 70° C. The thicknesses of the sheets so obtained are shown in Table D.11. The sheets obtained in this way were tested by the same tests as in Example D.1, for Examples D.29, 30, 33, and 34; and by the same tests as in Example D.13, for Examples D.31, 32, 35, and 36.

TABLE D.10

|  | Colored resin compositions | | | |
|---|---|---|---|---|
|  | (5) | (6) | (7) | (8) |
| Ethyl acetate | 300 | 300 | 300 | 300 |
| DELPET 8500 | 100 | 100 | 100 | 100 |
| Dipropylene glycol dimethacrylate | — | — | 40 | 40 |
| Tripropylene glycol dimethacrylate | 40 | — | — | — |
| Hexamethylene glycol dimethacrylate | — | 60 | — | — |
| Methyl methacrylate | — | — | 40 | 40 |
| tert-Butylperoxy benzoate | 1.0 | 1.0 | 1.0 | 1.0 |
| 4-Chlorobenzophenone | — | — | 0.6 | — |
| Benzil | — | — | — | 0.6 |
| Titanium oxide | 50 | 50 | 50 | 50 |

TABLE D.11

|  |  | Examples | | | | | | | |
|---|---|---|---|---|---|---|---|---|---|
|  |  | D.29 | D.30 | D.31 | D.32 | D.33 | D.34 | D.35 | D.36 |
| Curable transparent resin layer | | (i) | (ii) | (i) | (ii) | (iii) | (iv) | (iii) | (iv) |
| Colored resin composition | | (5) | (6) | (7) | (8) | (5) | (6) | (7) | (8) |
| Thickness | Transparent resin layer ($\mu$m) | 30 | 15 | 30 | 15 | 30 | 15 | 30 | 15 |
|  | Colored resin layer ($\mu$m) | 80 | 100 | 60 | 55 | 80 | 100 | 60 | 55 |

TABLE D.12

| Examples | D.21 | D.22 | D.23 | D.24 | D.25 | D.26 | D.27 | D.28 |
|---|---|---|---|---|---|---|---|---|
| Tensile test (30° C.) | Not torn | Not torn | Not torn | Not torn | Not torn | Not torn | Not torn | Not torn |
| State of coating | Excellent | Excellent | Excellent | Excellent | Excellent | Excellent | Excellent | Excellent |
| Adhesion (number of squares remaining) | 100 | 100 | 100 | 100 | 100 | 100 | 100 | 100 |
| Hardness | H | 2H | HB | 2H | H | 2H | H | 2H |
| Examples | D.29 | D.30 | D.31 | D.32 | D.33 | D.34 | D.35 | D.36 |
| Tensile test (30° C.) | Not torn | Not torn | Not torn | Not torn | Not torn | Not torn | Not torn | Not torn |
| State of coating | Excellent | Excellent | Excellent | Excellent | Excellent | Excellent | Excellent | Excellent |
| Adhesion (number of squares remaining) | 100 | 100 | 100 | 100 | 100 | 100 | 100 | 100 |
| Hardness | H | 3H | H | 2H | HB | 3H | HB | 2H |

Substrate: Steel plate (a sheet without an adhesive layer was used).

TABLE D.13

| Examples | D.21 | D.22 | D.23 | D.24 | D.25 | D.26 | D.27 | D.28 |
|---|---|---|---|---|---|---|---|---|
| State of coating | Excellent | Excellent | Excellent | Excellent | Excellent | Excellent | Excellent | Excellent |
| Adhesion (number of squares remaining) | 100 | 100 | 100 | 100 | 100 | 100 | 100 | 100 |

TABLE D.13-continued

| Hardness | HB | H | B | H | HB | H | HB | H |
|---|---|---|---|---|---|---|---|---|
| Examples | D.29 | D.30 | D.31 | D.32 | D.33 | D.34 | D.35 | D.36 |
| State of coating | Excellent | Excellent | Excellent | Excellent | Excellent | Excellent | Excellent | Excellent |
| Adhesion (number of squares remaining) | 100 | 100 | 100 | 100 | 100 | 100 | 100 | 100 |
| Hardness | B | H | HB | 2H | B | 2H | HB | H |

Substrate: Steel plate
Adhesive layer: Acrylic adhesive (SEKISUI KAGAKU KOGYO KABUSHIKI KAISHA,S DINE WHD) was used. Thickness, 10 μm.

The curable transparent resin layers (v)–(viii) used in the following Examples D.5–D.8 were prepared by the following procedures.

Preparation of Curable Transparent Resin Layers

Curable Transparent Resin Layers (v)–(viii)

Using the components indicated in Table D.14, curable transparent resin layers were obtained by the same process as was used in the preparation of the curable transparent resin layer (i).

TABLE D.14

|  | Curable transparent resin layers | | | |
|---|---|---|---|---|
|  | (v) | (vi) | (vii) | (viii) |
| AROTHANE 2040-134 | — | 100 | — | — |
| AROTHANE 2040-136 | 100 | — | 100 | — |
| AROTHANE 2040-140 | — | — | — | 100 |
| NIKALITE H-870 | — | — | 30 | 50 |
| TAKENATE B-815N | 49 | 49 | 86 | 136 |
| NCO/OH | *1 1.0 | *1 1.0 | *2 1.0 | *2 1.0 |

NCO/OH
*1 Ratio of the number of isocyanate groups of the blocked isocyanate to the number of hydroxyl groups in the acrylic polyol.
*2 Ratio of the number of isocyanate groups of the blocked isocyanate to the total number of hydroxyl groups in the acrylic polyol and the acrylic polyol oligomer.

Comparative Examples D.5–D.8

Unhardened thermosetting covering sheets were obtained by use of the same process as in Example D.21, except that each of the colored resin compositions (the components of which are shown in Table D.15) indicated in Table D.16 were coated onto one of the curable transparent resin layers (the components of which are shown in Table D.14) specified in Table D.16. The thicknesses of the sheets so obtained are shown in Table D.16. The sheets obtained in this way were tested by the same tests as in Example D.7. The covering tests were done at 80° C. and 100° C.

The results showed that although these sheets could be elongated by 100% at 30° C., cracks formed on the surface of the transparent resin layer. These sheets could not be attached to the steel plate by vacuum formation at 80° C. or 100° C.

TABLE D.15

|  | Colored resin compositions | | |
|---|---|---|---|
|  | (9) | (10) | (11) |
| Ethyl acetate | 300 | 300 | 300 |
| DELPET 8500 | 100 | 100 | 100 |
| Methyl methacrylate | 40 | 30 | 30 |
| Diethylene glycol dimethacrylate | 20 | 20 | — |

TABLE D.15-continued

|  | Colored resin compositions | | |
|---|---|---|---|
|  | (9) | (10) | (11) |
| Tripropylene glycol dimethacrylate | — | — | 20 |
| Thioxanthone | 1.0 | 1.0 | 1.0 |
| Titanium oxide | 40 | 40 | 40 |

TABLE D.16

|  |  | Comparative Examples | | | |
|---|---|---|---|---|---|
|  |  | D.5 | D.6 | D.7 | D.8 |
| Curable transparent resin layer | | (v) | (vi) | (vii) | (viii) |
| Colored resin composition | | (9) | (10) | (10) | (11) |
| Thickness | Transparent resin layer (μm) | 15 | 15 | 15 | 20 |
|  | Colored resin layer (μm) | 70 | 70 | 70 | 70 |

Example D.37

A curable transparent resin layer was obtained by the same procedure as in Example D.1, except that here the resin mixture obtained in Example D.1 was coated onto a PET film and the coating was dried for 20 minutes at 60° C.

Next, to 100 parts of acrylic polyol (AROTHANE 2040-132) were added 59 parts of the blocked isocyanate (TAKENATE B-815N) (this amount of the blocked isocyanate has 1.2 times the number of isocyanate groups for each hydroxyl group in the aforesaid acrylic polyol), 5 parts of lead suboxide and 20 parts of titanium oxide. Then these ingredients were kneaded with a three-cylinder mixing roller. The resulting mixture was coated onto the aforesaid transparent resin layer, and the coating was dried for 20 minutes at 60° C., thereby forming a colored resin layer. An unhardened thermosetting covering sheet was then obtained by removal of the PET film. The thicknesses of the transparent resin layers and the colored resin layers of this sheet were 60 and 80 μm, respectively. This sheet was studied by tensile test in the same way as in Example D.1, and the results showed that the sheet could be elongated by 100%. Next, covering tests were done by use of the said sheet and the satisfactoriness of covering was evaluated. These covering tests were done by attachment of the sheet to a SS-41 steel plate substrate (treated with dilute nitric acid and washed with deionized water beforehand) by vacuum formation at 60° C.; the sheet could be attached to the substrate without wrinkles or cracks. Next, the sheet was hardened by being heated for 30 minutes at 160° C. The surface hardness of the coated substrate so obtained and the degree of adhesion of the sheet to the substrate were evaluated by the same procedures as shown in Example D.1; the results indicated a hardness of H and an adhesion of 100%. Furthermore, the rust resistance of the covered substrate was evaluated. The occurrence of rusting was observed after 200 hours according to the salt water spray test (JIS Z 2371) to evaluate the rust resistance. Rust did not form.

The compositions used in Examples D.38–D.40 described below are listed collectively in Table D.17. The acrylic polyamine was obtained by copolymerization of the monomers specified under "Components" in Table D.17.

In Table D.17, *1 indicates the ratio of the number of isocyanate groups in the blocked isocyanate to the number of amino groups in the acrylic polyamine, and *2 indicates the ratio of the number of isocyanate groups in the blocked isocyanate to the total number of amino groups in the acrylic polyamine and acrylic polyamine oligomer.

In Table D.17, the following copolymer was used as acrylic polyamine: a copolymer of ethyl methacrylate, 4-aminobutyl methacrylate, and butyl acrylate; weight-average molecular weight 5,000; Tg = −20° C.; and NH$_2$ value 100.

The compositions used in Examples D.41–D.43 described below are listed collectively in Table D.18. The acrylic polycarboxylic acid was obtained by copolymerization of the monomers specified under "Components" in Table D.18.

In Table D.18, *1 indicates the ratio of the number of isocyanate groups in the blocked isocyanate to the number of carboxyl groups in the acrylic polycarboxylic acid, and *2 indicates the ratio of the number of isocyanate groups in the blocked isocyanate to the total number of carboxyl groups in the acrylic polycarboxylic acid and acrylic polycarboxylic acid oligomer.

In Table D.18, the following copolymer was used as acrylic polycarboxylic acid oligomer: a copolymer of butyl acrylate, butyl acrylate, and methacrylic acid; weight-average molecular weight 3,000; Tg = −35° C.; and COOH value 150.

The compositions used in Examples D.44–D.46 described below are listed collectively in Table D.19. The reactive acrylic resin was obtained by copolymerization of the monomers specified under "Components" in Table D.19.

In Table D.19, *1 indicates the ratio of the number of isocyanate groups in the blocked isocyanate to the number of functional groups in the reactive acrylic resin, and *2 indicates the ratio of the number of isocyanate groups in the blocked isocyanate to the total number of functional groups in the acrylic polyamine oligomer or acrylic polyol oligomer.

In Table D.19, NIKALITE H-870 was used as acrylic polyamine oligomer. As acrylic polyol oligomer, the following copolymer was used: a copolymer of butyl acrylate, ethyl methacrylate, and 4-aminobutyl methacrylate; weight-average molecular weight 5,000; Tg = −20° C.; and NH$_2$ value 100.

Example D.38

With the components indicated in Table D.17, transparent resin layer was obtained by the same process as in Example D.1. The transparent resin layer was coated with a colored resin composition indicated in Table D.17, the components of which are shown in Table D.1, and a colored resin layer was formed by drying of this coating for 10 minutes at 80° C. An unhardened thermosetting covering sheet was obtained by removal of the PET film. The thicknesses of the transparent and colored resin layers of this sheet are shown in Table D.17. This covering sheet was studied by a tensile test as in Example D.1. The results are shown in Table D.20. In a vacuum package-forming machine, the aforesaid sheet was attached at 50° C. to a hemispherical substrate with a radius of 15 cm that had been coated with an acrylic melamine, at the pressure of 10 torr. Then, the attached sheet was hardened by heating the coated substrate at 160° C. for 30 minutes. The surface hardness of the coated substrate so obtained and the degree of adhesion of the sheet to the substrate were evaluated by the same procedures in Example D.1. Furthermore, gloss value was measured by the following method.

Gloss value: The gloss value is found by measurement of mirror reflection at $\theta = 60°$. The results are shown in Table D.20.

Examples D.39–D.40

With the components indicated in Table D.17, a curable transparent resin layer was obtained by the same process as in Example D.17. Then, an unhardened thermosetting covering sheet was obtained in the same way as in Example D.38, except that here, the colored resin compositions indicated in Table D.17 (the components of which are shown in Table D.1) were coated onto the transparent resin layer obtained above. The thicknesses of the transparent and colored layers of the sheets are shown in Table D.17. The covering sheets were studied by a tensile test as in Example D.1. The results are shown in Table D.20. Under the conditions shown in Table D.20, the sheet was attached to a given substrate and hardened in the same way as in Example D.38. The surface hardness and gloss value of the coated substrate and the degree of adhesion of the sheet to the substrate were evaluated by the same procedures in Example D.38. The results are shown in Table D.20.

Examples D.41–D.43

With the components indicated in Table D.18, a curable transparent resin layer was obtained by the same process as in Example D.1. Then, an unhardened thermosetting covering sheet was obtained in the same way as in Example D.38, except that here, the colored resin compositions indicated in Table D.18 (the components of which are shown in Table D.1) were coated onto the transparent resin layer obtained above. The thicknesses of the transparent and colored layers of the sheets are shown in Table D.18. The covering sheets were studied by a tensile test as in Example D.1. The results are shown in Table D.20. Under the conditions shown in Table D.20, the sheet was attached to a given substrate and hardened in the same way as in Example D.38. The surface hardness and gloss value of the coated substrate and the degree of adhesion of the sheet to the substrate were evaluated by the same procedures in Example D.38. The results are shown in Table D.20.

Examples D.44–D.46

With the components indicated in Table D.19, a curable transparent resin layer was obtained by the same process as in Example D.1. Then, an unhardened thermosetting covering sheet was obtained in the same way as in Example D.38, except that here, the colored resin compositions indicated in Table D.19 (the components of which are shown in Table D.1) were coated onto the transparent resin layer obtained above. The thicknesses of the transparent and colored layers of the sheets are shown in Table D.19. The covering sheets were studied by a tensile test as in Example D.1. The results are shown in Table D.20. Under the conditions shown in Table D.20, the sheet was attached to a given substrate and hardened in the same way as in Example D.38. The surface hardness and gloss value of the coated substrate and the degree of adhesion of the sheet to the substrate were evaluated by the same procedures in Example D.38. The results are shown in Table D.20.

TABLE D.17

|  | Examples | | |
| --- | --- | --- | --- |
|  | D.38 | D.39 | D.40 |
| Ethyl acetate | 300 | 300 | 300 |
| Acrylic polyamine | | | |
| Components | MM | MM | MM |
|  | AM | AM | AM |
|  | MA | BA | MB |
| $\overline{Mw}$ (× $10^3$) | 432 | 55 | 75 |
| Tg (°C.) | 20 | 30 | 40 |
| $NH_2$ value | 80 | 60 | 80 |
| Amount | 100 | 100 | 100 |
| Acrylic polyamine oligomer | — | — | 30 |
| Blocked isocyanate | | | |
| COLONATE 2513 | 47 | 35 | 65 |
| $NCO/NH_2$ | *[1]1.0 | *[1]1.0 | *[2]1.0 |
| Colored resin composition | a | b | a |
| Thickness of transparent resin layer (μm) | 40 | 30 | 40 |
| Thickness of colored resin layer (μm) | 60 | 70 | 60 |

The components of acrylic polyamine are abbreviated as follows.
MM: Methyl methacrylate, AM: 2-Aminoethyl methacrylate, BA: Butyl acrylate, MA: Methyl acrylate, MB: Butyl methacrylate

TABLE D.18

|  | Examples | | |
| --- | --- | --- | --- |
|  | D.41 | D.42 | D.43 |
| Ethyl acetate | 300 | 300 | 300 |
| Acrylic polycarboxylic acid | | | |
| Components | MM | MM | MM |
|  | M | M | MB |
|  | MB | MA | ME |
|  | BA | | |

TABLE D.18-continued

|  | Examples | | |
| --- | --- | --- | --- |
|  | D.41 | D.42 | D.43 |
| $\overline{Mw}$ (× $10^3$) | 400 | 68 | 78 |
| Tg (°C.) | 20 | 0 | 10 |
| COOH value | 100 | 80 | 50 |
| Amount | 100 | 100 | 100 |
| Acrylic polycarboxylic acid oligomer | — | — | 20 |
| Blocked isocyanate | | | |
| TAKENATE B-870N | 36 | 34 | 29 |
| NCO/COOH | *[1]1.0 | *[1]1.2 | *[2]1.0 |
| Colored resin composition | a | b | a |
| Thickness of transparent resin layer (μm) | 40 | 30 | 40 |
| Thickness of colored resin layer (μm) | 60 | 70 | 60 |

The components of acrylic polycarboxylic acid are abbreviated as follows.
MM: Methyl methacrylate, M: Methacrylic acid, A: Acrylic acid, BA: Butyl acrylate, MA: Methyl acrylate, MB: Butyl methacrylate, ME: Ethyl methacrylate

TABLE D.19

|  | Examples | | |
| --- | --- | --- | --- |
|  | D.44 | D.45 | D.46 |
| Ethyl acetate | 300 | 300 | 300 |
| Reactive acrylic resin | | | |
| Components | MM | MM | MM |
|  | M | AM | AM |
|  | HA | HA | HA |
|  | MB | M | ME |
|  |  | MB |  |
| $\overline{Mw}$ (× $10^3$) | 405 | 78 | 57 |
| Tg (°C.) | 40 | 20 | 30 |
| COOH value | 15 | 40 | — |
| $NH_2$ value | — | 40 | 60 |
| OH value | 80 | 40 | 40 |
| Amount | 100 | 100 | 100 |
| Acrylic polyamine oligomer | — | — | 20 |
| Acrylic polyol oligomer | — | 10 | — |
| Blocked isocyanate | | | |
| TAKENATE B-870N | 34 | 50 | 51 |
| NCO/functional group | *[1]1.0 | *[2]1.0 | *[2]1.2 |
| Colored resin composition | a | b | a |
| Thickness of transparent resin layer (μm) | 40 | 30 | 40 |
| Thickness of colored resin layer (μm) | 60 | 70 | 60 |

The components of reactive acrylic resin are abbreviated as follows.
MM: Methyl methacrylate, M: Methacrylic acid, HA: 2-Hydroxyethyl acrylate, AM: 2-Aminoethyl methacrylate, MB: Butyl methacrylate, ME: Ethyl methacrylate

TABLE D.20

| | | Examples | | | | | | | | |
| --- | --- | --- | --- | --- | --- | --- | --- | --- | --- | --- |
| | | D.38 | D.39 | D.40 | D.41 | D.42 | D.43 | D.44 | D.45 | D.46 |
| Covering conditions | Covering method*[1] | V | V | V | V | V | V | V | V | V |
| | Substrate*[2] | a | b | c | a | b | c | a | b | c |
| | Attachment conditions | | | | | | | | | |
| | Temperature of sheet (°C.) | Room temperature | Room temperature | Room temperature | Room temperature | Room temperature | Room temperature | Room temperature | Room temperature | Room temperature |
| | Temperature of substrate (°C.) | 80 | 70 | 70 | 80 | 70 | 70 | 80 | 70 | 70 |
| | Pressure (torr) | 10 | 7 | 10 | 10 | 7 | 10 | 10 | 10 | 10 |
| | Heating conditions | | | | | | | | | |
| | (°C.) | 160 | 160 | 160 | 160 | 160 | 160 | 160 | 160 | 160 |
| | (minutes) | 30 | 30 | 30 | 20 | 30 | 20 | 30 | 30 | 30 |
| Tensile test (30° C.) | | Not torn | Not torn | Not torn | Not torn | Not torn | Not torn | Not torn | Not torn | Not torn |
| Physical properties of coating | Hardness | H | H | 2H | H | HB | HB | 2H | H | 2H |
| | Gloss value (%) | 89 | 93 | 92 | 88 | 92 | 92 | 87 | 93 | 90 |
| | Adhesion (number | 100 | 100 | 100 | 100 | 100 | 100 | 100 | 100 | 100 |

TABLE D.20-continued

| | Examples | | | | | | | | |
|---|---|---|---|---|---|---|---|---|---|
| | D.38 | D.39 | D.40 | D.41 | D.42 | D.43 | D.44 | D.45 | D.46 |
| of squares remaining) | | | | | | | | | |

[1] Abbreviations for covering methods are as follows:
V, Vaccum adhesion formation.
[2] Abbreviations concerning substrate are as follows:
a, hemispherical substrate with a radius of 15 cm coated with acrylic melamine;
b, porcelain bowl with an uppermost radius fo 10 cm, height of 6 cm, and base radius of 6 cm;
c, polypropylene hemisphere with a radius of 15 cm.

Example E.1

The first thermosetting resin composition was obtained by the addition of, 29 parts of blocked isocyanate (TAKENATE B-870N; this amount of the blocked isocyanate has the same number of isocyanate groups as the number of hydroxyl groups in the aforesaid acrylic polyol), to 100 parts of acrylic polyol (AROTHANE 2040-145-8HPO4), and the mixture of these ingredients by agitation.

The second thermosetting resin composition was obtained by the addition of 29 parts of blocked isocyanate (TAKENATE B-870N; this amount of the blocked isocyanate has the same number of isocyanate groups as the number of hydroxyl groups in the aforesaid acrylic polyol) to 100 parts of acrylic polyol (AROTHANE 2040-134) and the mixture of these ingredients by agitation.

The aforesaid first thermosetting resin composition was coated onto the releasing surface of a PET film (thickness 40 μm; manufactured by Soken Kako Co., Ltd., treated with a silicone mold-releasing agent) so that the thickness of the dried coating would be 100 μm. The first thermosetting resin layer was then formed by the drying of this coating for 10 minutes at 80° C. Next, this layer was coated with the second thermosetting resin composition so that the thickness of the dried film would be 30 μm, and this was then dried for 10 minutes at 80° C. to form the second thermosetting resin layer. An unhardened thermosetting covering sheet was then obtained by removal of the PET film from the coated layer. The thickness of the sheet so obtained was about 130 μm.

The sheet obtained in this way was studied by a tensile test. Next, the aforesaid sheet was tested in a covering test, and the covering condition was observed. Then, the surface hardness of the coated substrate so obtained and the degree of adhesion of the sheet to the steel plate substrate were evaluated. The procedures used for these tests were as follows, and the results of the tests are shown in Table E.2.

Tensile Test

The thermosetting covering sheet is cut to form a 20×100 mm test strip. The test strip is elongated by 100% in the longitudinal direction at 80° C., while observation is made of whether it is torn.

Covering Test

The surface of a stainless steel plate bent into a convex form (radius of curvature, 50 cm; base diameter, 20 cm) is covered with a thermosetting covering sheet (20×20 cm) and the sheet is extended so that the edges of the sheet reach every part of the edge of the plate. Then the sheet is caused to adhere by vacuum pressure at 30° C. and the covering condition is observed.

Then, this covered stainless steel plate was heated for 30 minutes at 140° C. to harden the sheet. The thickness of the covering so obtained in the vicinity of the edge thereof was about 70 μm.

Measurement of Hardness

Hardness was measured by the pencil hardness test by the standards prescribed in JIS K5400.

Adhesion Test

A 100-square checkerboard pattern with 1-mm spacings is inscribed on the coating of the test sample plate, and commercially available adhesive tape is caused to adhere onto the coating of this test sample, after which the tape is peeled off and the number of squares remaining of the coating is counted. Examples E.2-E.4 and Comparative Examples E.1-E.2

First and second thermosetting resin compositions were obtained by mixture of the components indicated in Table E.1. By use of the first and second thermosetting resin materials so obtained, an unhardened thermosetting covering sheet was prepared by the same method as was used in Example E.1. This sheet was then studied by the same tests as were described in Example E.1. Then the covered substrate was obtained by the same procedure as in of Example E.1. The covered stainless steel plate obtained in the covering test was heated at 110° C. in Example E.2, at 160° C. in Example E.3, and at 180° C. in Example E.4. The results of these tests are shown in Table E.2.

In the tensile tests, the covering sheets obtained in Comparative Examples E.1 and E.2 tore and could not be elongated by 100%.

Comparative Example E.3

To 100 parts of acrylic polyol (AROTHANE 2040-145) was added 49 parts of blocked isocyanate (TAKENATE B-815N; this amount of the blocked isocyanate had the same number of isocyanate groups as the number of hydroxyl groups in the aforesaid acrylic polyol), and these ingredients were mixed by agitation.

The aforesaid mixture was coated onto the releasing surface of a silicone-treated PET film of the same type as in Example E.1, so that the thickness of the dried coating would be 100 μm. A thermosetting resin layer was then formed by the drying of this coating for 10 minutes at 80° C. An unhardened thermosetting covering sheet was then obtained by removal of the PET film from this coating layer. This sheet was studied by the same tests as Example E.1. The results are shown in Table E.2.

TABLE E.1

| | | Examples | | | | Comparative Examples | | |
|---|---|---|---|---|---|---|---|---|
| | | E.1 | E.2 | E.3 | E.4 | E.1 | E.2 | E.3 |
| First thermoset- | Acrylic polyol | | | | | | | |

TABLE E.1-continued

| | | Examples | | | | Comparative Examples | | |
|---|---|---|---|---|---|---|---|---|
| | | E.1 | E.2 | E.3 | E.4 | E.1 | E.2 | E.3 |
| ting resin composition | Trade name | ARO-THANE 2040-145-8HP04 | ARO-THANE 2040-132 | ARO-THANE 2040-146 | ARO-THANE 2040-139 | AROTHANE 2060 | AROTHANE 2040-134 | ARO-THANE 2040-145 |
| | $\overline{M}w$ (× 10³) | 267 | 365 | 300 | 321.3 | 9.4 | 9.3 | 339 |
| | Amount (parts) | 100 | 100 | 100 | 100 | 100 | 100 | 100 |
| | Blocked isocyanate | | | | | | | |
| | Trade name | TAKENATE B-870N | COLONATE 2513 | TAKENATE B-815N | COLONATE 2515 | TAKENATE B-870N | TAKENATE B-815N | TAKENATE B-815N |
| | Amount (parts) | 29 | 47 | 62 | 57 | 29 | 49 | 49 |
| | NCO/OH | 1.0*1 | 1.0*1 | 1.0*1 | 1.0*1 | 1.0*1 | 1.0*1 | 1.0*1 |
| Second thermosetting resin composition | Acrylic polyol | | | | | | | |
| | Trade name | ARO-THANE 2040-134 | ARO-THANE 2040-134 | ARO-THANE 2040-146 | ARO-THANE 2040-139 | AROTHANE 2040-134 | AROTHANE 2040-134 | |
| | $\overline{M}w$ (× 10³) | 9.3 | 9.3 | 300 | 321.3 | 9.3 | 9.3 | |
| | Amount (parts) | 100 | 100 | 100 | 100 | 100 | 100 | |
| | Acrylic polyol oligomer | | | | | | | |
| | Trade name | | | NIKALITE H-870 | NIKALITE H-870 | | | NIKALITE H-870 |
| | $\overline{M}w$ (× 10³) | | | 2.2–2.5 | 2.2–2.5 | | | 2.2–2.5 |
| | Amount (parts) | | | 100 | 50 | | | 30 |
| | Blocked isocyanate | | | | | | | |
| | Trade name | TAKENATE B-870N | COLONATE 2513 | TAKENATE B-815N | COLONATE 2515 | TAKENATE B-870N | TAKENATE B-815N | |
| | Amount (parts) | 29 | 47 | 185 | 113 | 29 | 86 | |
| | NCO/OH | 1.0*1 | 1.0*1 | 1.0*2 | 1.0*2 | 1.0*1 | 1.0*2 | |

*1 Ratio of the number of isocyanate groups of the blocked isocyanate to the number of hydroxyl groups in the acrylic polyol.
*2 Ratio of the number of isocyanate groups of the blocked isocyanate to the total number of hydroxyl groups in the acrylic polyol and acrylic polyol oligomer.

TABLE E.2

| | Examples | | | | Comparative Examples | | |
|---|---|---|---|---|---|---|---|
| | E.1 | E.2 | E.3 | E.4 | E.1 | E.2 | E.3 |
| Tensile test (30° C.) | Not torn | Not torn | Not torn | Not torn | Torn | Torn | Not torn |
| State of coating | Excellent | Excellent | Excellent | Excellent | | | Excellent |
| Adhesion (number of squares remaining) | 100 | 100 | 100 | 100 | | | 80 |
| Hardness | 2H | H | 2H | H | | | 2H |

EXAMPLES F

For the series of Examples F described below, the physical properties of the thermosetting covering sheets and covered substrates obtained by use of the said sheets were evaluated in accordance with the following procedures.

(1) Adhesion Test

A 100-square checkerboard pattern with 1-mm spacings is inscribed on the coating of the test sample plate, and commercially available adhesive tape is made to adhere onto the coating of this test sample, after which the tape is peeled off and the number of squares remaining of the coating is counted.

(2) Hardness

Hardness was measured by the pencil hardness test by the standards prescribed in JIS K5400.

(3) Critical Surface Tension

Contact angles are obtained with use of one drop of various liquids of different surface tension (water, alcohol, and hydrocarbons) and plotted in a graph. The critical surface tension is estimated by extrapolation from this graph.

The compositions used in Examples F.1–F.8 and Comparative Examples F.1 and F.2 described below are listed collectively in Tables F.1 and F.2. The acrylic polyols were obtained by copolymerization of the monomers specified under "Components" in Tables F.1 and F.2, respectively.

In Table F.1, *1 indicates the ratio of the number of isocyanate groups in the blocked isocyanate to the number of hydroxyl groups in the acrylic polyol, and *2 indicates the ratio of the number of isocyanate groups in the blocked isocyanate to the total number of hydroxyl groups in the acrylic polyol and blocked acrylic polyol.

The numbers in parentheses in row *3 indicate the percentage of hydroxyl groups in the acrylic polyol to be reacted with the isocyanate groups of COLONATE L.

The following block copolymer was used as the blocked acrylic polyol: a block copolymer of stearyl methacrylate and 4-hydroxybutyl methacrylate (weight-average molecular weight 25,000, glass transition point −5° C., hydroxyl value 20).

In Table F.2, *1 indicates the ratio of the number of isocyanate groups in the blocked isocyanate to the number of hydroxyl groups in the acrylic polyol, and *2 indicates the ratio of the number of isocyanate groups in the blocked isocyanate to the total number of hydroxyl groups in the acrylic polyol and blocked acrylic polyol.

The numbers in parentheses in row *3 indicate the percentage of hydroxyl groups in the acrylic polyol to be reacted with the isocyanate groups of COLONATE L.

The numbers in parentheses in row *4 indicate the percentage of the total number of hydroxyl groups in the acrylic polyol and acrylic polyol oligomer to be reacted with ARALDITE CY175.

The numbers in parentheses in row *5 indicate the amount (wt %) of the $C_8F_{17}$ or $C_7F_{15}$ groups in the fluorocarbon compounds with respect to the total amount of solids in the mixture used.

The following copolymer was used as the acrylic polyol oligomer: a copolymer of ethyl methacrylate and 4-hydroxybutyl methacrylate (weight-average molecular weight 5,000, glass transition point $-20°$ C., hydroxyl value 100).

The items a)–h) in Table F.2 indicate amounts (parts by weight) of the following compounds.

a) $C_8F_{17}C_2H_4OH$.
b) Polymer of $C_8F_{17}C_2H_4OCOC(CH_3)=CH_2$, $\overline{Mw}=5,000$
c) Copolymer of 50 mole % of $C_8F_{17}C_2H_4OC_6H_4CH=CH_2$ and 50 mole % of methyl methacrylate, $\overline{Mw}=6,000$.
d) Copolymer of 50 mole % of $C_8F_{17}C_2H_4OCOC(CH_3)=CH_2$ and 50 mole % of methyl methacrylate, $\overline{Mw}=30,000$.
e) $C_7F_{15}C_4H_8$.
f) Copolymer of 50 mole % of $C_8F_{17}C_2H_4OCOC(CH_3)=CH_2$ and 50 mole % of styrene, $\overline{Mw}=3,000$.
g) Copolymer of 30 mole % of $C_8F_{17}C_2H_4OC_6H_4CH=CH_2$ and 70 mole % of methyl methacrylate, $\overline{Mw}=6,000$.
h) Copolymer of 50 mole % of $C_8F_{17}C_2H_4OCOC(CH_3)=CH_2$ and 50 mole % of methyl methacrylate, $\overline{Mw}=20,000$.

Example F.1

By use of an applicator, the mixture with the constituents shown in Table F.1 was coated onto the releasing surface of a PET film (thickness 38 μm, manufactured by Soken Kako Co., Ltd.), which had been treated with a silicone mold-releasing agent. The first resin layer was then obtained by drying of this coating for 10 minutes at 80° C. The thickness of this layer was 100 μm. Next, with an applicator, this first resin layer was coated with a mixture prepared from the constituents shown in Table F.2 so as to form a coating 20 μm thick, and this coating was dried for 10 minutes at 80° C. Then, an unhardened thermosetting covering sheet was obtained by removal of the PET film.

In a vacuum package-forming machine, the aforesaid sheet was attached at 50° C. to a hemispherical substrate with a radius of 10 cm that had been precoated with an acrylic melamine, at the pressure of 6 torr. Then, the attached sheet was hardened by heating coated substrate at 160° C. for 30 minutes. The surface hardness and critical surface tension of the coated substrate so obtained and the degree of adhesion of the sheet to the substrate were evaluated. The results are shown in Table F.3.

Examples F.2–F.3 and Comparative Examples F.1–F.2

A first resin layer was obtained by the coating of a mixture with the constituents indicated in Table F.1 onto a PET film, which was dried under the conditions shown in Table F.3. Next, a mixture with the constituents indicated in Table F.2 was coated onto the first resin layer by the same process as in Example F.1. Then, the coating was dried under the conditions shown in Table F.3, resulting in a double-layered thermosetting covering sheet. The thicknesses of the first and second resin layers are shown in Table F.3. Then, under the conditions indicated in Table F.3, a given substrate was covered with the aforesaid sheet and hardened by the same method as in Example F.1. In Example F.2, after the attachment of the sheet under the conditions indicated in Table F.3, the sheet was hardened by being heated for 2 minutes at 120° C., and then by being heated for a further 60 minutes at 90° C. The surface hardness and critical surface tension of the coated substrate so obtained and the degree of adhesion of the sheet to the substrate were evaluated by the same procedure as in Example F.1. The results are shown in Table F.3. The sheet described in Comparative Example F.1 tore while being attached to the substrate under the conditions indicated in Table F.3, and a hard coating could not be formed.

Example F.4

A first resin layer was obtained by the coating of a mixture with the constituents indicated in Table F.1 onto a PET film as in Example F.1, which was dried for 20 minutes at 70° C. Next, in the same way as in the description of Example F.1, a mixture with the constituents shown in Table F.2 was coated onto the said first resin layer under the conditions indicated in Table F.3, and a thermosetting covering sheet was obtained by the drying of this coating. The thicknesses of the first and second resin layers of the sheet are shown in Table F.3. Then, by use of a bowl-shaped mold, the sheet obtained as described above was attached to the substrate by vacuum pressing at 80° C. This sheet was hardened by being heated for 20 minutes at 120° C., after which the surface hardness and critical surface tension of the coated substrate so obtained and the degree of adhesion of the sheet to the substrate were evaluated by the same procedure as in Example F.1. The results are shown in Table F.3.

Examples F.5–F.7

A first resin layer was obtained by the coating of a mixture with the constituents indicated in Table F.1 onto a PET film as in Example F.1. It was then dried under the condition shown in Table F.3. Next, as described in Example F.1, a mixture with the constituents shown in Table F.2 was coated onto the said first resin layer under the conditions shown in Table F.3 and a thermosetting covering sheet was obtained by the drying of this coating. The thicknesses of the first and second resin layers are shown in Table F.3. Then, under the conditions indicated in Table F.3, a given substrate was covered with the aforesaid sheet and hardened by the same method as in Example F.1. In Example F.6, after the attachment of the sheet under the conditions indicated in Table F.3, the sheet was hardened by being heated for 2 minutes at 120° C., and then by being heated for a further 60 minutes at 90° C. The surface hardness and critical surface tension of the coated substrate so obtained and the degree of adhesion of the sheet to the substrate were evaluated by the same procedure as in Example F.1. The results are shown in Table F.3.

Example F.8

A first resin layer was obtained by the coating of a mixture with the constituents indicated in Table F.1 onto a PET film, which was dried under the conditions shown in Table F.3. Next, a mixture with the constituents indicated in Table F.2 was coated onto the first resin layer by the same process as in Example F.1. Then, the coating was dried under the conditions shown in Table F.3, resulting in a double-layered thermosetting covering sheet. The thicknesses of the first and second resin layers are shown in Table F.3.

The aforesaid sheet was set into an injection mold (constructed for forming disks of with a radius 50 mm and thickness of 1.5 mm) and a polyetherimide resin was injected, resulting in a disk that was coated with the sheet. The sheet covering this disk was then hardened by being heated for 20 minutes at 120° C., after which the surface hardness and critical surface tension of the coated substrate so obtained and the degree of adhesion of the sheet to the substrate were evaluated by the procedures in Example F.1. The results are shown in Table F.3.

TABLE F.1

| | Examples | | | | | | | | Comparative Examples | |
|---|---|---|---|---|---|---|---|---|---|---|
| | F.1 | F.2 | F.3 | F.4 | F.5 | F.6 | F.7 | F.8 | F.1 | F.2 |
| Ethyl acetate | 300 | 300 | 300 | 300 | 300 | 300 | 300 | 300 | 300 | 300 |
| Acrylic polyol | | | | | | | | | | |
| Components | MM HP EA | MM HP EA | MM HP BA | MM HP BA | MM HP EA | MM HP EA | MM HE EA | MM HE EA | MM HE EA | MM HP BA |
| $\overline{Mw}$ (× $10^3$) | 150 | 150 | 150 | 150 | 360 | 360 | 423 | 423 | 52 | 150 |
| Tg (°C.) | 10 | 10 | 10 | 10 | 20 | 20 | 20 | 20 | 35 | 10 |
| OH value | 40 | 40 | 80 | 80 | 100 | 100 | 80 | 80 | 60 | 80 |
| Amount | 100 | 100 | 100 | 100 | 100 | 100 | 100 | 100 | 100 | 100 |
| Blocked acrylic polyol | 10 | 10 | — | — | — | — | — | — | — | — |
| Blocked isocyanates | | | | | | | | | | |
| TAKENATE B-815N | — | — | — | — | — | — | — | — | 37 | — |
| COLONATE 2513 | 25 | 25 | 47 | 47 | 59 | 59 | 47 | 47 | — | 47 |
| NCO/OH | *²1.0 | *²1.0 | *¹1.0 | *¹1.0 | *¹1.0 | *¹1.0 | *¹1.0 | *¹1.0 | *¹1.0 | *¹1.0 |
| COLONATE L*³ | — | — | 14 (40%) | 14 (40%) | — | — | 14 (40%) | 14 (40%) | 2.6 (10%) | 14 (40%) |

Components of acrylic polyol are abbreviated as follows.
MM: Methyl methacrylate, HP: 3-Hydroxypropyl methacrylate, BA: Butyl acrylate, HE: 2-Hydroxyethyl methacrylate, EA: Ethyl acrylate

TABLE F.2

| | Examples | | | | | | | | Comparative Examples | |
|---|---|---|---|---|---|---|---|---|---|---|
| | F.1 | F.2 | F.3 | F.4 | F.5 | F.6 | F.7 | F.8 | F.1 | F.2 |
| Ethyl acetate | 300 | 300 | 300 | 300 | 300 | 300 | 300 | 300 | 300 | 300 |
| Acrylic polyol | | | | | | | | | | |
| Components | MM HE EA | MM HE EA | MM HE EA | MM HE BA | MM HE EA | MM HE EA | MM HE EA | MM HE BA | MM HE EA | MM HE BA |
| $\overline{Mw}$ (× $10^3$) | 230 | 568 | 230 | 200 | 450 | 264 | 230 | 400 | 20 | 230 |
| Tg (°C.) | 35 | 35 | 35 | 10 | 20 | 25 | 35 | 10 | 15 | 35 |
| OH value | 60 | 80 | 60 | 100 | 60 | 80 | 60 | 60 | 80 | 60 |
| Amount | 100 | 100 | 100 | 100 | 100 | 100 | 100 | 100 | 100 | 100 |
| Acrylic polyol oligomer | — | — | — | 20 | — | — | — | 20 | — | — |
| Blocked isocyanates | | | | | | | | | | |
| TAKENATE B-815N | 49 | 39 | 49 | — | 37 | 39 | 37 | — | 59 | 37 |
| COLONATE 2513 | — | — | — | 82 | — | — | — | 59 | — | — |
| NCO/OH | *¹1.0 | *¹0.8 | *¹1.0 | *²1.0 | *¹1.0 | *¹0.8 | *¹1.0 | *²1.0 | *¹1.2 | *¹1.0 |
| COLONATE L*³ | — | 3.5 (10%) | — | — | — | 3.5 (10%) | — | — | — | — |
| ARALDITE CY175*⁴ | — | — | — | 15 (30%) | — | — | — | 15 (30%) | — | — |
| Fluorocarbon compound*⁵ | ᵃ⁾1.0 (0.6 wt %) | ᵇ⁾2.0 (1.1 wt %) | ᶜ⁾10 (3.9 wt %) | ᵈ⁾4.0 (1.2 wt %) | ᵉ⁾2.0 (1.2 wt %) | ᶠ⁾2.0 (0.9 wt %) | ᵍ⁾5.0 (1.9 wt %) | ʰ⁾4.0 (1.3 wt %) | — | — |

Components of acrylic polyol are abbreviated as follows.
MM: Methyl methacrylate, HP: 3-Hydroxypropyl methacrylate, BA: Butyl acrylate, HE: 2-Hydroxyethyl methacrylate, EA: Ethyl acrylate

TABLE F.3

| | | Examples | | | | | | | | Comparative Examples | |
|---|---|---|---|---|---|---|---|---|---|---|---|
| | | F.1 | F.2 | F.3 | F.4 | F.5 | F.6 | F.7 | F.8 | F.1 | F.2 |
| Preparation of sheet | First resin layer Drying conditions | | | | | | | | | | |

TABLE F.3-continued

|  |  | Examples | | | | | | | | Comparative Examples | |
|---|---|---|---|---|---|---|---|---|---|---|---|
|  |  | F.1 | F.2 | F.3 | F.4 | F.5 | F.6 | F.7 | F.8 | F.1 | F.2 |
|  | (°C.) | 80 | 80 | 70 | 70 | 80 | 80 | 70 | 70 | 80 | 70 |
|  | (分) | 10 | 10 | 20 | 20 | 10 | 10 | 20 | 20 | 10 | 20 |
|  | Thickness (μm) | 100 | 100 | 80 | 80 | 100 | 100 | 80 | 80 | 100 | 80 |
|  | Second resin layer | | | | | | | | | | |
|  | Drying conditions | | | | | | | | | | |
|  | (°C.) | 80 | 80 | 80 | 80 | 80 | 80 | 80 | 80 | 80 | 80 |
|  | (分) | 10 | 10 | 10 | 10 | 10 | 10 | 10 | 10 | 10 | 10 |
|  | Thickness (μm) | 20 | 50 | 20 | 60 | 20 | 50 | 30 | 30 | 20 | 20 |
| Covering conditions | Covering method*1 | V | V | V | P | V | V | V | I | V | V |
|  | Substrate*2 | i | c | g | g | i | c | g |  | a | g |
|  | Attachment conditions | | | | | | | | | | |
|  | Temperature of sheet (°C.) | room temperature | room temperature | room temperature | room temperature | room temperature | room temperature | room temperature |  | room temperature | room temperature |
|  | Temperature of substrate (°C.) | 50 | 60 | 80 | 80 | 50 | 60 | 80 |  | 80 | 80 |
|  | Pressure (torr) | 6 | 6 | 6 |  | 6 | 6 | 6 |  | 6 | 6 |
|  | Heating conditions | | | | | | | | | | |
|  | (°C.) | 160 | 120  90 | 160 | 120 | 160 | 120  90 | 160 | 120 | sheet | 160 |
|  | (分) | 30 | 2  60 | 30 | 20 | 30 | 2  60 | 30 | 20 | was | 30 |
| Physical properties of coating | Hardness | H | 2H | H | H | HB | HB | H | H | torn | H |
|  | Critical surface tension (dyn/cm) | 12 | 9 | 10 | 13 | 11 | 9 | 13 | 12 |  | 35 |
|  | Adhesion (number of squares remaining) | 100 | 100 | 100 | 100 | 100 | 100 | 100 | 100 |  | 100 |

*1 Abbreviations for covering methods are as follows.
V, Vacuum adhesion forming.
I, Insert injection:
P, Vacuum pressing (bowl-shaped mold was used)
*2 Abbreviations concerning the substrate are as follows.
a, Hemispherical substrate of radius 15 cm, precoated with acrylic melamine.
c, Polypropylene hemisphere of radius 15 cm. g, SS-41 steel bowl of radius 10 cm, height of 6 cm and basal radius 6 cm.
i, Hemispherical substrate of radius 15 cm, precoated with acrylic melamine.

The compositions used in Examples F.9–F.16 and Comparative Examples F.3 and F.4 described below are listed collectively in Tables F.4 and F.5. The reactive acrylic resins were obtained by copolymerization of the monomers specified under "Components" in Tables F.4 and F.5, respectively.

In Table F.4, *1 indicates the ratio of the number of isocyanate groups in the blocked isocyanate to the number of functional groups in the reactive acrylic resin, and *2 indicates the ratio of the number of isocyanate groups in the blocked isocyanate to the total number of functional groups in the reactive acrylic resin and acrylic polyol oligomer.

The numbers in parentheses in row *3 indicate the percentage of functional groups to be reacted with the isocyanate groups of COLONATE L, the functional groups being contained in reactive acrylic resin or else in reactive acrylic resin and acrylic polyol oligomer.

The numbers in parentheses in row *4 indicate the percentage of the total number of functional groups in the reactive acrylic resin and acrylic polyol oligomer to be reacted with ARALDITE CY175.

The block copolymer was used as the blocked acrylic polyol: a block copolymer of stearyl methacrylate and 4-hydroxybutyl methacrylate ($\overline{Mw}=25,000$, $Tg=-5°$ C., OH value 20).

In Table F.5, *1 indicates the ratio of the number of isocyanate groups in the blocked isocyanate to the number of functional groups in the reactive acrylic resin, and *2 indicates the ratio of the number of isocyanate groups in the blocked isocyanate to the total number of functional groups in the reactive acrylic resin and acrylic polyol oligomer.

The numbers in parentheses in row *3 indicate the percentage of functional groups to be reacted with the isocyanate groups of COLONATE L, the functional groups being contained in the reactive acrylic resin or else in the reactive acrylic resin and acrylic polyol oligomer.

The numbers in parentheses in row *4 indicate the percentage of the total number of functional groups in the reactive acrylic resin and acrylic polyol oligomer to be reacted with ARALDITE CY175.

The numbers in parentheses in row *5 indicate the amount (wt %) of the $C_8F_{17}$ or $C_7F_{15}$ groups in the fluorocarbon compounds with respect to the total amount of solids in the mixture used.

The following copolymer was used as the acrylic polyol oligomer: a copolymer of ethyl methacrylate and 4-hydroxybutyl methacrylate (weight-average molecular weight 5,000, glass transition point $-20°$ C., hydroxyl value 100).

The items a)–h) in Table F.5 indicate amounts (parts by weight) of the following compounds.

a) $C_8F_{17}C_2H_4OH$.

b) Polymer of $C_8F_{17}C_2H_4OCOC(CH_3)=CH_2$, $\overline{Mw}=5,000$.

c) Copolymer of 50 mole % of $C_8F_{17}C_2H_4OC_6H_4CH=CH_2$ and 50 mole % of methyl methacrylate, $\overline{Mw}=6,000$.

d) Copolymer of 50 mole % of $C_8F_{17}C_2H_4OCOC(CH_3)=CH_2$ and 50 mole % of methyl methacrylate, $\overline{Mw}=30,000$.

e) $C_7F_{15}C_4H_8$.

f) Copolymer of 50 mole % of $C_8F_{17}C_2H_4OCOC(CH_3)=CH_2$ and 50 mole % of styrene, $\overline{Mw}=3,000$.

g) Copolymer of 30 mole % of $C_8F_{17}C_2H_4OC_6H_4CH=CH_2$ and 70 mole % of methyl methacrylate, $\overline{Mw}=6,000$.

h) Copolymer of 50 mole % of $C_8F_{17}C_2H_4OCOC(CH_3)=CH_2$ and 50 mole % of methyl methacrylate, $\overline{Mw}=20,000$.

Examples F.9–F.11 and Comparative Examples F.3 and F.4

A first resin layer was obtained by the coating of a mixture with the constituents indicated in Table F.4 onto a PET film, which was dried under the conditions shown in Table F.6. Next, a mixture with the constituents indicated in Table F.5 was coated onto the first resin layer and dried by the same process as in Example F.1 under the conditions shown in Table F.6, resulting in a double-layered thermosetting covering sheet. The thicknesses of the first and second resin layers are shown in Table F.6. Then, under the conditions indicated in Table F.6, a given substrate was covered with the aforesaid sheet and hardened by the same method as in Example F.1. In Example F.10, after the attachment of the sheet under the conditions indicated in Table F.6, the sheet was hardened by being heated for 2 minutes at 120° C., and then by being heated for a further 60 minutes at 90° C. The surface hardness and critical surface tension of the coated substrate so obtained and the degree of adhesion of the sheet to the substrate were evaluated by the same procedure as in Example F.1. The results are shown in Table F.6. The sheet described in Comparative Example F.3 tore while being attached to the substrate under the conditions indicated in Table F.6, and a hard coating could not be formed.

Example F.12

A first resin layer was obtained by the coating of a mixture with the constituents indicated in Table F.4 onto a PET film, which was dried under the conditions shown in Table F.4. Next, a mixture with the constituents indicated in Table F.5 was coated onto the first resin layer and dried by the same process as in Example F.1 under the conditions shown in Table F.6, resulting in a double-layered thermosetting covering sheet. The thicknesses of the first and second resin layers are shown in Table F.6.

The aforesaid sheet was processed and hardened by the same method as in Example F.4. The surface hardness and critical surface tension of the coated substrate so obtained and the degree of adhesion of the sheet to the substrate were evaluated by the same procedure as in Example F.1. The results are shown in Table F.6.

Examples F.13–F.15

A first resin layer was obtained by the coating of a mixture with the constituents indicated in Table F.4 onto a PET film, which was dried under the conditions shown in Table F.6. Next, a mixture with the constituents indicated in Table F.5 was coated onto the first resin layer and dried by the same process as in Example F.1 under the conditions shown in Table F.3, resulting in double-layered thermosetting covering sheet. The thicknesses of the first and second resin layers are shown in Table F.6. Then, under the conditions indicated in Table F.6, a given substrate was covered with the aforesaid sheet and hardened by the same method as in Example F.1. In Example F.14, after the attachment of the sheet under the conditions indicated in Table F.6, the sheet was hardened by being heated for 2 minutes at 120° C., and then by being heated for a further 60 minutes at 90° C. The surface hardness and critical surface tension of the coated substrate so obtained and the degree of adhesion of the sheet to the substrate were evaluated by the same procedure as in Example F.1. The results are shown in Table F.6.

Example F.16

A first resin layer was obtained by the coating of a mixture with the constituents indicated in Table F.4 onto a PET film, which was dried under the conditions shown in Table F.3. Next, a mixture with the constituents indicated in Table F.5 was coated onto the first resin layer by the same process as in Example F.1 under the conditions shown in Table F.6, resulting in a double-layered thermosetting covering sheet. The thicknesses of the first and second resin layers are shown in Table F.6.

The aforesaid sheet was processed and hardened by the same method as in Example F.8. The surface hardness and critical surface tension of the coated substrate so obtained and the degree of adhesion of the sheet to the substrate were evaluated by the same procedure as indicated in Example F.1. The results are shown in Table F.6.

TABLE F.4

| | Examples | | | | | | | | Comparative Examples | |
|---|---|---|---|---|---|---|---|---|---|---|
| | F.9 | F.10 | F.11 | F.12 | F.13 | F.14 | F.15 | F.16 | F.3 | F.4 |
| Ethyl acetate | 300 | 300 | 300 | 300 | 300 | 300 | 300 | 300 | 300 | 300 |
| Reactive acrylic resin | | | | | | | | | | |
| Components | MM HE AE | MM AE M | MM AE HE M EA | MM HE | MM M AE EA | MM EA AE | MM M BA | MM M HE EA | MM EA AE | MM M BA |
| $\overline{Mw}$ (× $10^3$) | 384 | 259 | 483 | 542 | 155 | 249 | 321 | 214 | 20 | 230 |
| Tg (°C.) | 15 | 30 | 15 | 10 | 25 | 20 | 0 | 10 | 15 | 35 |
| COOH value | — | 30 | 20 | 20 | 10 | — | 60 | 10 | — | 60 |
| NH$_2$ value | 20 | 50 | 20 | 80 | 50 | 80 | — | 20 | 80 | — |
| OH value | 40 | — | 20 | — | — | — | — | 30 | — | — |
| Amount | 100 | 100 | 100 | 100 | 100 | 100 | 100 | 100 | 100 | 100 |
| Acrylic polyol oligomer | — | — | — | 20 | — | — | — | 20 | — | — |
| Blocked isocyanates | | | | | | | | | | |

TABLE F.4-continued

| | Examples | | | | | | | | Comparative Examples | |
|---|---|---|---|---|---|---|---|---|---|---|
| | F.9 | F.10 | F.11 | F.12 | F.13 | F.14 | F.15 | F.16 | F.3 | F.4 |
| TAKENATE B-815N | 49 | 39 | 49 | — | 37 | 39 | 37 | — | 59 | 37 |
| COLONATE 2513 | — | — | — | 82 | — | — | — | 59 | — | — |
| NCO/functional group | [*1]1.0 | [*1]0.8 | [*1]1.0 | [*2]1.0 | [*1]1.0 | [*1]0.8 | [*1]1.0 | [*2]1.0 | [*1]1.2 | [*1]1.0 |
| COLONATE L[*3] | — | 3.5 (10%) | — | — | — | 3.5 (10%) | — | — | — | — |
| ARALDITE CY175[*4] | — | — | — | 15 (30%) | — | — | — | 15 (30%) | — | — |

Components of reactive acrylic resin are abbreviated as follows.
MM: Methyl methacrylate, BA: Butyl acrylate, HE: 2-Hydroxyethyl methacrylate, EA: Ethyl acrylate, AM: 2-Aminoethyl methacrylate, M: Methacrylic acid

TABLE F.5

| | Examples | | | | | | | | Comparative Examples | |
|---|---|---|---|---|---|---|---|---|---|---|
| | F.9 | F.10 | F.11 | F.12 | F.13 | F.14 | F.15 | F.16 | F.3 | F.4 |
| Ethyl acetate | 300 | 300 | 300 | 300 | 300 | 300 | 300 | 300 | 300 | 300 |
| Reactive acrylic resin | | | | | | | | | | |
| Components | MM HE AE | MM AE M | MM HE AE M EA | MM M HE | MM M AE EA | MM EA AE | MM M BA | MM M HE EA | MM AE EA | MM M BA |
| $\overline{Mw}$ ($\times 10^3$) | 652 | 235 | 372 | 153 | 215 | 470 | 420 | 195 | 20 | 230 |
| Tg (°C.) | 15 | 30 | 15 | 10 | 25 | 20 | 0 | 10 | 15 | 35 |
| COOH value | — | 30 | 20 | 20 | 50 | — | 60 | 10 | — | 60 |
| NH$_2$ value | 20 | 50 | 20 | 80 | 10 | 80 | — | 20 | 80 | — |
| OH value | 40 | — | 20 | — | — | — | — | 30 | — | — |
| Amount | 100 | 100 | 100 | 100 | 100 | 100 | 100 | 100 | 100 | 100 |
| Acrylic polyol oligomer | — | — | — | 20 | — | — | — | 20 | — | — |
| Blocked isocyanates | | | | | | | | | | |
| TAKENATE B-815N | 49 | 39 | 49 | — | 37 | 39 | 37 | — | 59 | 37 |
| COLONATE 2513 | — | — | — | 82 | — | — | — | 59 | — | — |
| NCO/functional group | [*1]1.0 | [*1]0.8 | [*1]1.0 | [*2]1.0 | [*1]1.0 | [*1]0.8 | [*1]1.0 | [*2]1.0 | [*1]1.2 | [*1]1.0 |
| COLONATE L[*3] | — | 3.5 (10%) | — | — | — | 3.6 (10%) | — | — | — | — |
| ARALDITE CY175[*4] | — | — | — | 15 (30%) | — | — | — | 15 (30%) | — | — |
| Fluorocarbon compound[*5] | a)1.0 (0.6 wt %) | b)2.0 (1.1 wt %) | c)10 (3.9 wt %) | d)4.0 (1.2 wt %) | e)2.0 (1.2 wt %) | f)2.0 (0.9 wt %) | g)5.0 (1.9 wt %) | h)4.0 (1.3 wt %) | — | — |

Components of reactive acrylic resin are abbreviated as follows.
MM: Methyl methacrylate, BA: Butyl acrylate, HE: 2-Hydroxyethyl methacrylate, EA: Ethyl acrylate, AM: 2-Aminoethyl methacrylate, M: Methacrylic acid

TABLE F.6

| | | Examples | | | | | | | | Comparative Examples | |
|---|---|---|---|---|---|---|---|---|---|---|---|
| | | F.9 | F.10 | F.11 | F.12 | F.13 | F.14 | F.15 | F.16 | F.3 | F.4 |
| Preparation of sheet | First resin layer | | | | | | | | | | |
| | Drying conditions (°C.) | 80 | 80 | 70 | 70 | 80 | 80 | 70 | 70 | 80 | 70 |
| | (minutes) | 10 | 10 | 20 | 20 | 10 | 10 | 20 | 20 | 10 | 20 |
| | Thickness (μm) | 100 | 100 | 80 | 80 | 100 | 100 | 80 | 80 | 100 | 80 |
| | Second resin layer | | | | | | | | | | |
| | Drying conditions (°C.) | 80 | 80 | 80 | 80 | 80 | 80 | 80 | 80 | 80 | 80 |
| | (minutes) | 10 | 10 | 10 | 10 | 10 | 10 | 10 | 10 | 10 | 10 |
| | Thickness (μm) | 20 | 50 | 20 | 60 | 20 | 50 | 30 | 30 | 20 | 20 |
| Covering conditions | Covering method[*1] | V | V | V | P | V | V | V | I | V | V |
| | Substrate[*2] | i | c | g | g | i | c | g | g | a | g |
| | Attachment conditions | | | | | | | | | | |
| | Temperature of sheet (°C.) | room temperature | room temperature | room temperature | room temperature | room temperature | room temperature | room temperature | | room temperature | room temperature |
| | Temperature of substrate (°C.) | 50 | 60 | 80 | 80 | 50 | 60 | 80 | | 80 | 80 |
| | Pressure (torr) | 6 | 6 | 6 | | 6 | 6 | 6 | | 6 | 6 |
| | Heating conditions (°C.) | 160 | 120 90 | 160 | 120 | 160 | 120 90 | 160 | 120 | sheet was | 160 |
| | (minutes) | 30 | 2 60 | 30 | 20 | 30 | 2 60 | 30 | 20 | | 30 |

TABLE F.6-continued

| | | Examples | | | | | | | | Comparative Examples | |
|---|---|---|---|---|---|---|---|---|---|---|---|
| | | F.9 | F.10 | F.11 | F.12 | F.13 | F.14 | F.15 | F.16 | F.3 | F.4 |
| Physical properties of coating | Hardness | H | H | H | H | H | H | HB | H | torn | H |
| | Critical surface tension (dyn/cm) | 9 | 12 | 11 | 14 | 12 | 15 | 13 | 15 | | 35 |
| | Adhesion (number of squares remaining) | 100 | 100 | 100 | 100 | 100 | 100 | 100 | 100 | | 100 |

*[1] Abbreviations for covering methods are as follows.
V, Vacuum adhesion forming.
I, Insert injection;
P, Vacuum pressing (bowl-shaped mold was used)
*[2] Abbreviations concerning the substrate are as follows.
a, hemispherical substrate of radius 15 cm, precoated with acrylic melamine.
c, Polypropylene hemisphere of radius 15 cm, g, SS-41 steel bowl of radius 10 cm, height of 6 cm and basal radius 6 cm.
i, Hemispherical substrate of radius 15 cm, precoated with acrylic melamine.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A thermosetting covering sheet comprising a semihardened layer made of a thermosetting resin composition,
   wherein said thermosetting resin composition comprises, as main ingredients, a reactive acrylic resin, which is in a solid state at room temperatures, and a blocked isocyanate, said reactive acrylic resin containing a plurality of at least one kind of functional group selected from the group consisting of hydroxyl, amino, and carboxyl, and the weight average molecular weight of said reactive acrylic resin being in the range of 100,000 to 1,000,000, and
   the ratio of the number of isocyanate groups in said blocked isocyanate to the number of functional groups in the reactive acrylic resin (number of isocyanates/number of functional groups) is within the range of 0.5 to 2.0, the number of functional groups being the sum of the number of hydroxyl, amino, and carboxyl groups, and
   said resin composition is in the form of a preformed thermosetting covering sheet comprising a semihardened resin layer made of said resin composition, the proportion of functional groups of the reactive acrylic resins in said semihardened layer that have already reacted being from 1% to 80% based on the total number of functional groups of reactive acrylic resins present before reaction, and
   said thermosetting covering sheet being capable of being laid onto a surface of an object and being subsequently hardened to result in a permanent coating.

2. A thermosetting covering sheet according to claim 1, wherein said thermosetting resin composition further comprises an electrically conductive substance.

3. A thermosetting covering sheet according to claim 1, wherein said thermosetting resin composition further comprises an anticondensation agent.

4. A thermosetting covering sheet according to claim 1, wherein said thermosetting resin composition further comprises a photochromic compound.

5. A thermosetting covering sheet according to claim 1, wherein said thermosetting resin composition further comprises a granular gloss control agent.

* * * * *

UNITED STATES PATENT AND TRADEMARK OFFICE
CERTIFICATE OF CORRECTION

PATENT NO. : 5,312,868

DATED : May 17, 1994

INVENTOR(S) : Hiroshi ABE et al

Page 1 of 3

It is certified that error appears in the above-identified patent and that said Letters Patent is hereby corrected as shown below:

In Column 18, line 30, change "$C_8F_{17}C_2H_4)CH_2C_6H_4CH=CH_2$" to -- $C_8F_{17}C_2H_4OCH_2C_6H_4CH=CH_2$ --.

Cols. 51 & 52

In Table B.5, first column, rows 13 and 14, change "poly<u>amine</u>" to -- poly<u>carboxylic</u> --.

Col. 57 & 58

In Table B.7, under column B.36, row 28, change "<u>z</u>inc" to -- <u>Z</u>inc --.

In Table B.7, under column B.41, row 25, change "Min<u>imum</u>" to -- Min<u>ium</u> --.

In Table B.7, under column B.43, row three, change " H<u>A</u> " to -- H<u>M</u> --.

Col. 59 & 60

In Table B.8-continued, under column B.41, row 20, insert -- None --.

In Table B.8-continued, under column B.42, row 20, delete "None".

In the text below Table B.8-continued, fourth line, change "p<u>e</u>rcelain" to -- p<u>o</u>rcelain --.

Col. 62

In the text below Table B.10, second line, change "M: Methacryl<u>ate</u> acid" to -- M: Methacryl<u>ic</u> acid --.

In the text below Table B.10, second line, change "A: Acryl<u>ate</u> acid" to -- A: Acryl<u>ic</u> acid --.

Col. 63

In the text below Table B.11, second line, change "M: Methacryl<u>ate</u> acid" to -- M: Methacryl<u>ic</u> acid --.

UNITED STATES PATENT AND TRADEMARK OFFICE
CERTIFICATE OF CORRECTION

PATENT NO. : 5,312,868

DATED : May 17, 1994

INVENTOR(S) : Hiroshi ABE et al

It is certified that error appears in the above-identified patent and that said Letters Patent is hereby corrected as shown below:

Col. 63 & 64

In Table B.12, under column B.47, row 19, change " H " to -- 2H --.

In Table B.12, under column B.48, row 19, change " HB " to -- H --.

In Table B.12, under column B.51, row 19, change " 2H " to -- HB --.

In Table B.12, under column B.52, row 19, change " H " to -- 2H --.

In Table B.12, under column B.53, row 19, change " 2H " to -- H --.

In Table B.12, under column B.54, row 19, change " B " to -- 2H --.

In Table B.12, under column B.55, row 19, insert -- B --.

In the text below Table B.12, second line, change "percelain" to -- porcelain --.

Col. 67

Table B.14 is interrupted by Table B.16 - please separate tables B.14 and B.16.

Col. 68

In the text below Table B.15, second line, change "M: Methacrylate acid" to -- M: Methacrylic acid --.

Col 67 & 68

In the text below Table B.16, second line, change "percelain" to -- porcelain --.

UNITED STATES PATENT AND TRADEMARK OFFICE
CERTIFICATE OF CORRECTION

PATENT NO. : 5,312,868
DATED : May 17, 1994
INVENTOR(S) : Hiroshi ABE et al

It is certified that error appears in the above-identified patent and that said Letters Patent is hereby corrected as shown below:

Col 73 & 74
In Table B.20-continued, second column, row three, after " (number " insert -- of --.
Col 90
In Table D.2, under column D.3, row one, change " b " to -- c --.
Col. 101
In Table D.18, under column D.43, row three, change " MM " to -- M --.
Col. 111
In Table F.3-continued, under column F.6, row 25, change " HB " to -- H --.

In Table F.5, under column F.14, row 19, change "3.6" to -- 3.5 --.
Col 117
In Table F.6-continued, under column F.10, row one, change " H " to -- 2H --.

Signed and Sealed this

Thirtieth Day of May, 1995

BRUCE LEHMAN

Attest:

Attesting Officer

Commissioner of Patents and Trademarks